United States Patent
Miller, IV et al.

(10) Patent No.: US 11,798,215 B2
(45) Date of Patent: *Oct. 24, 2023

(54) AVATAR FACIAL EXPRESSION REPRESENTATION IN MULTIDIMENSIONAL SPACE

(71) Applicant: Magic Leap, Inc., Plantation, FL (US)

(72) Inventors: Thomas Marshall Miller, IV, Los Angeles, CA (US); The Hung Quach, Stevenson Ranch, CA (US); Jeffrey Lin, Redondo Beach, CA (US)

(73) Assignee: MAGIC LEAP, INC., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/980,172

(22) Filed: Nov. 3, 2022

(65) Prior Publication Data

US 2023/0073991 A1 Mar. 9, 2023

Related U.S. Application Data

(60) Continuation of application No. 17/385,621, filed on Jul. 26, 2021, now Pat. No. 11,527,031, which is a
(Continued)

(51) Int. Cl.
*G06T 13/40* (2011.01)
*G06F 3/04847* (2022.01)
(Continued)

(52) U.S. Cl.
CPC .......... *G06T 13/40* (2013.01); *G06F 3/04847* (2013.01); *G06F 17/16* (2013.01);
(Continued)

(58) Field of Classification Search
None
See application file for complete search history.

(56) References Cited

U.S. PATENT DOCUMENTS

| 5,774,591 A | 6/1998 | Black et al. |
| 6,285,794 B1 | 9/2001 | Georgiev et al. |
| (Continued) | | |

FOREIGN PATENT DOCUMENTS

| WO | WO 2017/210462 | 12/2017 |
| WO | WO 2019/209431 | 10/2019 |

OTHER PUBLICATIONS

Invitation to Pay Additional Fees, re PCT Application No. PCT/US19/23214, dated May 30, 2019.
(Continued)

*Primary Examiner* — Yanna Wu
(74) *Attorney, Agent, or Firm* — KLINTWORTH & ROZENBLAT IP LLP

(57) ABSTRACT

Examples of the disclosed systems and methods may provide for improved and more realistic rendering of virtual characters and a more realistic interaction between a user and virtual characters. For example, the systems and methods describe techniques for mathematically generating a map used for animating facial expressions in a multidimensional animation blendspace. As another example, the systems and methods describe a transition system for dynamically transitioning facial expressions across a face of the virtual character. As another example, realistic physical movements can be added to a virtual character's facial expressions to provide interactivity with other virtual characters.

16 Claims, 27 Drawing Sheets

Related U.S. Application Data continuation of application No. 17/001,456, filed on Aug. 24, 2020, now Pat. No. 11,107,262, which is a division of application No. 16/359,851, filed on Mar. 20, 2019, now Pat. No. 10,789,753.

(60) Provisional application No. 62/661,522, filed on Apr. 23, 2018.

(51) Int. Cl.
| | | |
|---|---|---|
| *G06F 17/16* | (2006.01) | |
| *G06V 40/16* | (2022.01) | |
| *G06V 10/75* | (2022.01) | |
| *G06V 20/20* | (2022.01) | |
| *G06V 40/10* | (2022.01) | |
| *G06V 40/18* | (2022.01) | |

(52) U.S. Cl.
CPC ............ *G06V 10/751* (2022.01); *G06V 20/20* (2022.01); *G06V 40/107* (2022.01); *G06V 40/172* (2022.01); *G06V 40/174* (2022.01); *G06V 40/18* (2022.01)

(56) References Cited

U.S. PATENT DOCUMENTS

| | | | |
|---|---|---|---|
| 6,850,221 | B1 | 2/2005 | Tickle |
| 7,027,054 | B1 | 4/2006 | Cheiky et al. |
| 9,081,426 | B2 | 7/2015 | Armstrong |
| 9,215,293 | B2 | 12/2015 | Miller |
| 9,348,143 | B2 | 5/2016 | Gao et al. |
| 9,417,452 | B2 | 8/2016 | Schowengerdt et al. |
| 9,470,906 | B2 | 10/2016 | Kaji et al. |
| 9,547,174 | B2 | 1/2017 | Gao et al. |
| 9,671,566 | B2 | 6/2017 | Abovitz et al. |
| 9,740,006 | B2 | 8/2017 | Gao |
| 9,791,700 | B2 | 10/2017 | Schowengerdt et al. |
| 9,851,563 | B2 | 12/2017 | Gao et al. |
| 9,857,591 | B2 | 1/2018 | Welch et al. |
| 9,874,749 | B2 | 1/2018 | Bradski |
| 10,789,743 | B2 | 9/2020 | Miller, IV et al. |
| 11,107,262 | B2 | 8/2021 | Miller, IV et al. |
| 2006/0028436 | A1 | 2/2006 | Armstrong |
| 2007/0081123 | A1 | 4/2007 | Lewis |
| 2007/0236501 | A1 | 10/2007 | Kim et al. |
| 2008/0165195 | A1* | 7/2008 | Rosenberg .............. G06T 13/40 345/473 |
| 2012/0127062 | A1 | 5/2012 | Bar-Zeev et al. |
| 2012/0162549 | A1 | 6/2012 | Gao et al. |
| 2013/0082922 | A1 | 4/2013 | Miller |
| 2013/0117377 | A1 | 5/2013 | Miller |
| 2013/0125027 | A1 | 5/2013 | Abovitz |
| 2013/0208234 | A1 | 8/2013 | Lewis |
| 2013/0242262 | A1 | 9/2013 | Lewis |
| 2013/0300891 | A1 | 11/2013 | Bacivarov et al. |
| 2014/0071539 | A1 | 3/2014 | Gao |
| 2014/0177023 | A1 | 6/2014 | Gao et al. |
| 2014/0218468 | A1 | 8/2014 | Gao et al. |
| 2014/0267420 | A1 | 9/2014 | Schowengerdt |
| 2014/0306866 | A1 | 10/2014 | Miller et al. |
| 2015/0016777 | A1 | 1/2015 | Abovitz et al. |
| 2015/0049953 | A1 | 2/2015 | Movellan et al. |
| 2015/0103306 | A1 | 4/2015 | Kaji et al. |
| 2015/0178939 | A1 | 6/2015 | Bradski et al. |
| 2015/0205126 | A1 | 7/2015 | Schowengerdt |
| 2015/0222883 | A1 | 8/2015 | Welch |
| 2015/0222884 | A1 | 8/2015 | Cheng |
| 2015/0268415 | A1 | 9/2015 | Schowengerdt et al. |
| 2015/0302652 | A1 | 10/2015 | Miller et al. |
| 2015/0309263 | A2 | 10/2015 | Abovitz et al. |
| 2015/0326570 | A1 | 11/2015 | Publicover et al. |
| 2015/0346490 | A1 | 12/2015 | TeKolste et al. |
| 2015/0346495 | A1 | 12/2015 | Welch et al. |
| 2016/0011419 | A1 | 1/2016 | Gao |
| 2016/0026253 | A1 | 1/2016 | Bradski et al. |
| 2018/0130245 | A1* | 5/2018 | Kozlov .................. G06T 13/40 |
| 2019/0325633 | A1 | 10/2019 | Miller, IV et al. |
| 2020/0388066 | A1 | 12/2020 | Miller, IV et al. |
| 2022/0020198 | A1 | 1/2022 | Miller, IV |

OTHER PUBLICATIONS

International Search Report and Written Opinion, re PCT Application No. PCT/US19/23214, dated July 19, 2019.

International Preliminary Report for Patentability, re PCT Application No. PCT/US19/23214, dated Oct. 27, 2020.

ARToolKit: https://web.archive.org/web/20051013062315/http://www.hitl.washington.edu:80/artoolkit/documentation/hardware.htm, archived Oct. 13, 2005.

Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf Azuma, "Predictive Tracking for Augmented Realty," TR95-007, Department of Computer Science, UNC—Chapel Hill, NC, Feb. 1995.

Bimber, et al., "Spatial Augmented Reality—Merging Real and Virtual Worlds," 2005 https://web.media.mit.edu/~raskar/book/BimberRaskarAugmentedRealityBook.pdf Unreal Engine, "Blend Nodes," https://docs.unrealengine.com/latest/INT/Engine/Animation/NodeReference/Blend/index.html, downloaded Mar. 2018, in 7 pages.

Unreal Engine, "Blend Spaces Overview," https://docs.unrealengine.com/latest/INT/Engine/Animation/Blendspaces/Overview/index.html, downloaded Mar. 2018, in 4 pages.

Unreal Engine, "Blend Spaces," https://docs.unrealengine.com/latest/INT/Engine/Animation/Blendspaces, downloaded Mar. 2018, in 2 pages.

Unreal Engine, "Editing Blend Spaces," https://docs.unrealengine.com/latest/INT/Engine/Animation/Blendspaces/Editor/index.html, downloaded Mar. 2018, in 8 pages.

Ekman et al., "FACS—Facial Action Coding System," https://www.cs.cmu.edu/~face/facs.htm, accessed Feb. 15, 2018 in 5 pages.

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

Wikipedia: "Morph target animation," https://en.wikipedia.org/wiki/Morph_target_animation, accessed Feb. 9, 2017 in 2 pages.

Wikipedia: "Contrasting and categorization of emotions," https://en.wikipedia.org/wiki/Contrasting_and_categorization_of_emotions, in 10 pages.

Wikipedia: "Facial Action Coding System," https://en.wikipedia./org/wiki/Facial_Action_Coding_System, accessed Dec. 12, 2017 in 9 pages.

* cited by examiner

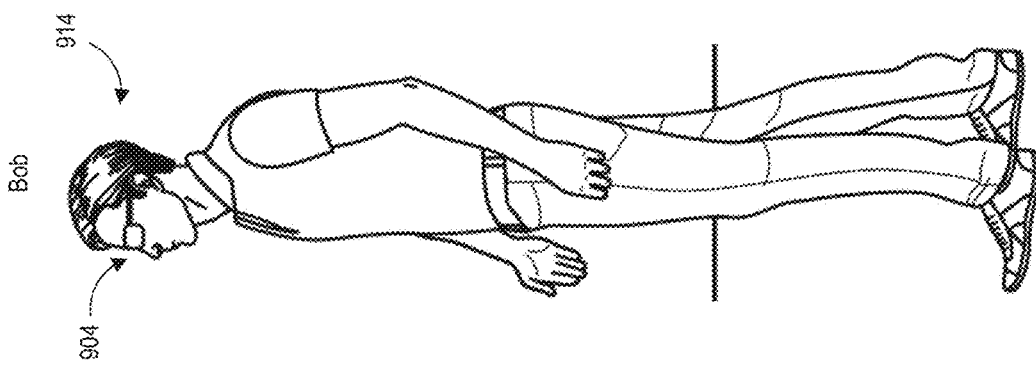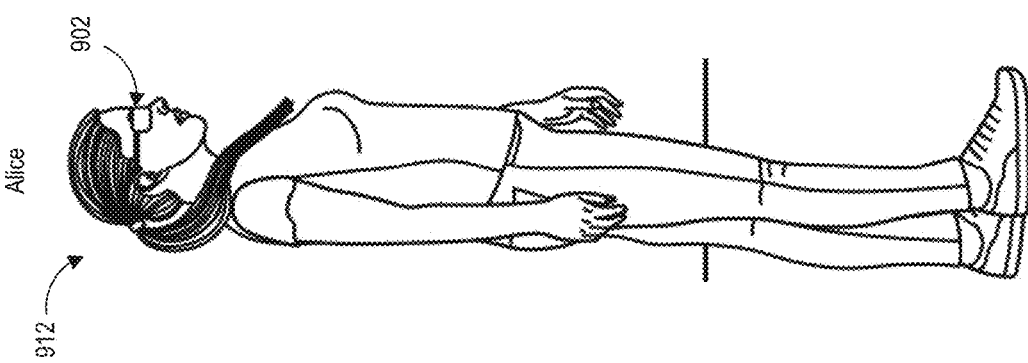
FIG. 9B

EXAMPLE FACE VECTORS

| | VISUAL EXPRESSION | | | | |
|---|---|---|---|---|---|
| | NEUTRAL | SURPRISE | SHOCK | DISPLEASED | DISGUST |
| L. BROW UP | 0.0 | 0.45 | 0.8 | -0.2 | -0.4 |
| R. BROW UP | 0.0 | 0.5 | 0.9 | -0.2 | -0.4 |
| JAW DROP | 0.0 | 0.35 | 0.75 | 0.0 | 0.0 |
| EYES OPEN | 0.5 | 0.75 | 1.0 | 0.25 | 0.125 |
| LIP CORNER | 0.0 | 0.0 | 0.0 | 0.45 | 0.8 |
| ... | ... | ... | ... | ... | ... |

FACE VECTOR 1200, 1210

FIG. 12A

| # | Label | # | Label |
|---|---|---|---|
| 1 | PENSIVENESS | 16 | FEAR |
| 2 | STERNNESS | 17 | DISGUST |
| 3 | SLIGHTSMILE | 18 | SURPRISED |
| 4 | WORRY | 19 | YAWN |
| 5 | DISDAIN | 20 | EAGER |
| 6 | S.SURPRISED | 21 | IDUNNO |
| 7 | DROWSINESS | 22 | PAIN |
| 8 | FAKESMILE | 23 | HAPPYSURPRISED |
| 9 | STIFLEDSMILE | 24 | GRIEF |
| 10 | EXERTION | 25 | V.ANGRY |
| 11 | WORRIEDSURPRISED | 26 | JOY |
| 12 | HAPPYSAD | 27 | TERROR |
| 13 | SAD | 28 | RETCH |
| 14 | ANGRY | 29 | AMAZED |
| 15 | SMILE | | |

| | |
|---|---|
| 1 PENSIVENESS | 16 FEAR |
| 2 STERNNESS | 17 DISGUST |
| 3 SLIGHTSMILE | 18 SURPRISED |
| 4 WORRY | 19 YAWN |
| 5 DISDAIN | 20 EAGER |
| 6 S.SURPRISED | 21 IDUNNO |
| 7 DROWSINESS | 22 PAIN |
| 8 FAKESMILE | 23 HAPPYSURPRISED |
| 9 STIFLEDSMILE | 24 GRIEF |
| 10 EXERTION | 25 V.ANGRY |
| 11 WORRIEDSURPRISED | 26 JOY |
| 12 HAPPYSAD | 27 TERROR |
| 13 SAD | 28 RETCH |
| 14 ANGRY | 29 AMAZED |
| 15 SMILE | |

EXAMPLES OF FACE PHYSICALITY (CONT'D)
SINGLE PART BREAKOUT (LEFT BROW)
NEUTRAL ⟶ SHOCK
0.0            0.85
NO SPRING
1630
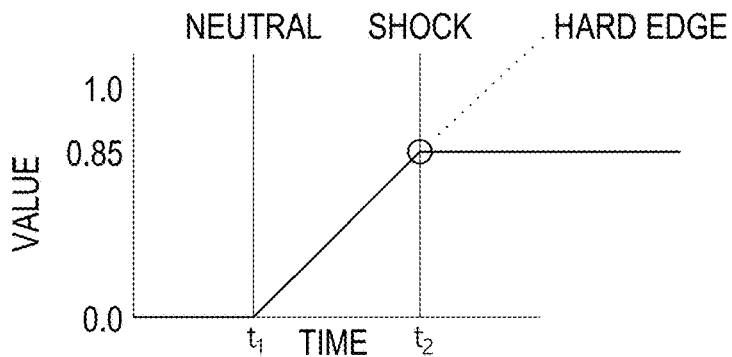
SPRING
1640
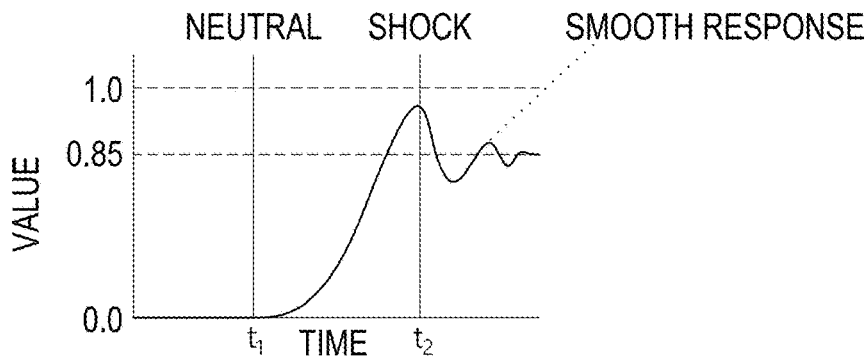
ADJUSTED
WEIGHT
SPRING
(HEAVY BROW)
1650
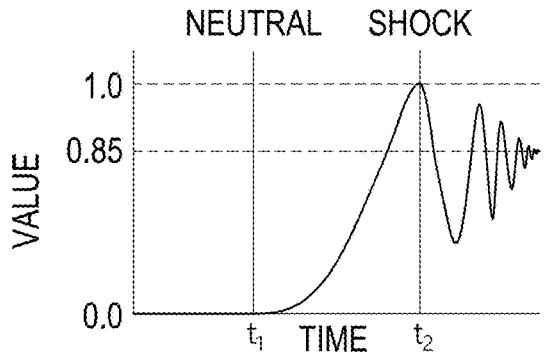
FIG. 16B

AVATAR FACIAL EXPRESSION REPRESENTATION IN MULTIDIMENSIONAL SPACE

CROSS-REFERENCE TO RELATED APPLICATIONS

This application is a continuation of U.S. patent application Ser. No. 17/385,621, filed Jul. 26, 2021, entitled AVATAR FACIAL EXPRESSION REPRESENTATION IN MULTIDIMENSIONAL SPACE, which is a continuation of U.S. patent application Ser. No. 17/001,456, filed Aug. 24, 2020, entitled AVATAR FACIAL EXPRESSION REPRESENTATION IN MULTIDIMENSIONAL SPACE, which is a divisional application of U.S. patent application Ser. No. 16/359,851, filed Mar. 20, 2019, entitled AVATAR FACIAL EXPRESSION REPRESENTATION IN MULTIDIMENSIONAL SPACE, which claims the benefit of priority to U.S. Patent Application No. 62/661,522, filed Apr. 23, 2018, entitled AVATAR FACIAL EXPRESSION REPRESENTATION IN MULTIDIMENSIONAL SPACE, the disclosures of each of which are hereby incorporated by reference herein in their entirety.

FIELD

The present disclosure relates to animations of virtual characters and more particularly to control facial expressions of the virtual characters.

BACKGROUND

A virtual character may be a virtual representation of a real or fictional person (or creature or personified object) in a virtual environment. For example, during a telepresence session in which two users are interacting with each other in a mixed reality environment, a viewer can perceive a virtual character of another user in the viewer's environment and thereby create a tangible sense of the other user's presence in the viewer's environment. The virtual character can also provide a way for users to interact with each other and do things together in a shared virtual environment. For example, a student attending an online class can perceive and interact with virtual characters representing other students or the teacher in a virtual classroom. As another example, a user playing a video game may view and interact with virtual characters of other players in the game.

SUMMARY

Examples of the disclosed systems and methods may provide for improved and more realistic rendering of virtual characters and a more realistic interaction between a user and virtual characters. For example, the systems and methods describe techniques for mathematically generating a map for representing facial expressions of a virtual character in a multidimensional animation blendspace. The systems and methods can utilize the map to more realistically render virtual characters. As another example, the systems and methods provide for dynamically transitioning facial expressions across a face of the virtual character. As another example, realistic physical movements can be added to a virtual character's facial expressions to provide realism and interactivity with other virtual characters.

Embodiments of these system and methods are particularly applicable to real-time rendering in a mixed, virtual, or augmented reality environment. Other embodiments of these systems and methods can be used in gaming, movies, and visual effects (VFx).

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims.

FIG. 9B illustrates an example telepresence session.

FIG. 12A illustrates examples of face vectors representing facial expressions.

FIG. 16B illustrates examples of graphs associated with adding tunable controls to face sliders.

Figure 1:
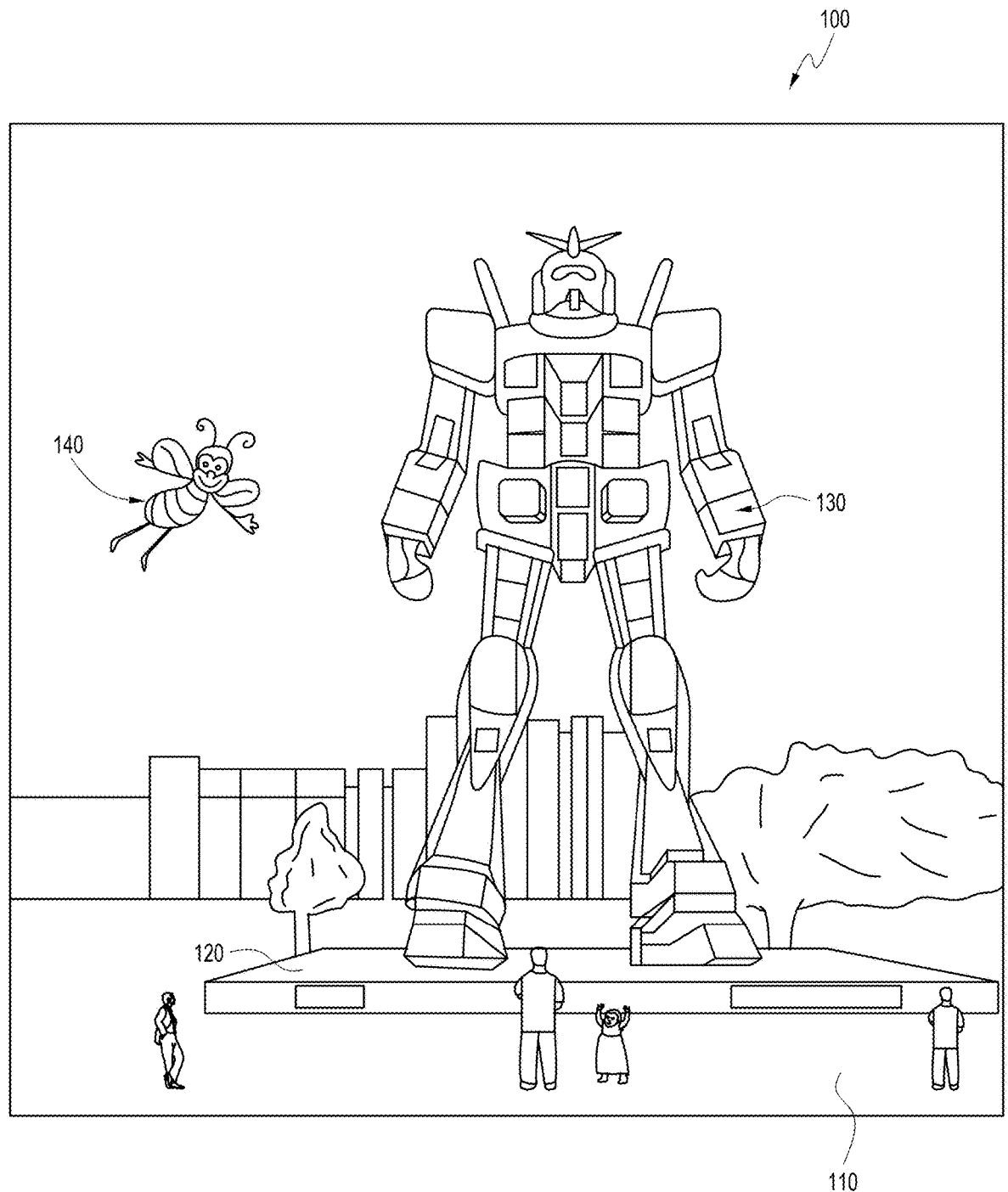
FIG. 1 depicts an illustration of a mixed reality scenario with certain virtual reality objects, and certain physical objects viewed by a person.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

A virtual character can appear in a virtual application to provide interactive user experiences. For example, a virtual character may be part of an augmented reality, virtual reality, or mixed reality (AR/VR/MR) environment, a game application, a movie, or other visual content. A virtual character can be an avatar, or virtual objects. The virtual character can be animated with facial and emotional expressions to provide a realistic user experience. The controls for these expressions may be driven by artificial intelligence. For example, the virtual character may be pre-programmed to show an excited expression when a user passes a level in a virtual game. As another example, the virtual character may have a look of fear every time the virtual character sees a spider. The expressions can also be real-time driven, e.g., based on a corresponding user's interaction. As an example, when a user of an AR/VR/MR system smiles, the user's avatar can also smile in the virtual environment so that other AR/VR/MR users can see that the user is smiling. As will further be described with reference to FIGS. 2 and 4, the user's expressions can be determined based on data acquired by an outward-facing imaging system, an inward-facing imaging system, a video or a camera in a room where the user is utilizing the AR/VR/MR device. As yet another example, a user can control the facial expressions of a virtual avatar remotely, e.g., via a map of facial expressions (described with reference to FIGS. 12B and 12C). In this example, the facial expressions of the virtual avatar do not have to match those of the user. For example, the user can talk to another person in the environment or have a neutral expression whereas the user can control the virtual avatar to look happy via the map.

Facial expressions of a virtual character can be animated using combinations of blendshapes. Blendshapes can be combined using a face vector, where each value in the vector represents a setting for a single blendshape. A blendshape setting can denote a magnitude (or weight) with which to incorporate that blendshape. Each blendshape can add an additional level of dimensionality to the virtual character's face, which can provide another way for a user to further manipulate deformations of the virtual character's facial mesh. Accordingly, each blendshape may be considered a parameter used to animate the virtual character.

For example, in some facial rigs, a face vector can be defined as a set of numbers (e.g., components) in a multi-dimensional space of over one hundred dimensions (e.g., 137 dimensions in some examples). The value for each component can be, e.g., a Boolean value, an integer, or a real number defined over a range of values (e.g., 0 to 1, or −1 to +1). If each component of the face vector were discretized to have, say, 10 possible values, the total number of possible facial expressions would be $10^{137}$, in the above example, which is far greater than the number of particles that exist in the observable universe. Given such an enormous volume of multidimensional space in which facial expressions can be generated and rendered, the disclosed systems and methods can utilize a set of rules that are computationally implemented to dynamically animate a virtual character and to dynamically transition between different facial expressions.

To configure the visual effects associated with the facial expressions, the animation system can use a map which comprises two-dimensional (2D) projections of facial expressions. The map may be in the shape of a wheel (e.g., similar to the map 1250 shown in FIG. 12B) or a more rectangular arrangement (e.g., similar to the map 1250 shown in FIG. 12D). This map can serve as an interface to help an animator to configure animations more intuitively, because the animator is able to see a chosen expression visually instead of a string of numbers and variables in the face vector. In some situations, the map can also be used as a way for a person (e.g., a user of an AR/VR/MR device) to manually control the facial expressions of an avatar (as described above). For example, the person can control the facial expression of the virtual avatar using the map remotely even though the person is not performing that particular expression in the real world.

An AR/VR/MR system can utilize the map to dynamically transition between different expressions of the avatar by generating and following a trajectory in the map between, e.g., an initial expression (e.g., a neutral expression) and a final expression (e.g., a smile). During this transition, if some event were to cause the facial expression to change from the final expression (e.g., rather than transitioning to a smile, the avatar instead is to transition to a look of surprise), the system can dynamically alter the trajectory towards the new final expression (e.g., the look of surprise) in a natural and realistic manner.

Because numerous facial expressions can be animated for a virtual character, it can be infeasible to project all possible facial expressions onto the map (e.g., as noted above, the number of facial expressions in a multidimensional facial space can greatly exceed the number of particles in the observable universe). Thus, a relatively small subset of possible facial expressions (or emotions) may be projected onto the map and created with defined values of the face vector. The other expressions can be derived from the vectors associated with facial expressions in the subset of possible facial expressions, for example, by generating linear combinations of the vectors associated with the map.

However, if two arbitrary face vectors are combined, the resulting facial expression may look odd and can break the realism of the virtual character. For example, the avatar may look robotic cycling between different expressions rather than like a real person in which expressions smoothly change.

To reduce the likelihood of incorrect blending of facial expressions, the map can be generated such that positions of a relatively small number (e.g., three) of closest expressions (used for generating the blended expression) on the map can be optimized. For example, the technique described herein can mathematically derive the layout of the map by creating an expression specific delta vector that represents an increment (e.g., a delta) between a reference expression and the desired expression. In some embodiments, the reference expression corresponds to a neutral expression of the face. The delta vector can be calculated by subtracting the vector values for the neutral expression from the vector values of the desired expression (which will be projected onto the map). This permits the facial expression to be represented as a change (e.g., the delta vector) relative to the neutral expression. Thus, the neutral expression can serve as an origin at a given location (e.g., the center, top, bottom, or other locations) on the map, and the facial expressions can be arrayed around this origin based on the geometric relationship among the delta vectors corresponding to these expressions (e.g., lengths of the delta vectors and angular relationships between the delta vectors).

The relationships between the expressions can be determined based on mathematical operations applied to the facial vectors corresponding to various expressions. For example, the relationships can indicate whether the expressions are relatively similar to each other (e.g., surprised and shocked, or displeased and disgusted) or more opposite to each other (e.g., displeased versus shocked). As an example, with reference to FIG. 12A, the eye brows move up for the shocked expression whereas the eye brows move slightly down for the displeased expression. As another example, the jaw moves for the shocked expression but there is no jaw movement for the displeased expression. For two similar expressions displeased and disgusted, the movements of eye brows, eyes, and lip corner are in the same direction but the magnitudes of the movements are different. For example, the eye brows move down and the eyes opened up for the displeased and disgusted expressions.

In some embodiments, the mathematical dot product operation can be applied to the facial vectors or the expression specific delta vectors to determine the relationships between the facial expressions. In some embodiments, the reference (e.g., neutral) expression may be placed in the center of the map to allow the blending to have a common neutral expression at a central location. The distance between an expression and the neutral expression can be calculated based on the length of the expression specific delta vector (e.g., the Euclidean or L2-norm of the vector).

In addition to or as an alternative to reducing the likelihood of incorrect blending, the technique can advantageously create realistic intermediate expressions (e.g., which may be in-between or near two facial expression vectors) for transitions between two expressions, because the expressions may be multiples of each other in terms of intensity in each direction of the map (e.g., a happy expression is in the same general direction as an ecstatic expression on the map). The transition between two expressions on the map can be along an expression change trajectory. For example, with reference to FIG. 12B, the transition from disdained to terror can be along an expression change trajectory which starts at the disdained expression and moves to worry, fear, and subsequently ends at the terror expression. The trajectory can be automatically determined, for example, based on the relationships of the two expressions, the layout of the map, and so forth. By generating a trajectory in the map between an initial expression and a final expression (which can dynamically be updated), the techniques described herein may avoid a robotic or abrupt change of expression for the avatar and may produce a more realistic looking avatar. As will further be described with reference to FIG. 12B, in some situations, a user of a wearable system can also control the emotion change trajectory. For example, the user may interact with a visual representation of the map on a virtual user interface and draw a trajectory comprising several expressions during the transition from an initial expression to an end expression. For example, a user may draw a trajectory from the distained expression to the terror expression. This user drawn trajectory may go through exertion, to fear, and then to terror which may be in contrast with the earlier example where the distained expression is transitioned to the terror expression via the worry and fear expressions.

Because the virtual character may be real time driven (e.g., in an AR/VR/MR environment, or via a remote computing device), a virtual character's expression can change, in real time, from a first expression to a second expression. The change from the first expression to the second expression can occur along the expression change trajectory. Thus, the first or the second expression can be an intermediary expression in the expression change trajectory. For example, the expression change trajectory can include worried, fear, and terror, and the virtual character's expression can change from worried to fear and then to terror.

Traditional pre-rendered animation usually pre-selects two expressions—a start expression and end expression—and then blends the two for transitioning. However, the transition in this method is pre-rendered animation. The pre-rendered animation generally needs to be rendered in entirety before transitioning to a third expression, which may not reflect the actual change in expression desired for the avatar. Thus, pre-rendered transitions can look unnatural, robotic, or delayed.

To provide a less rigid transition and to provide a seamless flow from a first expression to a second expression at any point in time, the animation system for a virtual character can provide dynamic transitions between expressions and allow expressions to sweep across the face, which is more realistic. For example, to go from a worried expression to a happy expression, the system can start at the chin and sweep up, where a worried mouth turns into a smile followed by worried eyes turning into smiling eyes, or the system could start at the forehead and sweep down with the eyes changing from worried to smiling eyes then the mouth changing from worried to smiling afterwards.

Figure 14A:
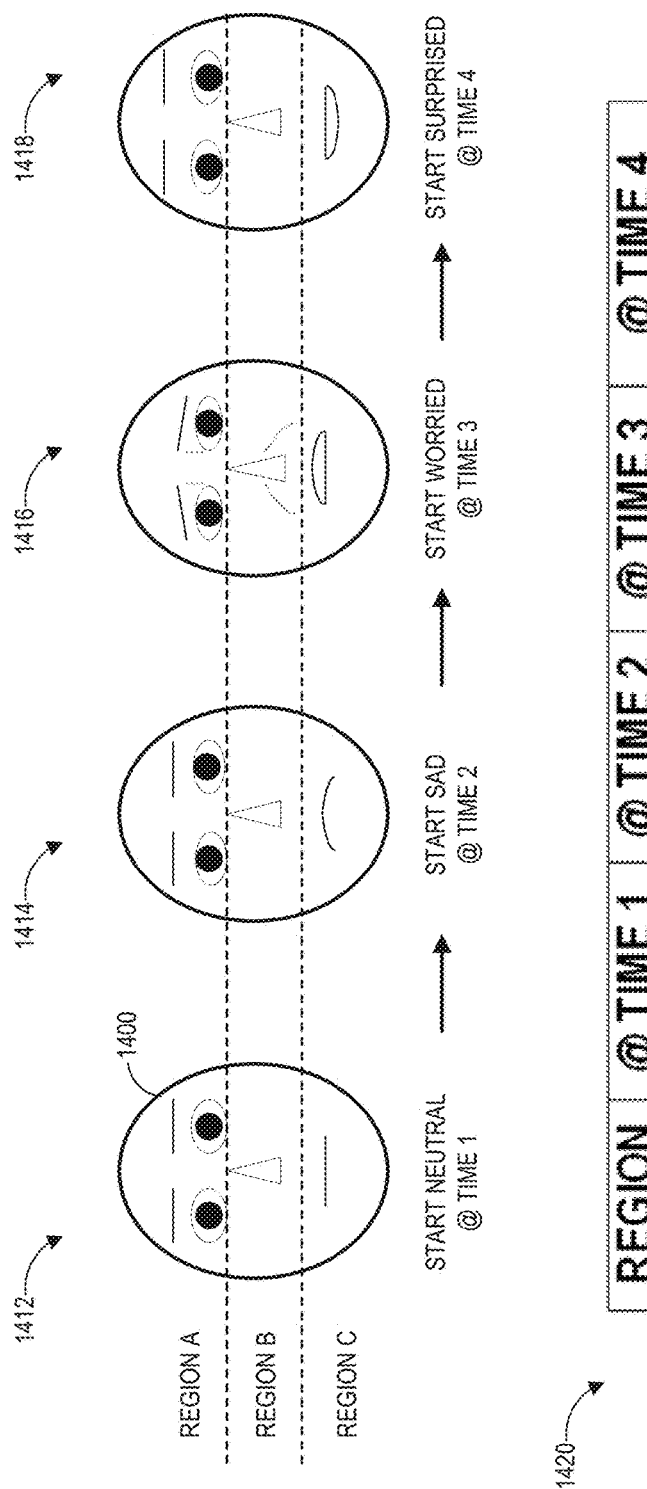
FIG. 14A illustrates an example of transitions of expressions for a virtual character where the whole face changes from one state to another at the same time.

This transition system can specify parameters including a starting facial expression, an ending facial expression, and a sweep direction (or sweep speed) for each point in time. With reference to FIG. 14A, the sweep direction can indicate a direction of change among the various parts of the face during the transition from one facial expression to the next. As one example, the transition from the happy expression to the sad expression may follow a downward direction such that the control values of the eyes are changed from those associated with happy to those associated sad, and then the control values of the mouth is changed from those associated with happy to those associated sad. By employing the sweep direction for changing facial expressions, the animation system thus may sweep from the starting facial expression to the ending facial expression in a realistic and natural manner and over a realistic and natural time frame, thereby avoiding robot-like transitions between facial expressions. This technique can allow for transitions from any starting point to any ending point and from any direction or at any transition speed. The speed of the sweep (or the sweep direction) can also be randomized for every play-through (associated with a transition) so that the avatar performs these transitions can appear slightly differently each time, which again mimics real-person behavior and appears less robotic and pre-programmed.

Realistic physical movements may be incorporated into animations of virtual characters to add realism to the transition. Advantageously, to enable realistic physical movements, the control system of the virtual character can incorporate physical movements into the variables of the face vector directly without needing to implement a separate physics-based program, which can be computationally challenging to execute in real time. For example, in some embodiments of the control system, tunable springs can be added to the control values in the face vector to provide a natural cyclic motion on certain regions of the face (e.g., the avatar's cheek may bounce when suddenly having a big smile).

Accordingly, embodiments of the disclosed systems and techniques can be used to quickly and automatically (or with limited or reduced human intervention) generate facial expressions and transitions between facial expressions for virtual avatars. For example, the avatar advantageously can be rendered so as to reduce the likelihood of entering the so-called uncanny valley, which represents a dip in human emotional response to an avatar that is almost, but not quite, human in its appearance or movements.

Although the examples described herein may use a human-shaped virtual avatar to illustrate various aspects of rendering by the control system, similar techniques can also be applicable to the animation of other types of virtual characters, such as, e.g., animals, fictitious creatures, objects, etc.

Examples of 3D Display of a Wearable System

Modern computing and display technologies have facilitated the development of systems for so called "virtual reality," "augmented reality," and "mixed reality" experiences, wherein digitally reproduced images are presented to a user in a manner such that they seem to be, or may be perceived as, real. A virtual reality (VR) scenario typically involves presentation of computer-generated virtual image information without transparency to other actual real-world visual input. An augmented reality (AR) scenario typically involves presentation of virtual image information as an augmentation to visualization of the actual world around the user. Mixed reality (MR) is a type of augmented reality in which physical and virtual objects may co-exist and interact in real time. Systems and methods disclosed herein address various challenges related to VR, AR and MR technology.

A wearable system (also referred to herein as an augmented reality (AR) system) can be configured to present 2D or 3D virtual images to a user. The images may be still images, frames of a video, or a video, in combination or the like. At least a portion of the wearable system can be implemented on a wearable device that can present a VR, AR, or MR environment, alone or in combination, for user interaction. The wearable device can be used interchangeably as an AR device (ARD). Further, for the purpose of the present disclosure, the term "AR" is used interchangeably with the term "MR".

FIG. 1 depicts an illustration of a mixed reality scenario with certain virtual reality objects, and certain physical objects viewed by a person. In FIG. 1, an MR scene 100 is depicted wherein a user of an MR technology sees a real-world park-like setting 110 featuring people, trees, buildings in the background, and a concrete platform 120. In addition to these items, the user of the MR technology also perceives that he "sees" a robot statue 130 standing upon the real-world platform 120, and a cartoon-like avatar character 140 flying by which seems to be a personification of a bumble bee, even though these elements do not exist in the real world.

In order for the 3D display to produce a true sensation of depth, and more specifically, a simulated sensation of surface depth, it may be desirable for each point in the display's visual field to generate an accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surface depth.

VR, AR, and MR experiences can be provided by display systems having displays in which images corresponding to a plurality of depth planes are provided to a viewer. The images may be different for each depth plane (e.g., provide slightly different presentations of a scene or object) and may be separately focused by the viewer's eyes, thereby helping to provide the user with depth cues based on the accommodation of the eye required to bring into focus different image features for the scene located on different depth plane or based on observing different image features on different depth planes being out of focus. As discussed elsewhere herein, such depth cues provide credible perceptions of depth.

Figure 2:
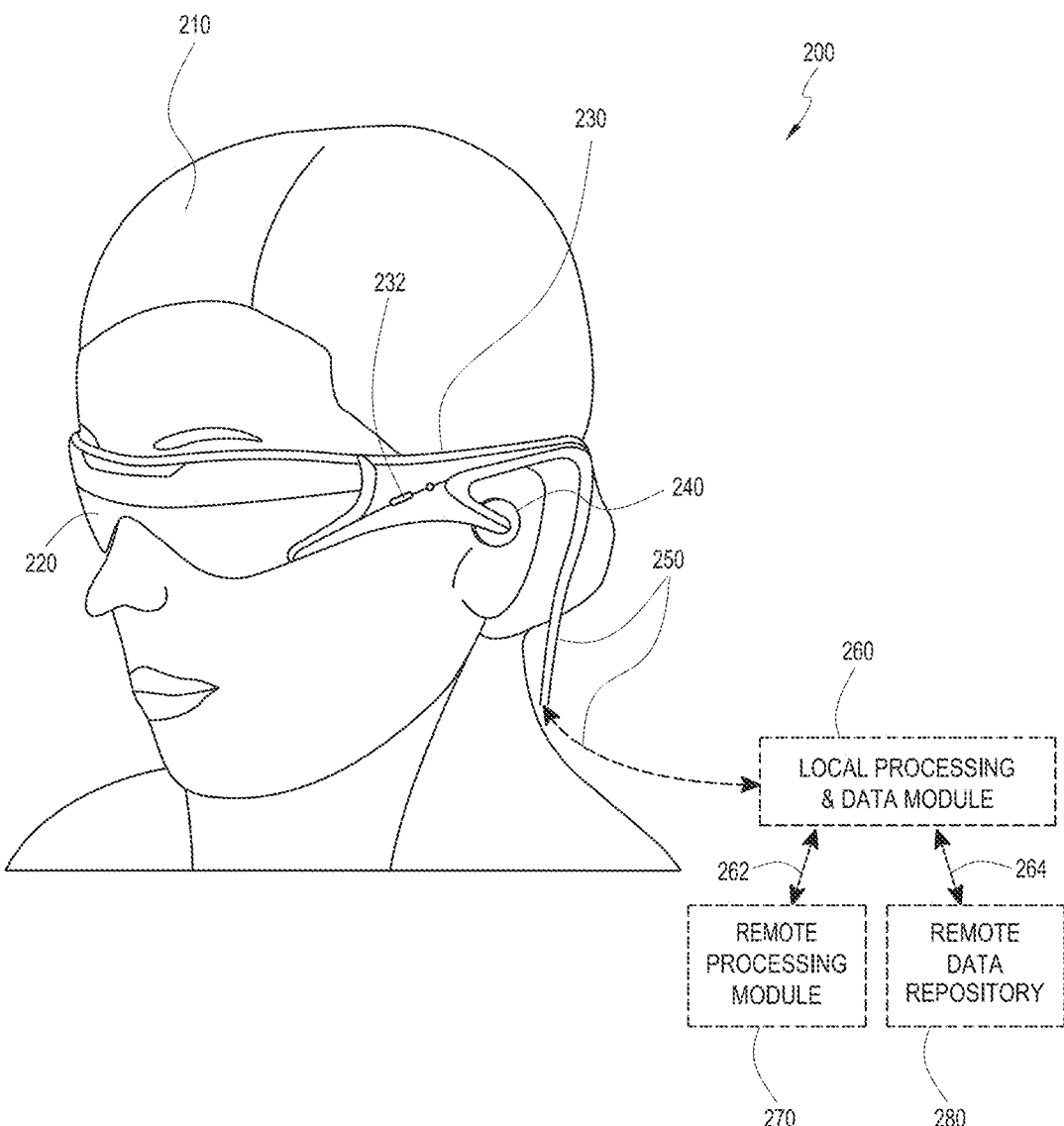
FIG. 2 schematically illustrates an example of a wearable system.

FIG. 2 illustrates an example of wearable system 200 which can be configured to provide an AR/VR/MR scene. The wearable system 200 can also be referred to as the AR system 200. The wearable system 200 includes a display 220, and various mechanical and electronic modules and systems to support the functioning of display 220. The display 220 may be coupled to a frame 230, which is wearable by a user, wearer, or viewer 210. The display 220 can be positioned in front of the eyes of the user 210. The display 220 can present AR/VR/MR content to a user. The display 220 can comprise a head mounted display (HMD) that is worn on the head of the user.

In some embodiments, a speaker 240 is coupled to the frame 230 and positioned adjacent the ear canal of the user (in some embodiments, another speaker, not shown, is positioned adjacent the other ear canal of the user to provide for stereo/shapeable sound control). The display 220 can include an audio sensor (e.g., a microphone) 232 for detecting an audio stream from the environment and capture ambient sound. In some embodiments, one or more other audio sensors, not shown, are positioned to provide stereo sound reception. Stereo sound reception can be used to determine the location of a sound source. The wearable system 200 can perform voice or speech recognition on the audio stream.

The wearable system 200 can include an outward-facing imaging system 464 (shown in FIG. 4) which observes the world in the environment around the user. The wearable system 200 can also include an inward-facing imaging system 462 (shown in FIG. 4) which can track the eye movements of the user. The inward-facing imaging system may track either one eye's movements or both eyes' movements. The inward-facing imaging system 462 may be attached to the frame 230 and may be in electrical communication with the processing modules 260 or 270, which may process image information acquired by the inward-facing imaging system to determine, e.g., the pupil diameters or orientations of the eyes, eye movements or eye pose of the user 210. The inward-facing imaging system 462 may include one or more cameras. For example, at least one camera may be used to image each eye. The images acquired by the cameras may be used to determine pupil size or eye pose for each eye separately, thereby allowing presentation of image information to each eye to be dynamically tailored to that eye.

As an example, the wearable system 200 can use the outward-facing imaging system 464 or the inward-facing imaging system 462 to acquire images of a pose of the user. The images may be still images, frames of a video, or a video.

The display 220 can be operatively coupled 250, such as by a wired lead or wireless connectivity, to a local data processing module 260 which may be mounted in a variety of configurations, such as fixedly attached to the frame 230, fixedly attached to a helmet or hat worn by the user, embedded in headphones, or otherwise removably attached to the user 210 (e.g., in a backpack-style configuration, in a belt-coupling style configuration).

The local processing and data module 260 may comprise a hardware processor, as well as digital memory, such as non-volatile memory (e.g., flash memory), both of which may be utilized to assist in the processing, caching, and storage of data. The data may include data a) captured from sensors (which may be, e.g., operatively coupled to the frame 230 or otherwise attached to the user 210), such as image capture devices (e.g., cameras in the inward-facing imaging system or the outward-facing imaging system), audio sensors (e.g., microphones), inertial measurement units (IMUs), accelerometers, compasses, global positioning system (GPS) units, radio devices, or gyroscopes; or b) acquired or processed using remote processing module 270 or remote data repository 280, possibly for passage to the display 220 after such processing or retrieval. The local processing and data module 260 may be operatively coupled by communication links 262 or 264, such as via wired or wireless communication links, to the remote processing module 270 or remote data repository 280 such that these remote modules are available as resources to the local processing and data module 260. In addition, remote processing module 280 and remote data repository 280 may be operatively coupled to each other.

In some embodiments, the remote processing module 270 may comprise one or more processors configured to analyze and process data or image information. In some embodiments, the remote data repository 280 may comprise a digital data storage facility, which may be available through the internet or other networking configuration in a "cloud" resource configuration. In some embodiments, all data is stored and all computations are performed in the local processing and data module, allowing fully autonomous use from a remote module.

In various embodiments, the local processing and data module 260 or the remote processing module 270 (and remote data repository 280) can perform the techniques for avatar facial expression representation in multidimensional space that are described herein (see, e.g., FIGS. 11-18).

Example Components of a Wearable System

Figure 3:
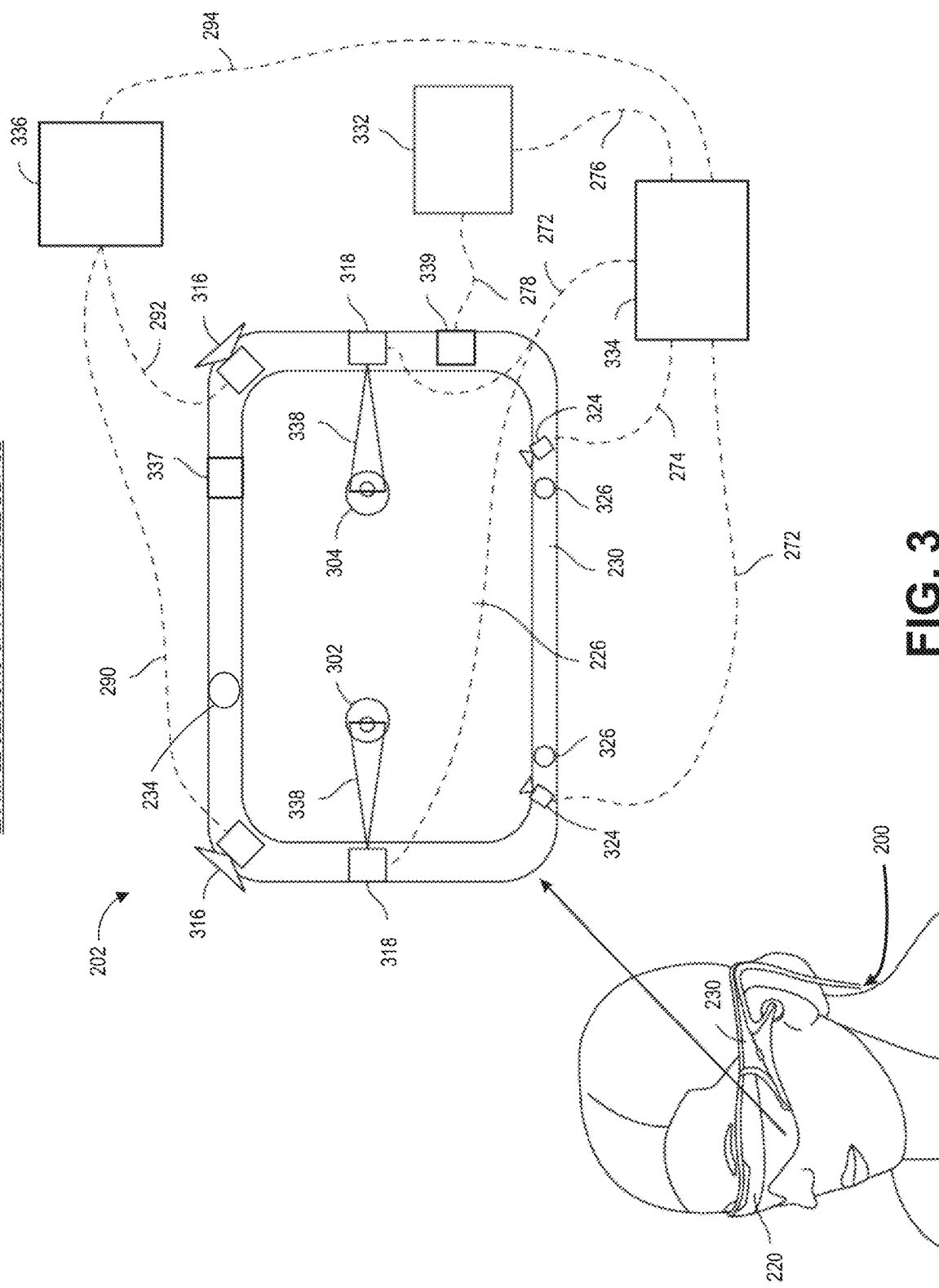
FIG. 3 schematically illustrates example components of a wearable system.

FIG. 3 schematically illustrates example components of a wearable system. FIG. 3 shows a wearable system 200 which can include a display 220 and a frame 230. A blown-up view 202 schematically illustrates various components of the wearable system 200. In certain implements, one or more of the components illustrated in FIG. 3 can be part of the display 220. The various components alone or in combination can collect a variety of data (such as e.g., audio or visual data) associated with the user of the wearable system 200 or the user's environment. It should be appreciated that other embodiments may have additional or fewer components depending on the application for which the wearable system is used. Nevertheless, FIG. 3 provides a basic idea of some of the various components and types of data that may be collected, analyzed, and stored through the wearable system.

FIG. 3 shows an example wearable system 200 which can include the display 220. The display 220 can comprise a display lens 226 that may be mounted to a user's head or a housing or frame 230, which corresponds to the frame 230. The display lens 226 may comprise one or more transparent mirrors positioned by the housing 230 in front of the user's eyes 302, 304 and may be configured to bounce projected light 338 into the eyes 302, 304 and facilitate beam shaping, while also allowing for transmission of at least some light from the local environment. The wavefront of the projected light beam 338 may be bent or focused to coincide with a desired focal distance of the projected light. As illustrated, two wide-field-of-view machine vision cameras 316 (also referred to as world cameras) can be coupled to the housing 230 to image the environment around the user. These cameras 316 can be dual capture visible light/non-visible (e.g., infrared) light cameras. The cameras 316 may be part of the outward-facing imaging system 464 shown in FIG. 4. Image acquired by the world cameras 316 can be processed by the pose processor 336. For example, the pose processor 336 can implement one or more object recognizers 708 (e.g., shown in FIG. 7) to identify a pose of a user or another person in the user's environment or to identify a physical object in the user's environment.

With continued reference to FIG. 3, a pair of scanned-laser shaped-wavefront (e.g., for depth) light projector modules with display mirrors and optics configured to project light 338 into the eyes 302, 304 are shown. The depicted view also shows two miniature infrared cameras 324 paired with infrared light (such as light emitting diodes "LED"s), which are configured to be able to track the eyes 302, 304 of the user to support rendering and user input. The cameras 324 may be part of the inward-facing imaging system 462 shown in FIG. 4 The wearable system 200 can further feature a sensor assembly 339, which may comprise X, Y, and Z axis accelerometer capability as well as a magnetic compass and X, Y, and Z axis gyro capability, preferably providing data at a relatively high frequency, such as 200 Hz. The sensor assembly 339 may be part of the IMU described with reference to FIG. 2A The depicted system 200 can also comprise a head pose processor 336, such as an ASIC (application specific integrated circuit), FPGA (field programmable gate array), or ARM processor (advanced reduced-instruction-set machine), which may be configured to calculate real or near-real time user head pose from wide field of view image information output from the capture devices 316. The head pose processor 336 can be a hardware processor and can be implemented as part of the local processing and data module 260 shown in FIG. 2A.

The wearable system can also include one or more depth sensors 234. The depth sensor 234 can be configured to measure the distance between an object in an environment to a wearable device. The depth sensor 234 may include a laser scanner (e.g., a lidar), an ultrasonic depth sensor, or a depth sensing camera. In certain implementations, where the cameras 316 have depth sensing ability, the cameras 316 may also be considered as depth sensors 234.

Also shown is a processor 332 configured to execute digital or analog processing to derive pose from the gyro, compass, or accelerometer data from the sensor assembly 339. The processor 332 may be part of the local processing and data module 260 shown in FIG. 2. The wearable system 200 as shown in FIG. 3 can also include a position system such as, e.g., a GPS 337 (global positioning system) to assist with pose and positioning analyses. In addition, the GPS may further provide remotely-based (e.g., cloud-based) information about the user's environment. This information may be used for recognizing objects or information in user's environment.

The wearable system may combine data acquired by the GPS 337 and a remote computing system (such as, e.g., the remote processing module 270, another user's ARD, etc.) which can provide more information about the user's environment. As one example, the wearable system can determine the user's location based on GPS data and retrieve a world map (e.g., by communicating with a remote processing module 270) including virtual objects associated with the user's location. As another example, the wearable system 200 can monitor the environment using the world cameras 316 (which may be part of the outward-facing imaging system 464 shown in FIG. 4). Based on the images acquired by the world cameras 316, the wearable system 200 can detect objects in the environment (e.g., by using one or more object recognizers 708 shown in FIG. 7). The wearable system can further use data acquired by the GPS 337 to interpret the characters.

The wearable system 200 may also comprise a rendering engine 334 which can be configured to provide rendering information that is local to the user to facilitate operation of the scanners and imaging into the eyes of the user, for the user's view of the world. The rendering engine 334 may be implemented by a hardware processor (such as, e.g., a central processing unit or a graphics processing unit). In some embodiments, the rendering engine is part of the local processing and data module 260. The rendering engine 334 can be communicatively coupled (e.g., via wired or wireless links) to other components of the wearable system 200. For example, the rendering engine 334, can be coupled to the eye cameras 324 via communication link 274, and be coupled to a projecting subsystem 318 (which can project light into user's eyes 302, 304 via a scanned laser arrangement in a manner similar to a retinal scanning display) via the communication link 272. The rendering engine 334 can also be in communication with other processing units such as, e.g., the sensor pose processor 332 and the image pose processor 336 via links 276 and 294 respectively.

The cameras 324 (e.g., mini infrared cameras) may be utilized to track the eye pose to support rendering and user input. Some example eye poses may include where the user is looking or at what depth he or she is focusing (which may be estimated with eye vergence). The GPS 337, gyros, compass, and accelerometers 339 may be utilized to provide coarse or fast pose estimates. One or more of the cameras 316 can acquire images and pose, which in conjunction with data from an associated cloud computing resource, may be utilized to map the local environment and share user views with others.

The example components depicted in FIG. 3 are for illustration purposes only. Multiple sensors and other functional modules are shown together for ease of illustration and description. Some embodiments may include only one or a subset of these sensors or modules. Further, the locations of these components are not limited to the positions depicted in FIG. 3. Some components may be mounted to or housed within other components, such as a belt-mounted component, a hand-held component, or a helmet component. As one example, the image pose processor 336, sensor pose processor 332, and rendering engine 334 may be positioned in a beltpack and configured to communicate with other components of the wearable system via wireless communication, such as ultra-wideband, Wi-Fi, Bluetooth, etc., or via wired communication. The depicted housing 230 preferably is head-mountable and wearable by the user. However, some components of the wearable system 200 may be worn to other portions of the user's body. For example, the speaker 240 may be inserted into the ears of a user to provide sound to the user.

Regarding the projection of light 338 into the eyes 302, 304 of the user, in some embodiment, the cameras 324 may be utilized to measure where the centers of a user's eyes are geometrically verged to, which, in general, coincides with a position of focus, or "depth of focus", of the eyes. A 3-dimensional surface of all points the eyes verge to can be referred to as the "horopter". The focal distance may take on a finite number of depths, or may be infinitely varying. Light projected from the vergence distance appears to be focused to the subject eye 302, 304, while light in front of or behind the vergence distance is blurred. Examples of wearable devices and other display systems of the present disclosure are also described in U.S. Patent Publication No. 2016/0270656, which is incorporated by reference herein in its entirety.

The human visual system is complicated and providing a realistic perception of depth is challenging. Viewers of an object may perceive the object as being three-dimensional due to a combination of vergence and accommodation. Vergence movements (e.g., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic and comfortable simulations of three-dimensional imagery.

Further spatially coherent light with a beam diameter of less than about 0.7 millimeters can be correctly resolved by the human eye regardless of where the eye focuses. Thus, to create an illusion of proper focal depth, the eye vergence may be tracked with the cameras 324, and the rendering engine 334 and projection subsystem 318 may be utilized to render all objects on or close to the horopter in focus, and all other objects at varying degrees of defocus (e.g., using intentionally-created blurring). Preferably, the system 220 renders to the user at a frame rate of about 60 frames per second or greater. As described above, preferably, the cameras 324 may be utilized for eye tracking, and software may be configured to pick up not only vergence geometry but also focus location cues to serve as user inputs. Preferably, such a display system is configured with brightness and contrast suitable for day or night use.

In some embodiments, the display system preferably has latency of less than about 20 milliseconds for visual object alignment, less than about 0.1 degree of angular alignment, and about 1 arc minute of resolution, which, without being limited by theory, is believed to be approximately the limit of the human eye. The display system 220 may be integrated with a localization system, which may involve GPS elements, optical tracking, compass, accelerometers, or other data sources, to assist with position and pose determination;

localization information may be utilized to facilitate accurate rendering in the user's view of the pertinent world (e.g., such information would facilitate the glasses to know where they are with respect to the real world).

In some embodiments, the wearable system 200 is configured to display one or more virtual images based on the accommodation of the user's eyes. Unlike prior 3D display approaches that force the user to focus where the images are being projected, in some embodiments, the wearable system is configured to automatically vary the focus of projected virtual content to allow for a more comfortable viewing of one or more images presented to the user. For example, if the user's eyes have a current focus of 1 m, the image may be projected to coincide with the user's focus. If the user shifts focus to 3 m, the image is projected to coincide with the new focus. Thus, rather than forcing the user to a predetermined focus, the wearable system 200 of some embodiments allows the user's eye to a function in a more natural manner.

Such a wearable system 200 may eliminate or reduce the incidences of eye strain, headaches, and other physiological symptoms typically observed with respect to virtual reality devices. To achieve this, various embodiments of the wearable system 200 are configured to project virtual images at varying focal distances, through one or more variable focus elements (VFEs). In one or more embodiments, 3D perception may be achieved through a multi-plane focus system that projects images at fixed focal planes away from the user. Other embodiments employ variable plane focus, wherein the focal plane is moved back and forth in the z-direction to coincide with the user's present state of focus.

In both the multi-plane focus systems and variable plane focus systems, wearable system 200 may employ eye tracking to determine a vergence of the user's eyes, determine the user's current focus, and project the virtual image at the determined focus. In other embodiments, wearable system 200 comprises a light modulator that variably projects, through a fiber scanner, or other light generating source, light beams of varying focus in a raster pattern across the retina. Thus, the ability of the display of the wearable system 200 to project images at varying focal distances not only eases accommodation for the user to view objects in 3D, but may also be used to compensate for user ocular anomalies, as further described in U.S. Patent Publication No. 2016/0270656, which is incorporated by reference herein in its entirety. In some other embodiments, a spatial light modulator may project the images to the user through various optical components. For example, as described further below, the spatial light modulator may project the images onto one or more waveguides, which then transmit the images to the user.

Waveguide Stack Assembly

Figure 4:
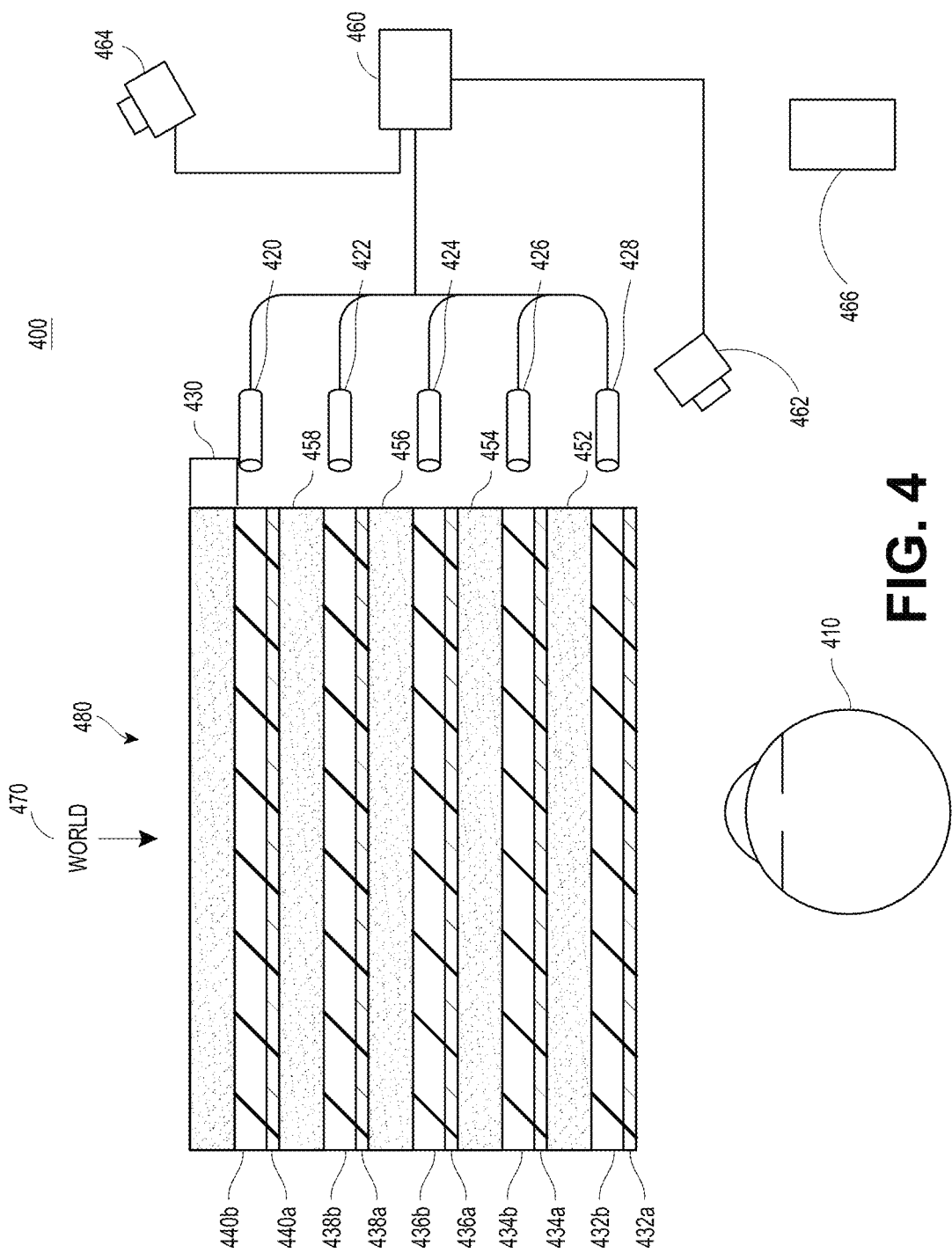
FIG. 4 schematically illustrates an example of a waveguide stack of a wearable device for outputting image information to a user.

FIG. 4 illustrates an example of a waveguide stack for outputting image information to a user. A wearable system 400 includes a stack of waveguides, or stacked waveguide assembly 480 that may be utilized to provide three-dimensional perception to the eye/brain using a plurality of waveguides 432b, 434b, 436b, 438b, 4400b. In some embodiments, the wearable system 400 may correspond to wearable system 200 of FIG. 2, with FIG. 4 schematically showing some parts of that wearable system 200 in greater detail. For example, in some embodiments, the waveguide assembly 480 may be integrated into the display 220 of FIG. 2.

With continued reference to FIG. 4, the waveguide assembly 480 may also include a plurality of features 458, 456, 454, 452 between the waveguides. In some embodiments, the features 458, 456, 454, 452 may be lenses. In other embodiments, the features 458, 456, 454, 452 may not be lenses. Rather, they may simply be spacers (e.g., cladding layers or structures for forming air gaps).

The waveguides 432b, 434b, 436b, 438b, 440b or the plurality of lenses 458, 456, 454, 452 may be configured to send image information to the eye with various levels of wavefront curvature or light ray divergence. Each waveguide level may be associated with a particular depth plane and may be configured to output image information corresponding to that depth plane. Image injection devices 420, 422, 424, 426, 428 may be utilized to inject image information into the waveguides 440b, 438b, 436b, 434b, 432b, each of which may be configured to distribute incoming light across each respective waveguide, for output toward the eye 410. Light exits an output surface of the image injection devices 420, 422, 424, 426, 428 and is injected into a corresponding input edge of the waveguides 440b, 438b, 436b, 434b, 432b. In some embodiments, a single beam of light (e.g., a collimated beam) may be injected into each waveguide to output an entire field of cloned collimated beams that are directed toward the eye 410 at particular angles (and amounts of divergence) corresponding to the depth plane associated with a particular waveguide.

In some embodiments, the image injection devices 420, 422, 424, 426, 428 are discrete displays that each produce image information for injection into a corresponding waveguide 440b, 438b, 436b, 434b, 432b, respectively. In some other embodiments, the image injection devices 420, 422, 424, 426, 428 are the output ends of a single multiplexed display which may, e.g., pipe image information via one or more optical conduits (such as fiber optic cables) to each of the image injection devices 420, 422, 424, 426, 428.

A controller 460 controls the operation of the stacked waveguide assembly 480 and the image injection devices 420, 422, 424, 426, 428. The controller 460 includes programming (e.g., instructions in a non-transitory computer-readable medium) that regulates the timing and provision of image information to the waveguides 440b, 438b, 436b, 434b, 432b. In some embodiments, the controller 460 may be a single integral device, or a distributed system connected by wired or wireless communication channels. The controller 460 may be part of the processing modules 260 or 270 (illustrated in FIG. 2) in some embodiments.

The waveguides 440b, 438b, 436b, 434b, 432b may be configured to propagate light within each respective waveguide by total internal reflection (TIR). The waveguides 440b, 438b, 436b, 434b, 432b may each be planar or have another shape (e.g., curved), with major top and bottom surfaces and edges extending between those major top and bottom surfaces. In the illustrated configuration, the waveguides 440b, 438b, 436b, 434b, 432b may each include light extracting optical elements 440a, 438a, 436a, 434a, 432a that are configured to extract light out of a waveguide by redirecting the light, propagating within each respective waveguide, out of the waveguide to output image information to the eye 410. Extracted light may also be referred to as outcoupled light, and light extracting optical elements may also be referred to as outcoupling optical elements. An extracted beam of light is outputted by the waveguide at locations at which the light propagating in the waveguide strikes a light redirecting element. The light extracting optical elements (440a, 438a, 436a, 434a, 432a) may, for example, be reflective or diffractive optical features. While illustrated disposed at the bottom major surfaces of the waveguides 440b, 438b, 436b, 434b, 432b for ease of description and drawing clarity, in some embodiments, the light extracting optical elements 440a, 438a, 436a, 434a, 432a may be disposed at the top or bottom major surfaces, or may be disposed directly in the volume of the waveguides 440b, 438b, 436b, 434b, 432b. In some embodiments, the light extracting optical elements 440a, 438a, 436a, 434a, 432a may be formed in a layer of material that is attached to a transparent substrate to form the waveguides 440b, 438b, 436b, 434b, 432b. In some other embodiments, the waveguides 440b, 438b, 436b, 434b, 432b may be a monolithic piece of material and the light extracting optical elements 440a, 438a, 436a, 434a, 432a may be formed on a surface or in the interior of that piece of material.

With continued reference to FIG. 4, as discussed herein, each waveguide 440b, 438b, 436b, 434b, 432b is configured to output light to form an image corresponding to a particular depth plane. For example, the waveguide 432b nearest the eye may be configured to deliver collimated light, as injected into such waveguide 432b, to the eye 410. The collimated light may be representative of the optical infinity focal plane. The next waveguide up 434b may be configured to send out collimated light which passes through the first lens 452 (e.g., a negative lens) before it can reach the eye 410. First lens 452 may be configured to create a slight convex wavefront curvature so that the eye/brain interprets light coming from that next waveguide up 434b as coming from a first focal plane closer inward toward the eye 410 from optical infinity. Similarly, the third up waveguide 436b passes its output light through both the first lens 452 and second lens 454 before reaching the eye 410. The combined optical power of the first and second lenses 452 and 454 may be configured to create another incremental amount of wavefront curvature so that the eye/brain interprets light coming from the third waveguide 436b as coming from a second focal plane that is even closer inward toward the person from optical infinity than was light from the next waveguide up 434b.

The other waveguide layers (e.g., waveguides 438b, 440b) and lenses (e.g., lenses 456, 458) are similarly configured, with the highest waveguide 440b in the stack sending its output through all of the lenses between it and the eye for an aggregate focal power representative of the closest focal plane to the person. To compensate for the stack of lenses 458, 456, 454, 452 when viewing/interpreting light coming from the world 470 on the other side of the stacked waveguide assembly 480, a compensating lens layer 430 may be disposed at the top of the stack to compensate for the aggregate power of the lens stack 458, 456, 454, 452 below. Such a configuration provides as many perceived focal planes as there are available waveguide/lens pairings. Both the light extracting optical elements of the waveguides and the focusing aspects of the lenses may be static (e.g., not dynamic or electro-active). In some alternative embodiments, either or both may be dynamic using electro-active features.

With continued reference to FIG. 4, the light extracting optical elements 440a, 438a, 436a, 434a, 432a may be configured to both redirect light out of their respective waveguides and to output this light with the appropriate amount of divergence or collimation for a particular depth plane associated with the waveguide. As a result, waveguides having different associated depth planes may have different configurations of light extracting optical elements, which output light with a different amount of divergence depending on the associated depth plane. In some embodiments, as discussed herein, the light extracting optical elements 440a, 438a, 436a, 434a, 432a may be volumetric or surface features, which may be configured to output light at specific angles. For example, the light extracting optical elements 440a, 438a, 436a, 434a, 432a may be volume holograms, surface holograms, and/or diffraction gratings. Light extracting optical elements, such as diffraction gratings, are described in U.S. Patent Publication No. 2015/0178939, published Jun. 25, 2015, which is incorporated by reference herein in its entirety.

In some embodiments, the light extracting optical elements 440a, 438a, 436a, 434a, 432a are diffractive features that form a diffraction pattern, or "diffractive optical element" (also referred to herein as a "DOE"). Preferably, the DOE has a relatively low diffraction efficiency so that only a portion of the light of the beam is deflected away toward the eye 410 with each intersection of the DOE, while the rest continues to move through a waveguide via total internal reflection. The light carrying the image information can thus be divided into a number of related exit beams that exit the waveguide at a multiplicity of locations and the result is a fairly uniform pattern of exit emission toward the eye 304 for this particular collimated beam bouncing around within a waveguide.

In some embodiments, one or more DOEs may be switchable between "on" state in which they actively diffract, and "off" state in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

In some embodiments, the number and distribution of depth planes or depth of field may be varied dynamically based on the pupil sizes or orientations of the eyes of the viewer. Depth of field may change inversely with a viewer's pupil size. As a result, as the sizes of the pupils of the viewer's eyes decrease, the depth of field increases such that one plane that is not discernible because the location of that plane is beyond the depth of focus of the eye may become discernible and appear more in focus with reduction of pupil size and commensurate with the increase in depth of field. Likewise, the number of spaced apart depth planes used to present different images to the viewer may be decreased with the decreased pupil size. For example, a viewer may not be able to clearly perceive the details of both a first depth plane and a second depth plane at one pupil size without adjusting the accommodation of the eye away from one depth plane and to the other depth plane. These two depth planes may, however, be sufficiently in focus at the same time to the user at another pupil size without changing accommodation.

In some embodiments, the display system may vary the number of waveguides receiving image information based upon determinations of pupil size or orientation, or upon receiving electrical signals indicative of particular pupil size or orientation. For example, if the user's eyes are unable to distinguish between two depth planes associated with two waveguides, then the controller 460 (which may be an embodiment of the local processing and data module 260) can be configured or programmed to cease providing image information to one of these waveguides. Advantageously, this may reduce the processing burden on the system, thereby increasing the responsiveness of the system. In embodiments in which the DOEs for a waveguide are switchable between the on and off states, the DOEs may be switched to the off state when the waveguide does receive image information.

In some embodiments, it may be desirable to have an exit beam meet the condition of having a diameter that is less than the diameter of the eye of a viewer. However, meeting this condition may be challenging in view of the variability in size of the viewer's pupils. In some embodiments, this condition is met over a wide range of pupil sizes by varying the size of the exit beam in response to determinations of the size of the viewer's pupil. For example, as the pupil size decreases, the size of the exit beam may also decrease. In some embodiments, the exit beam size may be varied using a variable aperture.

The wearable system 400 can include an outward-facing imaging system 464 (e.g., a digital camera) that images a portion of the world 470. This portion of the world 470 may be referred to as the field of view (FOV) of a world camera and the imaging system 464 is sometimes referred to as an FOV camera. The FOV of the world camera may or may not be the same as the FOV of a viewer 210 which encompasses a portion of the world 470 the viewer 210 perceives at a given time. For example, in some situations, the FOV of the world camera may be larger than the viewer 210 of the viewer 210 of the wearable system 400. The entire region available for viewing or imaging by a viewer may be referred to as the field of regard (FOR). The FOR may include 4π steradians of solid angle surrounding the wearable system 400 because the wearer can move his body, head, or eyes to perceive substantially any direction in space. In other contexts, the wearer's movements may be more constricted, and accordingly the wearer's FOR may subtend a smaller solid angle. Images obtained from the outward-facing imaging system 464 can be used to track gestures made by the user (e.g., hand or finger gestures), detect objects in the world 470 in front of the user, and so forth.

The wearable system 400 can include an audio sensor 232, e.g., a microphone, to capture ambient sound. As described above, in some embodiments, one or more other audio sensors can be positioned to provide stereo sound reception useful to the determination of location of a speech source. The audio sensor 232 can comprise a directional microphone, as another example, which can also provide such useful directional information as to where the audio source is located. The wearable system 400 can use information from both the outward-facing imaging system 464 and the audio sensor 230 in locating a source of speech, or to determine an active speaker at a particular moment in time, etc. For example, the wearable system 400 can use the voice recognition alone or in combination with a reflected image of the speaker (e.g., as seen in a mirror) to determine the identity of the speaker. As another example, the wearable system 400 can determine a position of the speaker in an environment based on sound acquired from directional microphones. The wearable system 400 can parse the sound coming from the speaker's position with speech recognition algorithms to determine the content of the speech and use voice recognition techniques to determine the identity (e.g., name or other demographic information) of the speaker.

The wearable system 400 can also include an inward-facing imaging system 466 (e.g., a digital camera), which observes the movements of the user, such as the eye movements and the facial movements. The inward-facing imaging system 466 may be used to capture images of the eye 410 to determine the size and/or orientation of the pupil of the eye 304. The inward-facing imaging system 466 can be used to obtain images for use in determining the direction the user is looking (e.g., eye pose) or for biometric identification of the user (e.g., via iris identification). In some embodiments, at least one camera may be utilized for each eye, to separately determine the pupil size or eye pose of each eye independently, thereby allowing the presentation of image information to each eye to be dynamically tailored to that eye. In some other embodiments, the pupil diameter or orientation of only a single eye 410 (e.g., using only a single camera per pair of eyes) is determined and assumed to be similar for both eyes of the user. The images obtained by the inward-facing imaging system 466 may be analyzed to determine the user's eye pose or mood, which can be used by the wearable system 400 to decide which audio or visual content should be presented to the user. The wearable system 400 may also determine head pose (e.g., head position or head orientation) using sensors such as IMUs, accelerometers, gyroscopes, etc.

The wearable system 400 can include a user input device 466 by which the user can input commands to the controller 460 to interact with the wearable system 400. For example, the user input device 466 can include a trackpad, a touchscreen, a joystick, a multiple degree-of-freedom (DOF) controller, a capacitive sensing device, a game controller, a keyboard, a mouse, a directional pad (D-pad), a wand, a haptic device, a totem (e.g., functioning as a virtual user input device), and so forth. A multi-DOF controller can sense user input in some or all possible translations (e.g., left/right, forward/backward, or up/down) or rotations (e.g., yaw, pitch, or roll) of the controller. A multi-DOF controller which supports the translation movements may be referred to as a 3DOF while a multi-DOF controller which supports the translations and rotations may be referred to as 6DOF. In some cases, the user may use a finger (e.g., a thumb) to press or swipe on a touch-sensitive input device to provide input to the wearable system 400 (e.g., to provide user input to a user interface provided by the wearable system 400). The user input device 466 may be held by the user's hand during the use of the wearable system 400. The user input device 466 can be in wired or wireless communication with the wearable system 400.

Other Components of the Wearable System

In many implementations, the wearable system may include other components in addition or in alternative to the components of the wearable system described above. The wearable system may, for example, include one or more haptic devices or components. The haptic devices or components may be operable to provide a tactile sensation to a user. For example, the haptic devices or components may provide a tactile sensation of pressure or texture when touching virtual content (e.g., virtual objects, virtual tools, other virtual constructs). The tactile sensation may replicate a feel of a physical object which a virtual object represents, or may replicate a feel of an imagined object or character (e.g., a dragon) which the virtual content represents. In some implementations, haptic devices or components may be worn by the user (e.g., a user wearable glove). In some implementations, haptic devices or components may be held by the user.

The wearable system may, for example, include one or more physical objects which are manipulable by the user to allow input or interaction with the wearable system. These physical objects may be referred to herein as totems. Some totems may take the form of inanimate objects, such as for example, a piece of metal or plastic, a wall, a surface of table. In certain implementations, the totems may not actually have any physical input structures (e.g., keys, triggers, joystick, trackball, rocker switch). Instead, the totem may simply provide a physical surface, and the wearable system may render a user interface so as to appear to a user to be on one or more surfaces of the totem. For example, the wearable system may render an image of a computer keyboard and trackpad to appear to reside on one or more surfaces of a totem. For example, the wearable system may render a virtual computer keyboard and virtual trackpad to appear on a surface of a thin rectangular plate of aluminum which serves as a totem. The rectangular plate does not itself have any physical keys or trackpad or sensors. However, the wearable system may detect user manipulation or interaction or touches with the rectangular plate as selections or inputs made via the virtual keyboard or virtual trackpad. The user input device 466 (shown in FIG. 4) may be an embodiment of a totem, which may include a trackpad, a touchpad, a trigger, a joystick, a trackball, a rocker or virtual switch, a mouse, a keyboard, a multi-degree-of-freedom controller, or another physical input device. A user may use the totem, alone or in combination with poses, to interact with the wearable system or other users.

Examples of haptic devices and totems usable with the wearable devices, HMD, and display systems of the present disclosure are described in U.S. Patent Publication No. 2015/0016777, which is incorporated by reference herein in its entirety.

Example Processes of User Interactions with a Wearable System

Figure 5:
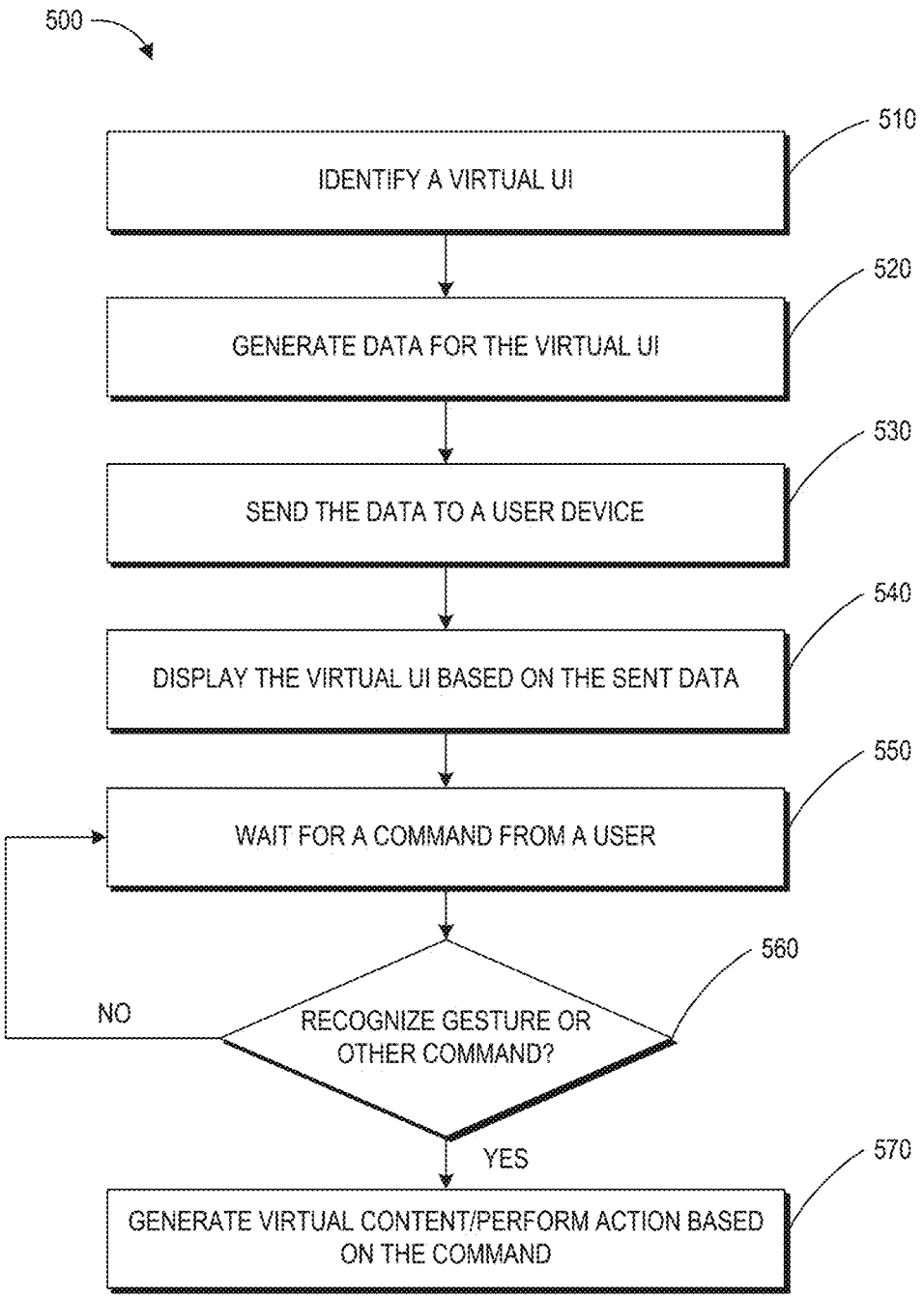
FIG. 5 is a process flow diagram of an example of a method for interacting with a virtual user interface.

FIG. 5 is a process flow diagram of an example of a method 500 for interacting with a virtual user interface. The method 500 may be performed by the wearable system described herein. Embodiments of the method 500 can be used by the wearable system to detect persons or documents in the FOV of the wearable system.

At block 510, the wearable system may identify a particular UI. The type of UI may be predetermined by the user. The wearable system may identify that a particular UI needs to be populated based on a user input (e.g., gesture, visual data, audio data, sensory data, direct command, etc.). The UI can be specific to a security scenario where the wearer of the system is observing users who present documents to the wearer (e.g., at a travel checkpoint). At block 520, the wearable system may generate data for the virtual UI. For example, data associated with the confines, general structure, shape of the UI etc., may be generated. In addition, the wearable system may determine map coordinates of the user's physical location so that the wearable system can display the UI in relation to the user's physical location. For example, if the UI is body centric, the wearable system may determine the coordinates of the user's physical stance, head pose, or eye pose such that a ring UI can be displayed around the user or a planar UI can be displayed on a wall or in front of the user. In the security context described herein, the UI may be displayed as if the UI were surrounding the traveler who is presenting documents to the wearer of the system, so that the wearer can readily view the UI while looking at the traveler and the traveler's documents. If the UI is hand centric, the map coordinates of the user's hands may be determined. These map points may be derived through data received through the FOV cameras, sensory input, or any other type of collected data.

At block 530, the wearable system may send the data to the display from the cloud or the data may be sent from a local database to the display components. At block 540, the UI is displayed to the user based on the sent data. For example, a light field display can project the virtual UI into one or both of the user's eyes. Once the virtual UI has been created, the wearable system may simply wait for a command from the user to generate more virtual content on the virtual UI at block 550. For example, the UI may be a body centric ring around the user's body or the body of a person in the user's environment (e.g., a traveler). The wearable system may then wait for the command (a gesture, a head or eye movement, voice command, input from a user input device, etc.), and if it is recognized (block 560), virtual content associated with the command may be displayed to the user (block 570).

Examples of Avatar Rendering in Mixed Reality

A wearable system may employ various mapping related techniques in order to achieve high depth of field in the rendered light fields. In mapping out the virtual world, it is advantageous to know all the features and points in the real world to accurately portray virtual objects in relation to the real world. To this end, FOV images captured from users of the wearable system can be added to a world model by including new pictures that convey information about various points and features of the real world. For example, the wearable system can collect a set of map points (such as 2D points or 3D points) and find new map points to render a more accurate version of the world model. The world model of a first user can be communicated (e.g., over a network such as a cloud network) to a second user so that the second user can experience the world surrounding the first user.

Figure 6A:
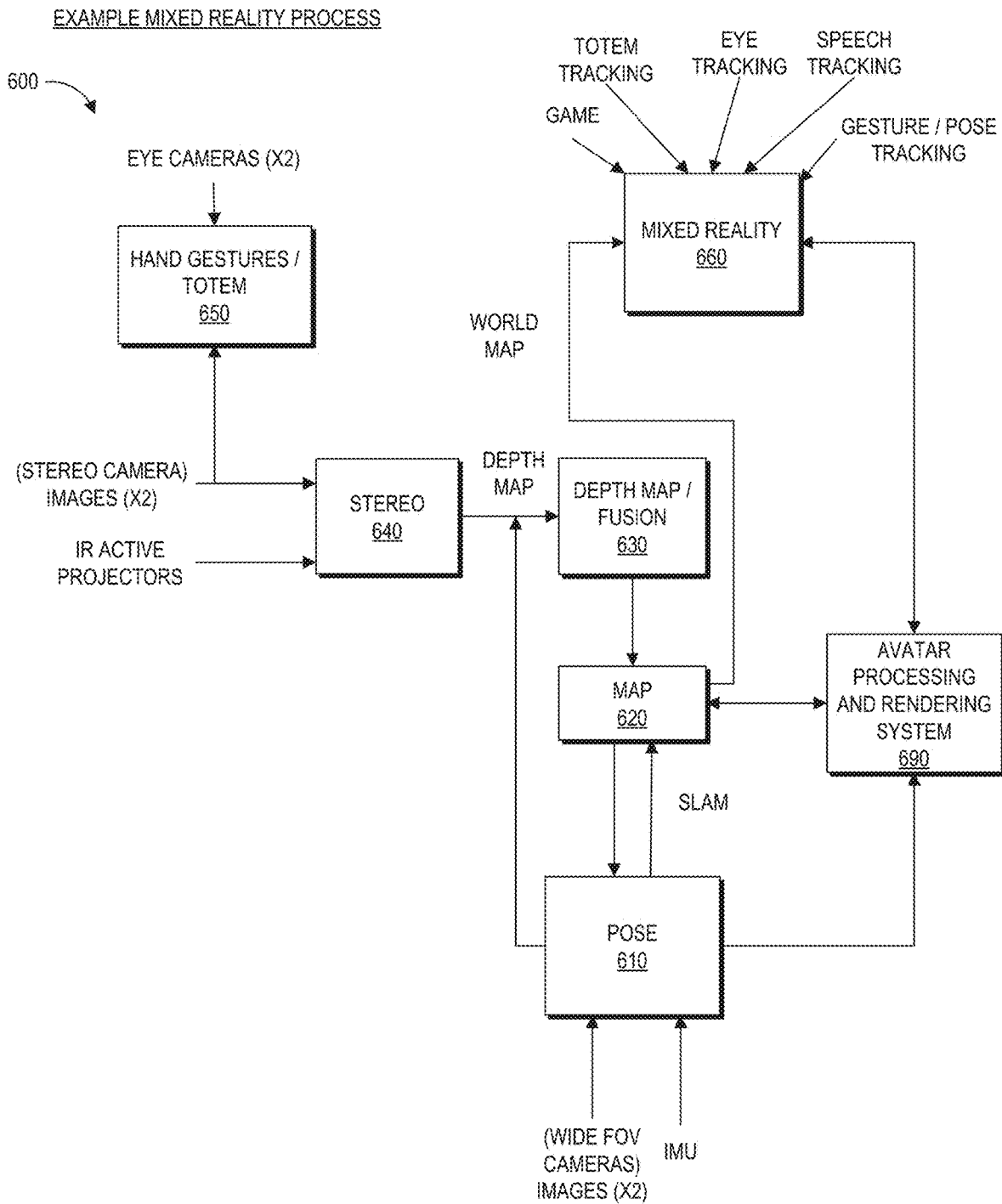
FIG. 6A is a block diagram of another example of a wearable system which can comprise an avatar processing and rendering system.

FIG. 6A is a block diagram of another example of a wearable system which can comprise an avatar processing and rendering system 690 in a mixed reality environment. The wearable system 600 may be part of the wearable system 200 shown in FIG. 2. In this example, the wearable system 600 can comprise a map 620, which may include at least a portion of the data in the map database 710 (shown in FIG. 7). The map may partly reside locally on the wearable system, and may partly reside at networked storage locations accessible by wired or wireless network (e.g., in a cloud system). A pose process 610 may be executed on the wearable computing architecture (e.g., processing module 260 or controller 460) and utilize data from the map 620 to determine position and orientation of the wearable computing hardware or user. Pose data may be computed from data collected on the fly as the user is experiencing the system and operating in the world. The data may comprise images, data from sensors (such as inertial measurement units, which generally comprise accelerometer and gyroscope components) and surface information pertinent to objects in the real or virtual environment.

A sparse point representation may be the output of a simultaneous localization and mapping (e.g., SLAM or vSLAM, referring to a configuration wherein the input is images/visual only) process. The system can be configured to not only find out where in the world the various components are, but what the world is made of. Pose may be a building block that achieves many goals, including populating the map and using the data from the map.

In one embodiment, a sparse point position may not be completely adequate on its own, and further information may be needed to produce a multifocal AR, VR, or MR experience. Dense representations, generally referring to depth map information, may be utilized to fill this gap at least in part. Such information may be computed from a process referred to as Stereo 640, wherein depth information is determined using a technique such as triangulation or time-of-flight sensing. Image information and active patterns (such as infrared patterns created using active projectors), images acquired from image cameras, or hand gestures/totem 650 may serve as input to the Stereo process 640. A significant amount of depth map information may be fused together, and some of this may be summarized with a surface representation. For example, mathematically definable surfaces may be efficient (e.g., relative to a large point cloud) and digestible inputs to other processing devices like game engines. Thus, the output of the stereo process (e.g., a depth map) 640 may be combined in the fusion process 630. Pose 610 may be an input to this fusion process 630 as well, and the output of fusion 630 becomes an input to populating the map process 620. Sub-surfaces may connect with each other, such as in topographical mapping, to form larger surfaces, and the map becomes a large hybrid of points and surfaces.

To resolve various aspects in a mixed reality process 660, various inputs may be utilized. For example, in the embodiment depicted in FIG. 6A, Game parameters may be inputs to determine that the user of the system is playing a monster battling game with one or more monsters at various locations, monsters dying or running away under various conditions (such as if the user shoots the monster), walls or other objects at various locations, and the like. The world map may include information regarding the location of the objects or semantic information of the objects (e.g., classifications such as whether the object is flat or round, horizontal or vertical, a table or a lamp, etc.) and the world map can be another valuable input to mixed reality. Pose relative to the world becomes an input as well and plays a key role to almost any interactive system.

Controls or inputs from the user are another input to the wearable system 600. As described herein, user inputs can include visual input, gestures, totems, audio input, sensory input, etc. In order to move around or play a game, for example, the user may need to instruct the wearable system 600 regarding what he or she wants to do. Beyond just moving oneself in space, there are various forms of user controls that may be utilized. In one embodiment, a totem (e.g. a user input device), or an object such as a toy gun may be held by the user and tracked by the system. The system preferably will be configured to know that the user is holding the item and understand what kind of interaction the user is having with the item (e.g., if the totem or object is a gun, the system may be configured to understand location and orientation, as well as whether the user is clicking a trigger or other sensed button or element which may be equipped with a sensor, such as an IMU, which may assist in determining what is going on, even when such activity is not within the field of view of any of the cameras.)

Hand gesture tracking or recognition may also provide input information. The wearable system 600 may be configured to track and interpret hand gestures for button presses, for gesturing left or right, stop, grab, hold, etc. For example, in one configuration, the user may want to flip through emails or a calendar in a non-gaming environment, or do a "fist bump" with another person or player. The wearable system 600 may be configured to leverage a minimum amount of hand gesture, which may or may not be dynamic. For example, the gestures may be simple static gestures like open hand for stop, thumbs up for ok, thumbs down for not ok; or a hand flip right, or left, or up/down for directional commands.

Eye tracking is another input (e.g., tracking where the user is looking to control the display technology to render at a specific depth or range). In one embodiment, vergence of the eyes may be determined using triangulation, and then using a vergence/accommodation model developed for that particular person, accommodation may be determined. Eye tracking can be performed by the eye camera(s) to determine eye gaze (e.g., direction or orientation of one or both eyes). Other techniques can be used for eye tracking such as, e.g., measurement of electrical potentials by electrodes placed near the eye(s) (e.g., electrooculography).

Speech tracking can be another input can be used alone or in combination with other inputs (e.g., totem tracking, eye tracking, gesture tracking, etc.). Speech tracking may include speech recognition, voice recognition, alone or in combination. The system 600 can include an audio sensor (e.g., a microphone) that receives an audio stream from the environment. The system 600 can incorporate voice recognition technology to determine who is speaking (e.g., whether the speech is from the wearer of the ARD or another person or voice (e.g., a recorded voice transmitted by a loudspeaker in the environment)) as well as speech recognition technology to determine what is being said. The local data & processing module 260 or the remote processing module 270 can process the audio data from the microphone (or audio data in another stream such as, e.g., a video stream being watched by the user) to identify content of the speech by applying various speech recognition algorithms, such as, e.g., hidden Markov models, dynamic time warping (DTW)-based speech recognitions, neural networks, deep learning algorithms such as deep feedforward and recurrent neural networks, end-to-end automatic speech recognitions, machine learning algorithms (described with reference to FIG. 7), or other algorithms that uses acoustic modeling or language modeling, etc.

The local data & processing module 260 or the remote processing module 270 can also apply voice recognition algorithms which can identify the identity of the speaker, such as whether the speaker is the user 210 of the wearable system 600 or another person with whom the user is conversing. Some example voice recognition algorithms can include frequency estimation, hidden Markov models, Gaussian mixture models, pattern matching algorithms, neural networks, matrix representation, Vector Quantization, speaker diarisation, decision trees, and dynamic time warping (DTW) technique. Voice recognition techniques can also include anti-speaker techniques, such as cohort models, and world models. Spectral features may be used in representing speaker characteristics. The local data & processing module or the remote data processing module 270 can use various machine learning algorithms described with reference to FIG. 7 to perform the voice recognition.

An implementation of a wearable system can use these user controls or inputs via a UI. UI elements (e.g., controls, popup windows, bubbles, data entry fields, etc.) can be used, for example, to dismiss a display of information, e.g., graphics or semantic information of an object.

With regard to the camera systems, the example wearable system 600 shown in FIG. 6A can include three pairs of cameras: a relative wide FOV or passive SLAM pair of cameras arranged to the sides of the user's face, a different pair of cameras oriented in front of the user to handle the stereo imaging process 640 and also to capture hand gestures and totem/object tracking in front of the user's face. The FOV cameras and the pair of cameras for the stereo process 640 may be a part of the outward-facing imaging system 464 (shown in FIG. 4). The wearable system 600 can include eye tracking cameras (which may be a part of an inward-facing imaging system 462 shown in FIG. 4) oriented toward the eyes of the user in order to triangulate eye vectors and other information. The wearable system 600 may also comprise one or more textured light projectors (such as infrared (IR) projectors) to inject texture into a scene.

The wearable system 600 can comprise an avatar processing and rendering system 690. The avatar processing and rendering system 690 can be configured to generate, update, animate, and render an avatar based on contextual information. Some or all of the avatar processing and rendering system 690 can be implemented as part of the local processing and data module 260 or the remote processing module 262, 264 alone or in combination. In various embodiments, multiple avatar processing and rendering systems 690 (e.g., as implemented on different wearable devices) can be used for rendering the virtual avatar 670. For example, a first user's wearable device may be used to determine the first user's intent, while a second user's wearable device can determine an avatar's characteristics and render the avatar of the first user based on the intent received from the first user's wearable device. The first user's wearable device and the second user's wearable device (or other such wearable devices) can communicate via a network, for example, as will be described with reference to FIGS. 9A and 9B.

Figure 6B:
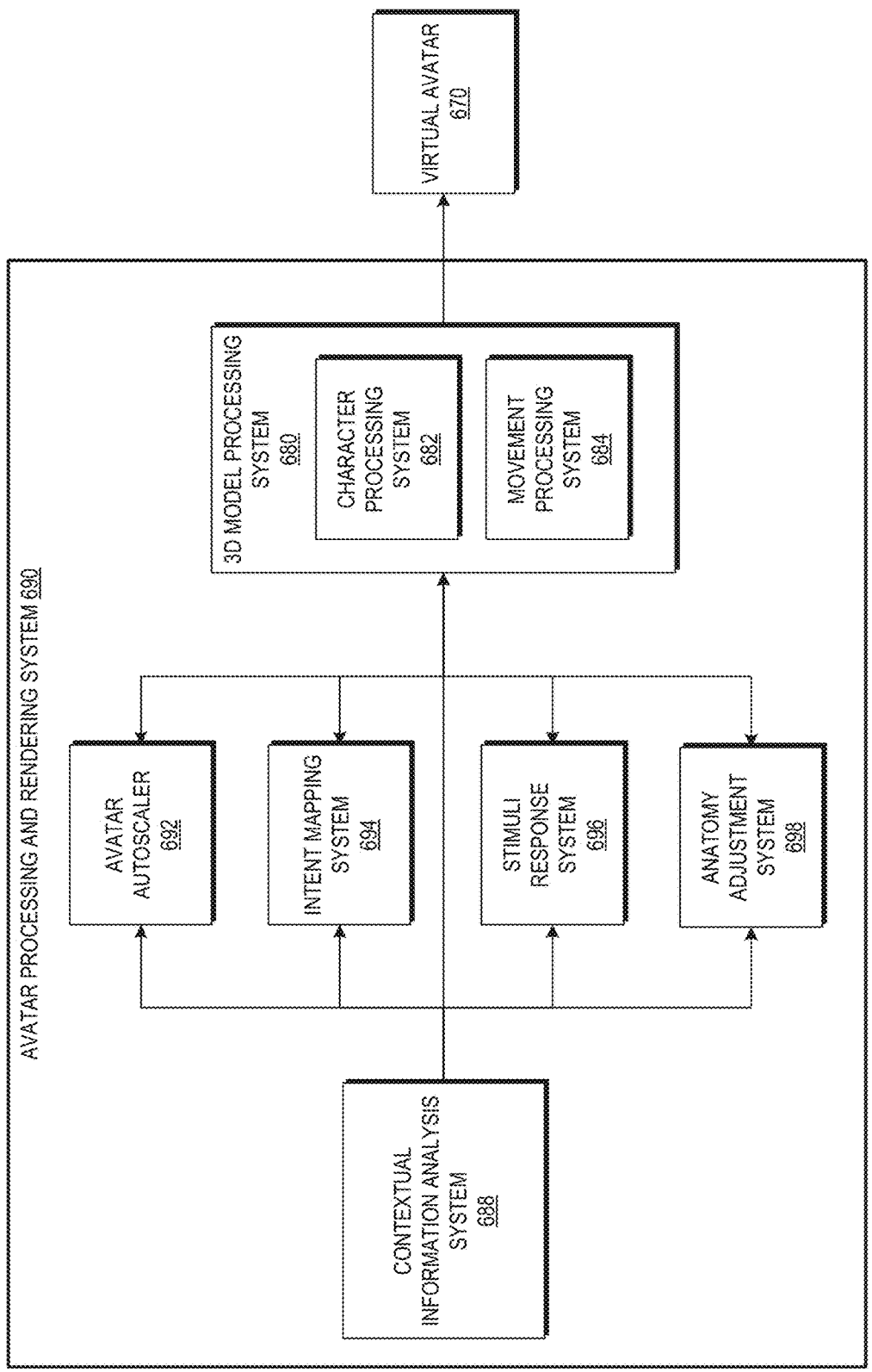
FIG. 6B illustrates example components of an avatar processing and rendering system.

FIG. 6B illustrates an example avatar processing and rendering system 690. The example avatar processing and rendering system 690 can comprise a 3D model processing system 680, a contextual information analysis system 688, an avatar autoscaler 692, an intent mapping system 694, an anatomy adjustment system 698, a stimuli response system 696, alone or in combination. The system 690 is intended to illustrate functionalities for avatar processing and rendering and is not intended to be limiting. For example, in certain implementations, one or more of these systems may be part of another system. For example, portions of the contextual information analysis system 688 may be part of the avatar autoscaler 692, intent mapping system 694, stimuli response system 696, or anatomy adjustment system 698, individually or in combination.

The contextual information analysis system 688 can be configured to determine environment and object information based on one or more device sensors described with reference to FIGS. 2 and 3. For example, the contextual information analysis system 688 can analyze environments and objects (including physical or virtual objects) of a user's environment or an environment in which the user's avatar is rendered, using images acquired by the outward-facing imaging system 464 of the user or the viewer of the user's avatar. The contextual information analysis system 688 can analyze such images alone or in combination with a data acquired from location data or world maps (e.g., maps 620, 710, 910) to determine the location and layout of objects in the environments. The contextual information analysis system 688 can also access biological features of the user or human in general for animating the virtual avatar 670 realistically. For example, the contextual information analysis system 688 can generate a discomfort curve which can be applied to the avatar such that a portion of the user's avatar's body (e.g., the head) is not at an uncomfortable (or unrealistic) position with respect to the other portions of the user's body (e.g., the avatar's head is not turned 270 degrees). In certain implementations, one or more object recognizers 708 (shown in FIG. 7) may be implemented as part of the contextual information analysis system 688.

The avatar autoscaler 692, the intent mapping system 694, and the stimuli response system 696, and anatomy adjustment system 698 can be configured to determine the avatar's characteristics based on contextual information. Some example characteristics of the avatar can include the size, appearance, position, orientation, movement, pose, expression, etc. The avatar autoscaler 692 can be configured to automatically scale the avatar such that the user does not have to look at the avatar at an uncomfortable pose. For example, the avatar autoscaler 692 can increase or decrease the size of the avatar to bring the avatar to the user's eye level such that the user does not need to look down at the avatar or look up at the avatar respectively. The intent mapping system 694 can determine an intent of a user's interaction and map the intent to an avatar (rather than the exact user interaction) based on the environment that the avatar is rendered in. For example, an intent of a first user may be to communicate with a second user in a telepresence session (see, e.g., FIG. 9B). Typically, two people face each other when communicating. The intent mapping system 694 of the first user's wearable system can determine that such a face-to-face intent exists during the telepresence session and can cause the first user's wearable system to render the second user's avatar to be facing the first user. If the second user were to physically turn around, instead of rendering the second user's avatar in a turned position (which would cause the back of the second user's avatar to be rendered to the first user), the first user's intent mapping system 694 can continue to render the second avatar's face to the first user, which is the inferred intent of the telepresence session (e.g., face-to-face intent in this example).

The stimuli response system 696 can identify an object of interest in the environment and determine an avatar's response to the object of interest. For example, the stimuli response system 696 can identify a sound source in an avatar's environment and automatically turn the avatar to look at the sound source. The stimuli response system 696 can also determine a threshold termination condition. For example, the stimuli response system 696 can cause the avatar to go back to its original pose after the sound source disappears or after a period of time has elapsed.

The anatomy adjustment system 698 can be configured to adjust the user's pose based on biological features. For example, the anatomy adjustment system 698 can be configured to adjust relative positions between the user's head and the user's torso or between the user's upper body and lower body based on a discomfort curve.

The 3D model processing system 680 can be configured to animate and cause the display 220 to render a virtual avatar 670. The 3D model processing system 680 can include a virtual character processing system 682 and a movement processing system 684. The virtual character processing system 682 can be configured to generate and update a 3D model of a user (for creating and animating the virtual avatar). The movement processing system 684 can be configured to animate the avatar, such as, e.g., by changing the avatar's pose, by moving the avatar around in a user's environment, or by animating the avatar's facial expressions, etc. As will further be described herein, the virtual avatar can be animated using rigging techniques. In some embodiments, an avatar is represented in two parts: a surface representation (e.g., a deformable mesh) that is used to render the outward appearance of the virtual avatar and a hierarchical set of interconnected joints (e.g., a core skeleton) for animating the mesh. In some implementations, the virtual character processing system 682 can be configured to edit or generate surface representations, while the movement processing system 684 can be used to animate the avatar by moving the avatar, deforming the mesh, etc. At least one of the virtual character processing system 682 or the movement processing system 684 can be configured to implement the techniques described with reference to FIGS. 11-18 to provide realistic facial expressions and transitions between the facial expressions.

Examples of Mapping a User's Environment

Figure 7:
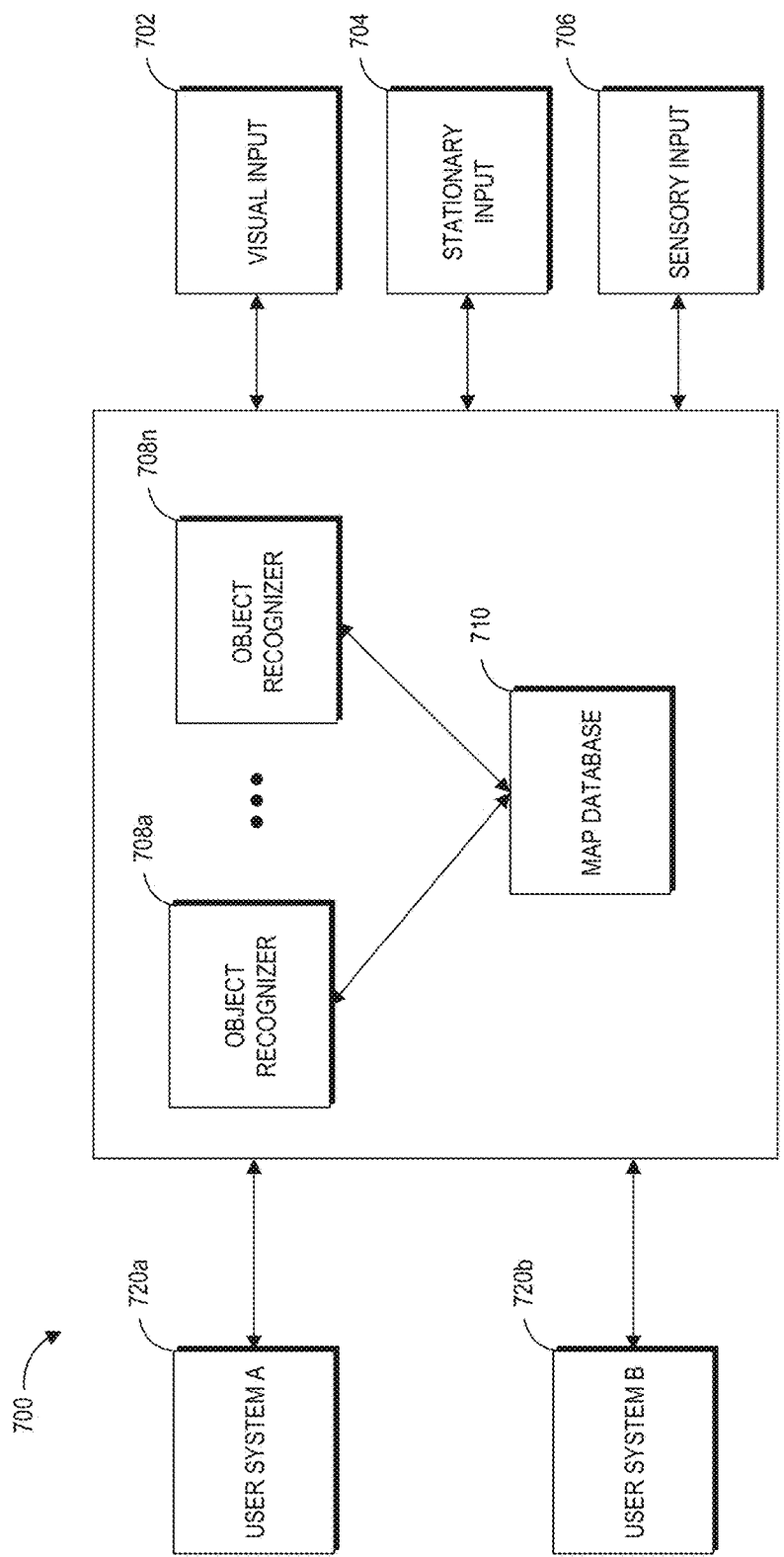
FIG. 7 is a block diagram of an example of a wearable system including various inputs into the wearable system.

FIG. 7 is a block diagram of an example of an MR environment 700. The MR environment 700 may be configured to receive input (e.g., visual input 702 from the user's wearable system, stationary input 704 such as room cameras, sensory input 706 from various sensors, gestures, totems, eye tracking, user input from the user input device 466 etc.) from one or more user wearable systems (e.g., wearable system 200 or display system 220) or stationary room systems (e.g., room cameras, etc.). The wearable systems can use various sensors (e.g., accelerometers, gyroscopes, temperature sensors, movement sensors, depth sensors, GPS sensors, inward-facing imaging system, outward-facing imaging system, etc.) to determine the location and various other attributes of the environment of the user. This information may further be supplemented with information from stationary cameras in the room that may provide images or various cues from a different point of view. The image data acquired by the cameras (such as the room cameras and/or the cameras of the outward-facing imaging system) may be reduced to a set of mapping points.

One or more object recognizers 708 can crawl through the received data (e.g., the collection of points) and recognize or map points, tag images, attach semantic information to objects with the help of a map database 710. The map database 710 may comprise various points collected over time and their corresponding objects. The various devices and the map database can be connected to each other through a network (e.g., LAN, WAN, etc.) to access the cloud.

Based on this information and collection of points in the map database, the object recognizers 708a to 708n may recognize objects in an environment. For example, the object recognizers can recognize faces, persons, windows, walls, user input devices, televisions, documents (e.g., travel tickets, driver's license, passport as described in the security examples herein), other objects in the user's environment, etc. One or more object recognizers may be specialized for object with certain characteristics. For example, the object recognizer 708a may be used to recognizer faces, while another object recognizer may be used recognize documents.

The object recognitions may be performed using a variety of computer vision techniques. For example, the wearable system can analyze the images acquired by the outward-facing imaging system 464 (shown in FIG. 4) to perform scene reconstruction, event detection, video tracking, object recognition (e.g., persons or documents), object pose estimation, facial recognition (e.g., from a person in the environment or an image on a document), learning, indexing, motion estimation, or image analysis (e.g., identifying indicia within documents such as photos, signatures, identification information, travel information, etc.), and so forth. One or more computer vision algorithms may be used to perform these tasks. Non-limiting examples of computer vision algorithms include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

The object recognitions can additionally or alternatively be performed by a variety of machine learning algorithms. Once trained, the machine learning algorithm can be stored by the HMD. Some examples of machine learning algorithms can include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), and/or other machine learning algorithms. In some embodiments, individual models can be customized for individual data sets. For example, the wearable device can generate or store a base model. The base model may be used as a starting point to generate additional models specific to a data type (e.g., a particular user in the telepresence session), a data set (e.g., a set of additional images obtained of the user in the telepresence session), conditional situations, or other variations. In some embodiments, the wearable HMD can be configured to utilize a plurality of techniques to generate models for analysis of the aggregated data. Other techniques may include using pre-defined thresholds or data values.

Based on this information and collection of points in the map database, the object recognizers 708a to 708n may recognize objects and supplement objects with semantic information to give life to the objects. For example, if the object recognizer recognizes a set of points to be a door, the system may attach some semantic information (e.g., the door has a hinge and has a 90 degree movement about the hinge). If the object recognizer recognizes a set of points to be a mirror, the system may attach semantic information that the mirror has a reflective surface that can reflect images of objects in the room. The semantic information can include affordances of the objects as described herein. For example, the semantic information may include a normal of the object. The system can assign a vector whose direction indicates the normal of the object. Over time the map database grows as the system (which may reside locally or may be accessible through a wireless network) accumulates more data from the world. Once the objects are recognized, the information may be transmitted to one or more wearable systems. For example, the MR environment 700 may include information about a scene happening in California. The environment 700 may be transmitted to one or more users in New York. Based on data received from an FOV camera and other inputs, the object recognizers and other software components can map the points collected from the various images, recognize objects etc., such that the scene may be accurately "passed over" to a second user, who may be in a different part of the world. The environment 700 may also use a topological map for localization purposes.

Figure 8:
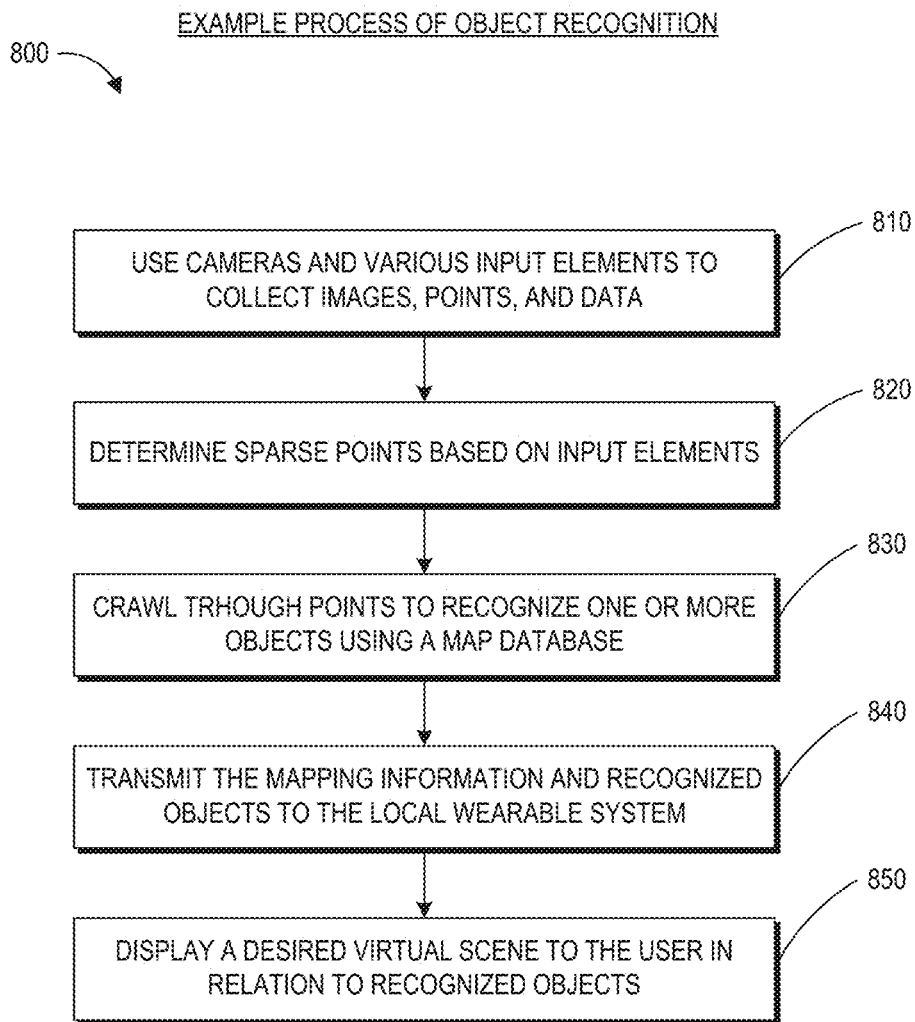
FIG. 8 is a process flow diagram of an example of a method of rendering virtual content in relation to recognized objects.

FIG. 8 is a process flow diagram of an example of a method 800 of rendering virtual content in relation to recognized objects. The method 800 describes how a virtual scene may be presented to a user of the wearable system.

The user may be geographically remote from the scene. For example, the user may be in New York, but may want to view a scene that is presently going on in California, or may want to go on a walk with a friend who resides in California.

At block 810, the wearable system may receive input from the user and other users regarding the environment of the user. This may be achieved through various input devices, and knowledge already possessed in the map database. The user's FOV camera, sensors, GPS, eye tracking, etc., convey information to the system at block 810. The system may determine sparse points based on this information at block 820. The sparse points may be used in determining pose data (e.g., head pose, eye pose, body pose, or hand gestures) that can be used in displaying and understanding the orientation and position of various objects in the user's surroundings. The object recognizers 708a-708n may crawl through these collected points and recognize one or more objects using a map database at block 830. This information may then be conveyed to the user's individual wearable system at block 840, and the desired virtual scene may be accordingly displayed to the user at block 850. For example, the desired virtual scene (e.g., user in CA) may be displayed at the appropriate orientation, position, etc., in relation to the various objects and other surroundings of the user in New York.

Example Communications Among Multiple Wearable Systems

Figure 9A:
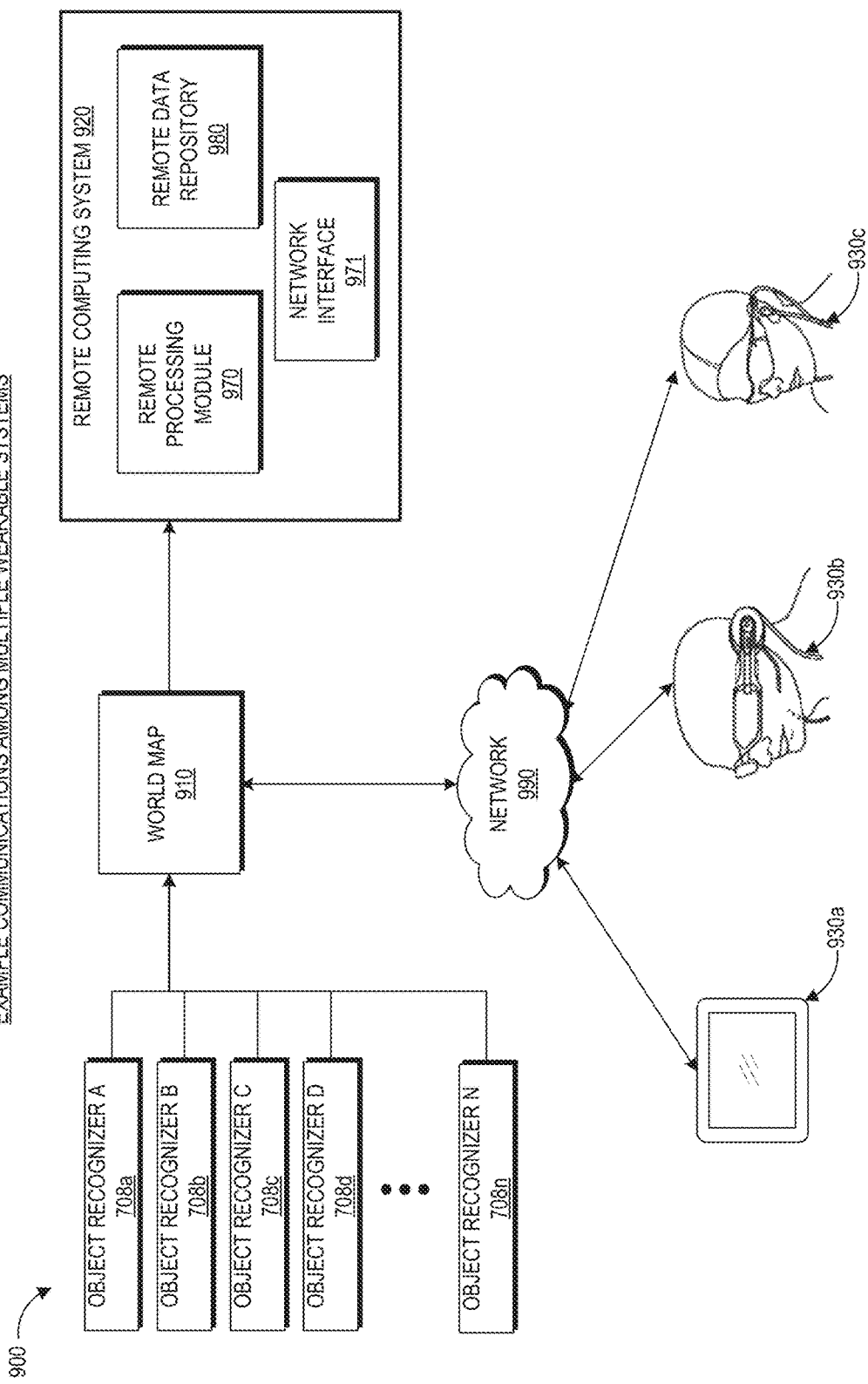
FIG. 9A schematically illustrates an overall system view depicting multiple wearable systems interacting with each other.

FIG. 9A schematically illustrates an overall system view depicting multiple user devices interacting with each other. The computing environment 900 includes user devices 930a, 930b, 930c. The user devices 930a, 930b, and 930c can communicate with each other through a network 990. The user devices 930a-930c can each include a network interface to communicate via the network 990 with a remote computing system 920 (which may also include a network interface 971). The network 990 may be a LAN, WAN, peer-to-peer network, radio, Bluetooth, or any other network. The computing environment 900 can also include one or more remote computing systems 920. The remote computing system 920 may include server computer systems that are clustered and located at different geographic locations. The user devices 930a, 930b, and 930c may communicate with the remote computing system 920 via the network 990.

The remote computing system 920 may include a remote data repository 980 which can maintain information about a specific user's physical and/or virtual worlds. Data storage 980 can store information related to users, users' environment (e.g., world maps of the user's environment), or configurations of avatars of the users. The remote data repository may be an embodiment of the remote data repository 280 shown in FIG. 2. The remote computing system 920 may also include a remote processing module 970. The remote processing module 970 may be an embodiment of the remote processing module 270 shown in FIG. 2. The remote processing module 970 may include one or more processors which can communicate with the user devices (930a, 930b, 930c) and the remote data repository 980. The processors can process information obtained from user devices and other sources. In some implementations, at least a portion of the processing or storage can be provided by the local processing and data module 260 (as shown in FIG. 2). The remote computing system 920 may enable a given user to share information about the specific user's own physical and/or virtual worlds with another user.

The user device may be a wearable device (such as an HMD or an ARD), a computer, a mobile device, or any other devices alone or in combination. For example, the user devices 930b and 930c may be an embodiment of the wearable system 200 shown in FIG. 2 (or the wearable system 400 shown in FIG. 4) which can be configured to present AR/VR/MR content.

One or more of the user devices can be used with the user input device 466 shown in FIG. 4. A user device can obtain information about the user and the user's environment (e.g., using the outward-facing imaging system 464 shown in FIG. 4). The user device and/or remote computing system 1220 can construct, update, and build a collection of images, points and other information using the information obtained from the user devices. For example, the user device may process raw information acquired and send the processed information to the remote computing system 1220 for further processing. The user device may also send the raw information to the remote computing system 1220 for processing. The user device may receive the processed information from the remote computing system 1220 and provide final processing before projecting to the user. The user device may also process the information obtained and pass the processed information to other user devices. The user device may communicate with the remote data repository 1280 while processing acquired information. Multiple user devices and/or multiple server computer systems may participate in the construction and/or processing of acquired images.

The information on the physical worlds may be developed over time and may be based on the information collected by different user devices. Models of virtual worlds may also be developed over time and be based on the inputs of different users. Such information and models can sometimes be referred to herein as a world map or a world model. As described with reference to FIGS. 6 and 7, information acquired by the user devices may be used to construct a world map 910. The world map 910 may include at least a portion of the map 620 described in FIG. 6A. Various object recognizers (e.g. 708a, 708b, 708c . . . 708n) may be used to recognize objects and tag images, as well as to attach semantic information to the objects. These object recognizers are also described in FIG. 7.

The remote data repository 980 can be used to store data and to facilitate the construction of the world map 910. The user device can constantly update information about the user's environment and receive information about the world map 910. The world map 910 may be created by the user or by someone else. As discussed herein, user devices (e.g. 930a, 930b, 930c) and remote computing system 920, alone or in combination, may construct and/or update the world map 910. For example, a user device may be in communication with the remote processing module 970 and the remote data repository 980. The user device may acquire and/or process information about the user and the user's environment. The remote processing module 970 may be in communication with the remote data repository 980 and user devices (e.g. 930a, 930b, 930c) to process information about the user and the user's environment. The remote computing system 920 can modify the information acquired by the user devices (e.g. 930a, 930b, 930c), such as, e.g. selectively cropping a user's image, modifying the user's background, adding virtual objects to the user's environment, annotating a user's speech with auxiliary information, etc. The remote computing system 920 can send the processed information to the same and/or different user devices.

Examples of a Telepresence Session

FIG. 9B depicts an example where two users of respective wearable systems are conducting a telepresence session. Two users (named Alice 912 and Bob 914 in this example)

are shown in this figure. The two users are wearing their respective wearable devices 902 and 904 which can include an HMD described with reference to FIG. 2 (e.g., the display device 220 of the system 200) for representing a virtual avatar of the other user in the telepresence session. The two users can conduct a telepresence session using the wearable device. Note that the vertical line in FIG. 9B separating the two users is intended to illustrate that Alice 912 and Bob 914 may (but need not) be in two different locations while they communicate via telepresence (e.g., Alice may be inside her office in Atlanta while Bob is outdoors in Boston).

As described with reference to FIG. 9A, the wearable devices 902 and 904 may be in communication with each other or with other user devices and computer systems. For example, Alice's wearable device 902 may be in communication with Bob's wearable device 904, e.g., via the network 990 (shown in FIG. 9A). The wearable devices 902 and 904 can track the users' environments and movements in the environments (e.g., via the respective outward-facing imaging system 464, or one or more location sensors) and speech (e.g., via the respective audio sensor 232). The wearable devices 902 and 904 can also track the users' eye movements or gaze based on data acquired by the inward-facing imaging system 462. In some situations, the wearable device can also capture or track a user's facial expressions or other body movements (e.g., arm or leg movements) where a user is near a reflective surface and the outward-facing imaging system 464 can obtain reflected images of the user to observe the user's facial expressions or other body movements.

A wearable device can use information acquired of a first user and the environment to animate a virtual avatar that will be rendered by a second user's wearable device to create a tangible sense of presence of the first user in the second user's environment. For example, the wearable devices 902 and 904, the remote computing system 920, alone or in combination, may process Alice's images or movements for presentation by Bob's wearable device 904 or may process Bob's images or movements for presentation by Alice's wearable device 902. As further described herein, the avatars can be rendered based on contextual information such as, e.g., a user's intent, an environment of the user or an environment in which the avatar is rendered, or other biological features of a human.

Although the examples only refer to two users, the techniques described herein should not be limited to two users. Multiple users (e.g., two, three, four, five, six, or more) using wearables (or other telepresence devices) may participate in a telepresence session. A particular user's wearable device can present to that particular user the avatars of the other users during the telepresence session. Further, while the examples in this figure show users as standing in an environment, the users are not required to stand. Any of the users may stand, sit, kneel, lie down, walk or run, or be in any position or movement during a telepresence session. The user may also be in a physical environment other than described in examples herein. The users may be in separate environments or may be in the same environment while conducting the telepresence session. Not all users are required to wear their respective HMDs in the telepresence session. For example, Alice 912 may use other image acquisition and display devices such as a webcam and computer screen while Bob 914 wears the wearable device 904.

Examples of a Virtual Avatar

Figure 10:
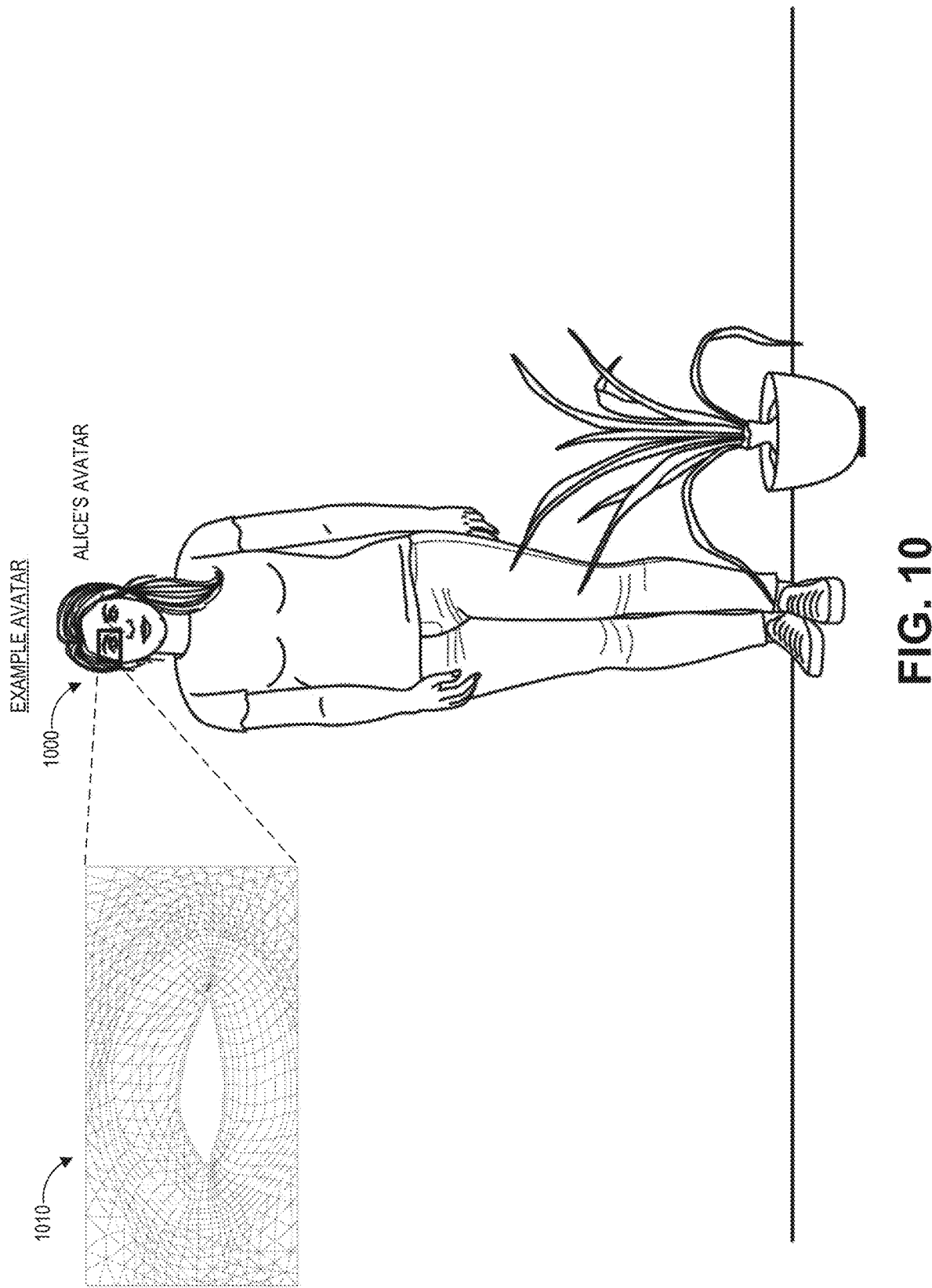
FIG. 10 illustrates an example of an avatar as perceived by a user of a wearable system.

FIG. 10 illustrates an example of an avatar as perceived by a user of a wearable system. The example avatar 1000 shown in FIG. 10 can be an avatar of Alice 912 (shown in FIG. 9B) standing behind a physical plant in a room. An avatar can include various characteristics, such as for example, size, appearance (e.g., skin color, complexion, hair style, clothes, facial features, such as wrinkles, moles, blemishes, pimples, dimples, etc.), position, orientation, movement, pose, expression, etc. These characteristics may be based on the user associated with the avatar (e.g., the avatar 1000 of Alice may have some or all characteristics of the actual person Alice 912). As further described herein, the avatar 1000 can be animated based on contextual information, which can include adjustments to one or more of the characteristics of the avatar 1000. Although generally described herein as representing the physical appearance of the person (e.g., Alice), this is for illustration and not limitation. Alice's avatar could represent the appearance of another real or fictional human being besides Alice, a personified object, a creature, or any other real or fictitious representation. Further, the plant in FIG. 10 need not be physical, but could be a virtual representation of a plant that is presented to the user by the wearable system. Also, additional or different virtual content than shown in FIG. 10 could be presented to the user.

Examples of Rigging Systems for Virtual Characters

An animated virtual character, such as a human avatar, can be wholly or partially represented in computer graphics as a polygon mesh. A polygon mesh, or simply "mesh" for short, is a collection of points in a modeled three-dimensional space. The mesh can form a polyhedral object whose surfaces define the body or shape of the virtual character (or a portion thereof). While meshes can include any number of points (within practical limits which may be imposed by available computing power), finer meshes with more points are generally able to portray more realistic virtual characters with finer details that may closely approximate real life people, animals, objects, etc. FIG. 10 shows an example of a mesh 1010 around an eye of the avatar 1000.

Each point in the mesh can be defined by a coordinate in the modeled three-dimensional space. The modeled three-dimensional space can be, for example, a Cartesian space addressed by (x, y, z) coordinates. The points in the mesh are the vertices of the polygons which make up the polyhedral object. Each polygon represents a surface, or face, of the polyhedral object and is defined by an ordered set of vertices, with the sides of each polygon being straight line edges connecting the ordered set of vertices. In some cases, the polygon vertices in a mesh may differ from geometric polygons in that they are not necessarily coplanar in 3D graphics. In addition, the vertices of a polygon in a mesh may by collinear, in which case the polygon has zero area (referred to as a degenerate polygon).

In some embodiments, a mesh is made up of three-vertex polygons (i.e., triangles or "tris" for short) or four-vertex polygons (i.e., quadrilaterals or "quads" for short). However, higher-order polygons can also be used in some meshes. Meshes are typically quad-based in direct content creation (DCC) applications (e.g., applications such as Maya (available from Autodesk, Inc.) or Houdini (available from Side Effects Software Inc.) which are primarily designed for creating and manipulating 3D computer graphics), whereas meshes are typically tri-based in real-time applications.

To animate a virtual character, its mesh can be deformed by moving some or all of its vertices to new positions in space at various instants in time. The deformations can represent both large-scale movements (e.g., movement of limbs) and fine movements (e.g., facial movements). These and other deformations can be based on real-world models (e.g., photogrammetric scans of real humans performing body movements, articulations, facial contortions, expressions, etc.), art-directed development (which may be based on real-world sampling), combinations of the same, or other techniques. In the early days of computer graphics, mesh deformations could be accomplished manually by independently setting new positions for the vertices, but given the size and complexity of modern meshes it is typically desirable to produce deformations using automated systems and processes. The control systems, processes, and techniques for producing these deformations are referred to as rigging, or simply "the rig." The example avatar processing and rendering system 690 of FIG. 6B includes a 3D model processing system 680 which can implement rigging and which can be programmed to perform the techniques for avatar facial expression representation in multidimensional space that are described herein (see, e.g., FIGS. 11-19).

The rigging for a virtual character can use skeletal systems to assist with mesh deformations. A skeletal system includes a collection of joints which correspond to points of articulation for the mesh. In the context of rigging, joints are sometimes also referred to as "bones" despite the difference between these terms when used in the anatomical sense. Joints in a skeletal system can move, or otherwise change, with respect to one another according to transforms which can be applied to the joints. The transforms can include translations or rotations in space, as well as other operations. The joints can be assigned hierarchical relationships (e.g., parent-child relationships) with respect to one another. These hierarchical relationships can allow one joint to inherit transforms or other characteristics from another joint. For example, a child joint in a skeletal system can inherit a transform assigned to its parent joint so as to cause the child joint to move together with the parent joint.

A skeletal system for a virtual character can be defined with joints at appropriate positions, and with appropriate local axes of rotation, degrees of freedom, etc., to allow for a desired set of mesh deformations to be carried out. Once a skeletal system has been defined for a virtual character, each joint can be assigned, in a process called "skinning," an amount of influence over the various vertices in the mesh. This can be done by assigning a weight value to each vertex for each joint in the skeletal system. When a transform is applied to any given joint, the vertices under its influence can be moved, or otherwise altered, automatically based on that joint transform by amounts which can be dependent upon their respective weight values.

A rig can include multiple skeletal systems. One type of skeletal system is a core skeleton (also referred to as a low-order skeleton) which can be used to control large-scale movements of the virtual character. In the case of a human avatar, for example, the core skeleton might resemble the anatomical skeleton of a human. Although the core skeleton for rigging purposes may not map exactly to an anatomically-correct skeleton, it may have a sub-set of joints in analogous locations with analogous orientations and movement properties.

As briefly mentioned above, a skeletal system of joints can be hierarchical with, for example, parent-child relationships among joints. When a transform (e.g., a change in position and/or orientation) is applied to a particular joint in the skeletal system, the same transform can be applied to all other lower-level joints within the same hierarchy. In the case of a rig for a human avatar, for example, the core skeleton may include separate joints for the avatar's shoulder, elbow, and wrist. Among these, the shoulder joint may be assigned to the highest level in the hierarchy, while the elbow joint can be assigned as a child of the shoulder joint, and the wrist joint can be assigned as a child of the elbow joint. Accordingly, when a particular translation and/or rotation transform is applied to the shoulder joint, the same transform can also be applied to the elbow joint and the wrist joint such that they are translated and/or rotated in the same way as the shoulder.

Despite the connotations of its name, a skeletal system in a rig need not necessarily represent an anatomical skeleton. In rigging, skeletal systems can represent a wide variety of hierarchies used to control deformations of the mesh. For example, hair can be represented as a series of joints in a hierarchical chain; skin motions due to an avatar's facial contortions (which may represent expressions such as smiling, frowning, laughing, speaking, blinking, etc.) can be represented by a series of facial joints controlled by a facial rig; muscle deformation can be modeled by joints; and motion of clothing can be represented by a grid of joints.

The rig for a virtual character can include multiple skeletal systems, some of which may drive the movement of others. A lower-order skeletal system is one which drives one or more higher-order skeletal systems. Conversely, higher-order skeletal systems are ones which are driven or controlled by a lower-order skeletal system. For example, whereas the movements of the core skeleton of a character might be controlled manually by an animator, the core skeleton can in turn drive or control the movements of a higher-order skeletal system. For example, higher-order helper joints-which may not have anatomical analogs in a physical skeleton—can be provided to improve the mesh deformations which result from movements of the core skeleton. The transforms applied to these and other joints in higher-order skeletal systems may be derived algorithmically from the transforms applied to the lower-order skeleton. Higher-order skeletons can represent, for example, muscles, skin, fat, clothing, hair, or any other skeletal system which does not require direct animation control.

As already discussed, transforms can be applied to joints in skeletal systems in order to carry out mesh deformations. In the context of rigging, transforms include functions which accept one or more given points in 3D space and produce an output of one or more new 3D points. For example, a transform can accept one or more 3D points which define a joint and can output one or more new 3D points which specify the transformed joint. Joint transforms can include, for example, a translation component, a rotation component, and a scale component.

A translation is a transform which moves a set of one or more specified points in the modeled 3D space by a specified amount with no change in the orientation or size of the set of points. A rotation is a transform which rotates a set of one or more specified points in the modeled 3D space about a specified axis by a specified amount (e.g., rotate every point in the mesh 45 degrees about the z-axis). An affine transform (or 6 degree of freedom (DOF) transform) is one which only includes translation(s) and rotation(s). Application of an affine transform can be thought of as moving a set of one or more points in space without changing its size, though the orientation can change.

Meanwhile, a scale transform is one which modifies one or more specified points in the modeled 3D space by scaling their respective coordinates by a specified value. This changes the size and/or shape of the transformed set of points. A uniform scale transform scales each coordinate by the same amount, whereas a non-uniform scale transform can scale the (x, y, z) coordinates of the specified points independently. A non-uniform scale transform can be used, for example, to provide squashing and stretching effects, such as those which may result from muscular action. Yet another type of transform is a shear transform. A shear transform is one which modifies a set of one or more specified points in the modeled 3D space by translating a coordinate of the points by different amounts based on the distance of that coordinate from an axis.

When a transform is applied to a joint to cause it to move, the vertices under the influence of that joint are also moved. This results in deformations of the mesh. As discussed above, the process of assigning weights to quantify the influence each joint has over each vertex is called skinning (or sometimes "weight painting" or "skin weighting"). The weights are typically values between 0 (meaning no influence) and 1 (meaning complete influence). Some vertices in the mesh may be influenced only by a single joint. In that case those vertices are assigned weight values of 1 for that joint, and their positions are changed based on transforms assigned to that specific joint but no others. Other vertices in the mesh may be influenced by multiple joints. In that case, separate weights are assigned to those vertices for all of the influencing joints, with the sum of the weights for each vertex equaling 1. The positions of these vertices are changed based on transforms assigned to all of their influencing joints.

Making weight assignments for all of the vertices in a mesh can be extremely labor intensive, especially as the number of joints increases. Balancing the weights to achieve desired mesh deformations in response to transforms applied to the joints can be quite difficult for even highly trained artists. In the case of real-time applications, the task can be complicated further by the fact that many real-time systems also enforce limits on the number of joints (generally 8 or fewer) which can be weighted to a specific vertex. Such limits are typically imposed to for the sake of efficiency in the graphics processing unit (GPU).

The term skinning can also refer to the process of actually deforming the mesh, using the assigned weights, based on transforms applied to the joints in a skeletal system. For example, a series of core skeleton joint transforms may be specified by an animator to produce a desired character movement (e.g., a running movement or a dance step). When transforms are applied to one or more of the joints, new positions are calculated for the vertices under the influence of the transformed joints. The new position for any given vertex is typically computed as a weighted average of all the joint transforms which influence that particular vertex. There are many algorithms used for computing this weighted average, but the most common, and the one used in most real-time applications due to its simplicity and ease of control, is linear blend skinning (LBS). In linear blend skinning, a new position for each vertex is calculated using each joint transform for which that vertex has a non-zero weight. Then, the new vertex coordinates resulting from each of these joint transforms are averaged in proportion to the respective weights assigned to that vertex for each of the joints. There are well known limitations to LBS in practice, and much of the work in making high-quality rigs is devoted to finding and overcoming these limitations. Many helper joint systems are designed specifically for this purpose.

In addition to skeletal systems, "blendshapes" can also be used in rigging to produce mesh deformations. A blendshape (sometimes also called a "morph target" or just a "shape") is a deformation applied to a set of vertices in the mesh where each vertex in the set is moved a specified amount in a specified direction based upon a weight. Each vertex in the set may have its own custom motion for a specific blendshape, and moving the vertices in the set simultaneously will generate the desired shape. The custom motion for each vertex in a blendshape can be specified by a "delta," which can be a vector representing the amount and direction of XYZ motion applied to that vertex. Blendshapes can be used to produce, for example, facial deformations to move the eyes, lips, brows, nose, dimples, etc., just to name a few possibilities.

Blendshapes are useful for deforming the mesh in an art-directable way. They offer a great deal of control, as the exact shape can be sculpted or captured from a scan of a model. But the benefits of blendshapes come at the cost of having to store the deltas for all the vertices in the blendshape. For animated characters with fine meshes and many blendshapes, the amount of delta data can be significant.

Each blendshape can be applied to a specified degree by using blendshape weights. These weights typically range from 0 (where the blendshape is not applied at all) to 1 (where the blendshape is fully active). For example, a blendshape to move a character's eyes can be applied with a small weight to move the eyes a small amount, or it can be applied with a large weight to create a larger eye movement.

The rig may apply multiple blendshapes in combinations with one another to achieve a desired complex deformation. For example, to produce a smile, the rig may apply blendshapes for lip corner pull, raising the upper lip, and lowering the lower lip, as well as moving the eyes, brows, nose, and dimples. The desired shape from combining two or more blendshapes is known as a combination shape (or simply a "combo").

One problem that can result from applying two blendshapes in combination is that the blendshapes may operate on some of the same vertices. When both blendshapes are active, the result is called a double transform or "going off-model." The solution to this is typically a corrective blendshape. A corrective blendshape is a special blendshape which represents a desired deformation with respect to a currently applied deformation rather than representing a desired deformation with respect to the neutral. Corrective blendshapes (or just "correctives") can be applied based upon the weights of the blendshapes they are correcting. For example, the weight for the corrective blendshape can be made proportionate to the weights of the underlying blendshapes which trigger application of the corrective blendshape.

Corrective blendshapes can also be used to correct skinning anomalies or to improve the quality of a deformation. For example, a joint may represent the motion of a specific muscle, but as a single transform it cannot represent all the non-linear behaviors of the skin, fat, and muscle. Applying a corrective, or a series of correctives, as the muscle activates can result in more pleasing and convincing deformations.

Rigs are built in layers, with lower, simpler layers often driving higher-order layers. This applies to both skeletal systems and blendshape deformations. For example, as already mentioned, the rigging for an animated virtual character may include higher-order skeletal systems which are controlled by lower-order skeletal systems. There are many ways to control a higher-order skeleton or a blendshape based upon a lower-order skeleton, including constraints, logic systems, and pose-based deformation.

A constraint can be a system where a particular object or joint transform controls one or more components of a transform applied to another joint or object. There are many different types of constraints. For example, aim constraints change the rotation of the target transform to point in specific directions or at specific objects. Parent constraints act as virtual parent-child relationships between pairs of transforms. Position constraints constrain a transform to specific points or a specific object. Orientation constraints constrain a transform to a specific rotation of an object.

Logic systems are systems of mathematical equations which produce some outputs given a set of inputs. These are specified, not learned. For example, a blendshape value might be defined as the product of two other blendshapes (this is an example of a corrective shape known as a combination or combo shape).

Pose-based deformations can also be used to control higher-order skeletal systems or blendshapes. The pose of a skeletal system is defined by the collection of transforms (e.g., rotation(s) and translation(s)) for all the joints in that skeletal system. Poses can also be defined for subsets of the joints in a skeletal system. For example, an arm pose could be defined by the transforms applied to the shoulder, elbow, and wrist joints. A pose space deformer (PSD) is a system used to determine a deformation output for a particular pose based on one or more "distances" between that pose and a defined pose. These distances can be metrics which characterize how different one of the poses is from the other. A PSD can include a pose interpolation node which, for example, accepts a set of joint rotations (defining a pose) as input parameters and in turn outputs normalized per-pose weights to drive a deformer, such as a blendshape. The pose interpolation node can be implemented in a variety of ways, including with radial basis functions (RBF). RBFs can perform a machine-learned mathematical approximation of a function. RBFs can be trained using a set of inputs and their associated expected outputs. The training data could be, for example, multiple sets of joint transforms (which define particular poses) and the corresponding blendshapes to be applied in response to those poses. Once the function is learned, new inputs (e.g., poses) can be given and their expected outputs can be computed efficiently. RBFs are a subtype of artificial neural networks. RBFs can be used to drive higher-level components of a rig based upon the state of lower-level components. For example, the pose of a core skeleton can drive helper joints and correctives at higher levels.

These control systems can be chained together to perform complex behaviors. As an example, an eye rig could contain two "look around" values for horizontal and vertical rotation. These values can be passed through some logic to determine the exact rotation of an eye joint transform, which might in turn be used as an input to an RBF which controls blendshapes that change the shape of the eyelid to match the position of the eye. The activation values of these shapes might be used to drive other components of a facial expression using additional logic, and so on.

Some example goals of rigging systems can be to provide a mechanism to produce pleasing, high-fidelity deformations based on simple, human-understandable control systems. In the case of real-time applications, the goal may be to provide rigging systems which are simple or efficient enough to run in real-time on, for example, a VR/AR/MR system or the computing device 10, while making as few compromises to the final quality as possible. In some embodiments, the 3D model processing system 680 executes a rigging system to animate an avatar in a mixed reality environment in real-time to be interactive (with users of the VR/AR/MR system) and to provide appropriate, contextual avatar behavior (e.g., intent-based behavior) in the user's environment.

Example Controls and Modeling Techniques for Facial Expressions

To provide realistic interactions with a virtual character, various emotions may be assigned to the virtual character. The virtual character's emotion may change in response to a user's interaction or an event in the environment (e.g., a loud sound in the physical or virtual environment associated with the virtual character). The character environment can also extend beyond those provided by the wearable device or beyond the physical environment that the user is currently in. For example, the environment can include the Internet or outside physical environment (e.g., where a user at home, the environment may extend beyond the user's home, such as, e.g., to a park or a stadium). As a result, the virtual character may also react emotionally to events happening outside of its immediate physical or virtual environment. For example, the virtual character may react to an incoming message or news from the Internet. The emotions can be expressed through facial expressions, body language, speech, or movements, or other actions of the virtual character.

As described above, the facial expressions of a virtual character can be controlled by a rigging system. For example, an avatar's facial expression can be modeled by combinations of blendshapes. The combinations of blendshapes can be controlled by values of a face vector. A combination of constituent values of the face vector can correspond to a facial expression or an emotion. The face vector can comprise a number of dimensions (which may also be referred to as components or variables). Each dimension can correspond to a blendshape or other facial parameter in a rigging model (e.g., an AU of a FACS model). The values of a face vector can control one or more vertices of the avatar's mesh to achieve the facial expression or the emotion. The values of the variables may be in a floating point number format although other types of data formats (e.g., Boolean or integer) are also possible. FIG. 12A shows examples of face vectors for a neutral, a surprised, a shocked, a displeased, and a disgusted expression.

As an example of controlling facial expressions, the face vector for controlling facial expressions can comprise 137 variables in some examples. The value of each variable in the vector can represent a weight of the corresponding blendshape for driving the movement of vertices of the character's mesh. The weight for one or more of the 137 variables can change, depending on the facial expression. As an example, a "happy vector" can include a weight for each of the 137 variables. A "sad vector" has the same 137 variables, except with different weights that define a sad expression. Although certain examples herein are described in the context of a 137-dimensional face vector space, this is for purposes of illustration and not limitation. In other embodiments, the number of components in a face vector can be up to 10, 50, 100, 200, 1000, or more.

In certain implementations, the variables can be expressed as face sliders associated with a facial rig. With reference to the above example, where the vector has 137 variables, the facial rig can include 137 adjustable controls called sliders. The sliders can be positioned at specific locations of the face and values for the sliders can be adjusted by the rig to adjust the facial deformation at that location. Adjustments to a face slider can be associated with changes in values of a variable associated with the slider. The adjustments can include a direction of the movement of the face slider and/or an amount of movement of the face slider (e.g., with respect to the previous location of the face slider). Such adjustments of a slider can control the movement of a set of vertices at certain locations of the mesh. In some situations, a single vertex can also be controlled by multiple sliders. In some embodiments, a slider can be adjusted through a range of values (e.g., between 0 and 1, between −1 and +1, or between any two numbers).

Figure 11:
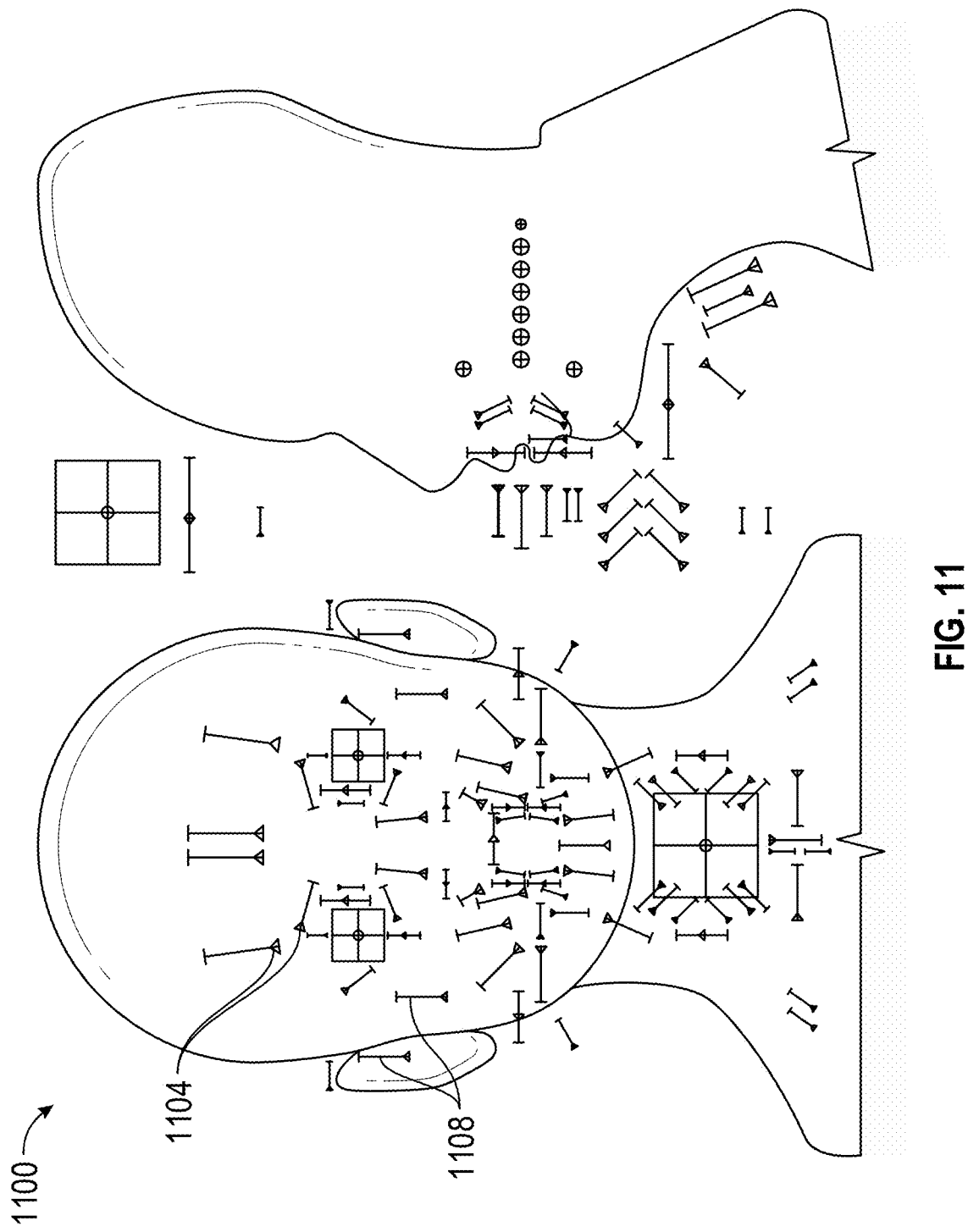
FIG. 11 illustrates an example of sliders associated with a facial rig.

FIG. 11 illustrates an example of sliders associated with an example of a facial rig. In this example, the locations of the sliders are assigned based on action units (AUs) of a facial action coding system (FACS). FACS can decompose a facial expression into isolated muscle contractions and relaxations. The numerical representation of the isolated muscle movements can be referred to as an AU. Although FACS is used in this example rig, other control systems can utilize other methodologies to characterize facial musculature or movement.

The facial rig 1100 in FIG. 11 can be used to control facial expressions of an avatar. The facial rig 1100 can be thought of as an electronic digital puppet in which points of articulation can be parameterized into a plurality of sliders (see, e.g., the example sliders 1104, 1108). The sliders 1104, 1108 can be directly mapped to AUs of the FACS characterization of the human face. For example, arrows 1104 correspond to an AU parameter and lines 1108 indicate the directionality of the AUs. The sliders 1104, 1108 can be adjusted electronically to control the deformation of the avatar's mesh. The controls (e.g., facial rig parameters 1104, 1108) can be driven in real time by the facial rig 1100 and can be parameterized to a normalized value, such as between −1 and 1 or between 0 and 1. By normalizing the controls, the values can be used from rig to rig. For example, if a FACS session is performed for a human model, the animation system can advantageously re-use that data on an avatar for another person.

The combinations of the AUs can aggregate to form representations of emotional (or expression) states of the human face (sometimes referred to as AU variants). Further, an intensity scale (e.g., between 0% and 100%) may be included for each AU of the AU variant. For example, the expression "Happy" can correspond to AUs 12 (lip corner puller) (100%), 25 (lips apart) (100%), and 6 (Cheek Raiser) (51%). In some cases, if the intensity is not specified, the intensity will be set at a default value (e.g., 100%). For example, in some cases, "Happy" can be represented as the AU variants [(12, 25, 6 (51%)].

Various other expressions can also be represented, including, but not limited to, sad, fearful, angry, surprised, or disgusted. For example, the expression "Sad" can correspond to AUs: 4 (Brow Lowerer) (100%), 15 (Lip Corner Depressor) (100%), 1 (Inner Brow Raiser) (60%), 6 (Cheek Raiser) (50%), 11 (Nasolabial Deepener) (26%), and 17 (Chin Raiser) (67%). Thus, "Sad" can be represented as AU variant [4, 15, 1 (60%), 6 (50%), 11 (26%), 17 (67%)]. The expression "Fearful" can correspond to AUs: 1 (Inner Brow Raiser) (100%), 4 (Brow Lowerer) (100%), 20 (Lip stretcher) (100%), 25 (Lips part) (100%), 2 (Outer Brow Raiser) (57%), 5 (Upper Lid Raiser) (63%), 26 (Jaw Drop) (33%). Thus, "Fearful" can be represented as AU variant [1, 4, 20, 25, 2 (57%), 5 (63%), 26 (33%)]. The expression "Angry" can correspond to AUs: 4 (Brow Lowerer) (100%), 7 (Lid Tightener) (100%), 24 (Lip Pressor) (100%), 10 (Upper Lip Raiser) (26%), 17 (Chin Raiser) (52%), 23 (Lip Tightener) (29%). Thus, "Angry" can be represented as AU variant [4, 7, 24, 10 (26%), 17 (52%), 23 (29%)]. The expression "Surprised" can correspond to AUs: 1 (Inner Brow Raiser) (100%), 2 (Outer Brow Raiser) (100%), 25 (Lips part) (100%), 26 (Jaw Drop) (100%), 5 (Upper Lid Raiser) (66%). Thus, "Surprised" can be represented as AU variant [1, 2, 25, 26, 5 (66%)]. The expression "Disgusted" can correspond to AUs: 9 (Nose Wrinkler) (100%), 10 (Upper Lip Raiser) (100%), 17 (Chin Raiser) (100%), 4 (Brow Lowerer) (31%), 24 (Lip Pressor) (26%). Thus, "Disgusted" can be represented as AU variant [9, 10, 17, 4 (31%), 24 (26%)]. Accordingly, by knowing the AUs and/or AU variants used for a particular animation, the system (e.g., the computing device 10) can identify one or more emotions associated with that set of AUs and/or AU variants.

Although many of the AU variants may be based on FACS, some expressions may be different from traditional FACS groupings. For example, various systems may utilize different AUs or different intensity scales to represent an emotion or expression. Accordingly, the sliders 1104, 1108 can be coarsely mapped in real time. For example, if a real person smiles, the wearable system may interpret this as happy, and the avatar can be manipulated as a "happy" category (rather than point-to-point matching of the real person). This may simplify the computational load of the system. Additional examples related to rigs for manipulating facial expressions using sliders are also described in U.S. Provisional Application No. 62/643,548, entitled "ANIMATING VIRTUAL AVATAR FACIAL MOVEMENTS", filed Mar. 15, 2018, the disclosure of which is hereby incorporated by reference herein in its entirety.

FIG. 12A illustrates examples of face vectors representative of facial expressions. This figure shows an example table 1200 which includes various values of a face vector for the expressions: neutral, surprise, shock, displeased, and disgust. The top row of the table 1200 shows illustrations of the expressions visually. An emotion can be associated with one or more facial expressions. Each facial expression can be represented by a face vector. The face vector can include a plurality of parameters for controlling a virtual character (e.g., by deforming a mesh of the virtual character).

In the example shown in FIG. 12A, the plurality of parameters in the face vector includes two parameters for left and right eye brow movements (L.BrowUp, R.BrowUp), one parameter for Jaw (JawDrop), one parameter for eyes (EyesOpen), and one parameter for lip corner (LipCorner), etc. The parameters of the face vector are also sometimes referred to herein as variables, components, or dimensions. As will further be described herein, each parameter can also correspond to a face slider (e.g., an adjustment of the face slider will adjust the control value of the corresponding parameter in a face vector).

A control value can be associated with each parameter in the face vector. The control values are typically numbers in a range from, for example, 0 to 1, or −1 to +1, or some other numerical range. With reference to the example shown in FIG. 12A, the neutral expression is associated with a face vector in which the control values for L.BrowUp, R.BrowUp, JawDrop, and LipCorner are all 0.0, while the control value for EyesOpen is 0.5. By adjusting the control values for the parameters, the virtual character can be animated to show different facial expressions. With continued reference to FIG. 12A, to animate the virtual character to show Surprise, the control values can be changed to 0.45 for L.BrowUp, 0.5 for R.BrowUp, 0.35 for JawDrop, 0.75 for EyesOpen, while the control value for LipCorner remains at 0.0. Example control values for other facial expressions (e.g., Shock, Displeased, Disgust) are also shown in FIG. 12A.

Each parameter of a face vector can be associated with a blendshape used to animate the virtual character. By adjusting the control value for a parameter, the animation rig can adjust one or more vertices in a mesh for the virtual character.

FIG. 12A shows just the first five parameters of the face vector and their associated control values for five different facial expressions. In various other examples, the variables for controlling the facial expressions can also be defined differently. As described above, the face vector can be any length (e.g., 137 in one embodiment). The length of the face vector can be set by the particular rig used for avatar animation. For example, a rig with more parameters may correspond to a face vector with a longer length (due to more dimensions in the face vector), whereas a rig with a smaller number of parameters may correspond to a face vector with a shorter length.

With reference to FIG. 12A, each row after the top row 1210 can represent one parameter across a set of expressions. The number within each cell represents the control value for the corresponding parameter to achieve the given expression. The control values can be the values for the corresponding FACS sliders. The control values can also represent weights of the blendshapes associated with the variables. For example, when the avatar is in a neutral state, the value of the variable for the lip corner is 0.0 representing the default location of the lip corner (e.g., no deformation to vertices of the mesh around the lip corner). However, if the avatar has a displeased facial expression, the control value of the lip corner variable can increase (e.g., to 0.45 in FIG. 12A), and if the avatar transitions to a disgusted facial expression, the control value of the lip corner variable can increase even more (e.g., to 0.8 in FIG. 12A). Thus, the visual expression of the lip corner (as shown in the row 1210) appears different between the neutral, displeased, and disgusted expressions. Similar considerations apply to other component values of the face vectors.

Some control values can have values that range between positive and negative values. As a result, the variables can support movements in both directions (e.g., up and down, left and right, etc.). For example, a FACS slider of an eye brow can move up when the expression is surprised or shocked, and can move down when the expression is displeased or disgusted.

As described herein, a rigging control system can automatically adjust control values of the face vector to cause the avatar to be rendered over a range of expressions (or emotions corresponding to the expressions or groups of expressions).

Examples of Mapping Vectors of Facial Expressions

Figure 12B:
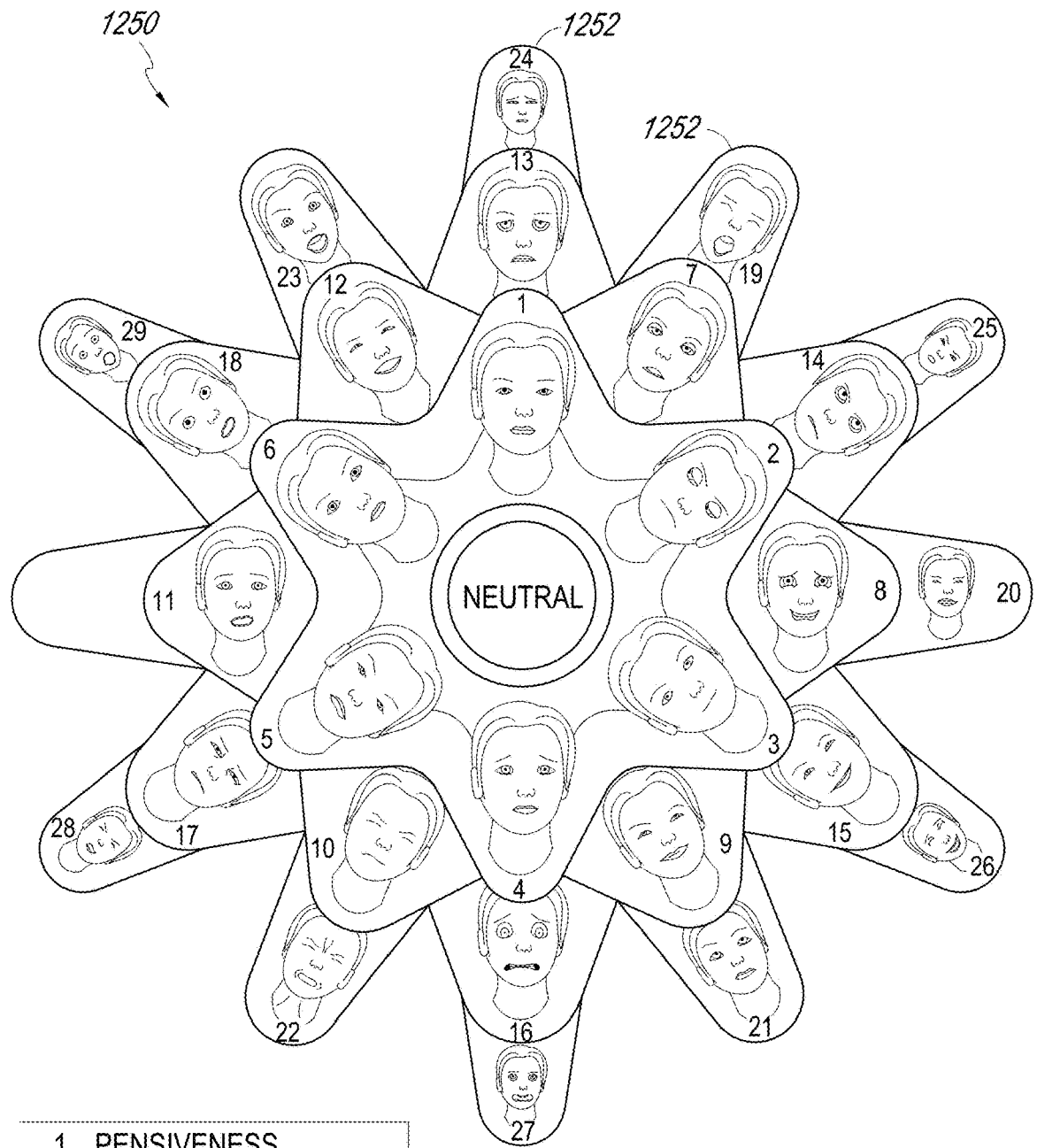
FIG. 12B illustrates an example of a map of expressions.

FIG. 12B illustrates an example of a map 1250 of facial expressions. Each facial expression can correspond to a face vector (e.g., as illustrated in FIG. 12A), and an expression can be mapped to a combination of one or more facial expressions (e.g., a happy expression could correspond to 90% smile expression plus 10% surprised expression). The map 1250 can include a reference expression (which may be a neutral expression). In this example, the map is largely two-dimensional (2D), but in other examples, the map could be three dimensional. For example, a 3D map could have the reference (e.g., neutral) expression at the center of a cube, with eight different expressions at the corners of the cube. Further details regarding the construction of the map 1250 are provided below.

Expressions can progress as multiples of each other in the multi-dimensional space of variables. The face vectors of similar facial expressions can lie along the same arm or direction in this multi-dimensional map measured relative to the neutral expression. For example, vectors for happy and joyful can be in the same direction because these two facial expressions represent similar emotions but are different in magnitude. A face vector may have a relative angle with respect to another face vector where the differences of corresponding facial expressions are more than a difference in intensity. For example, a happy vector and a sad vector can be positioned with an angular difference. The angular difference between two face vectors can be in range, such as, e.g., 5 degrees, 10 degrees, 20 degrees, 30 degrees, or any other degrees between 0 to 360 degrees or from −180 degrees to 180 degrees, depending on the dissimilarities between the two face vectors.

Figure 12C:
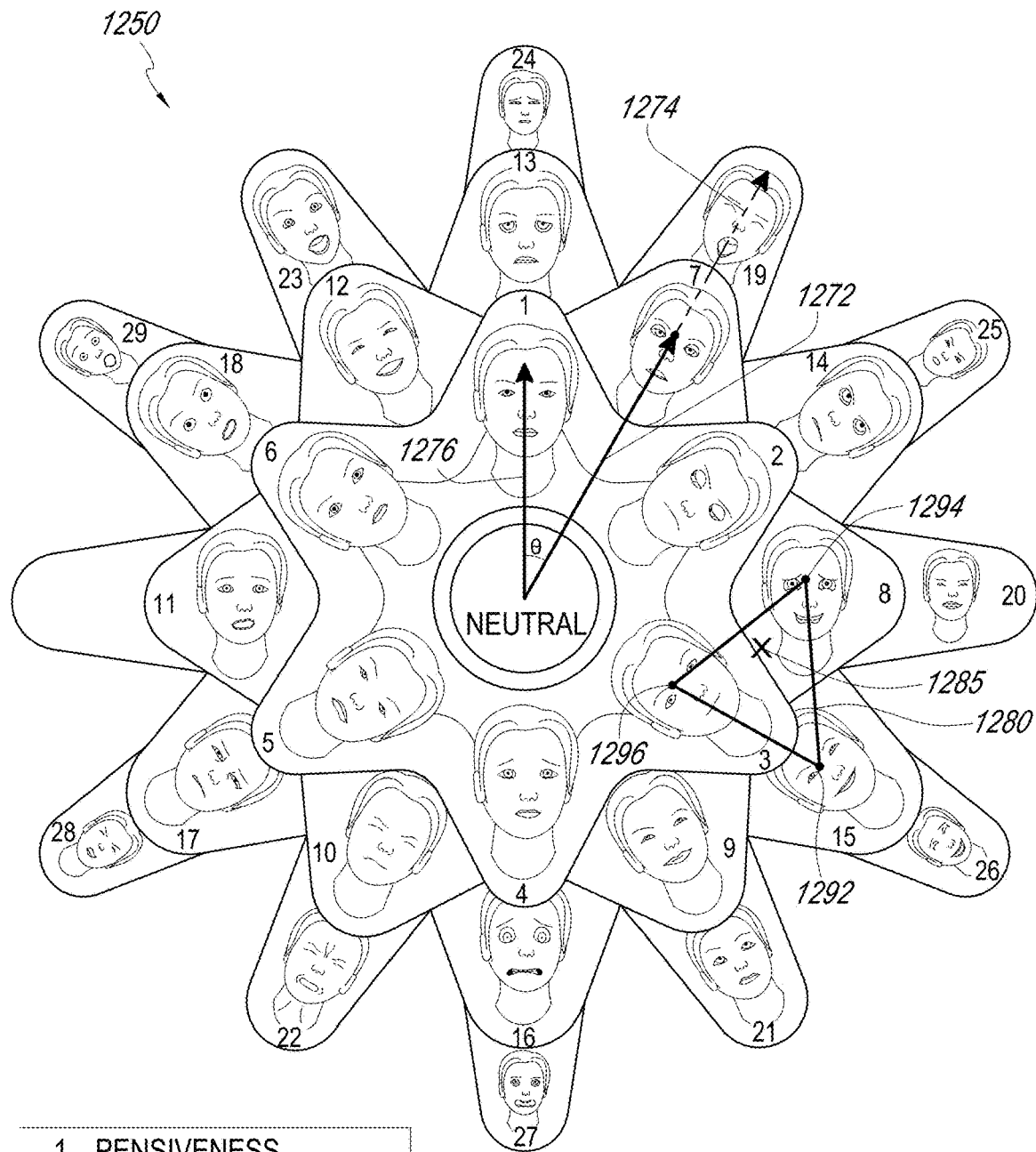
FIG. 12C illustrates examples of face vectors and a triangular animation blendspace on the map of expressions of FIG. 12B.

In some implementations, it may be convenient (although not required) to describe face vectors relative to the reference vector, which will be described as the neutral face vector for convenience (but without limitation). A delta vector for an expression is the face vector of the expression relative to the neutral face vector. A delta vector can be the difference between the neutral face vector and the expression face vector. This permits the facial expression to be represented as a change (e.g., the delta vector) relative to the neutral vector for the neutral expression. Thus, the neutral expression can serve as an origin at the center of the map, and the facial expressions can be arrayed around this origin based on the geometric relationship among the delta vectors corresponding to these expressions (e.g., lengths of the delta vectors and angular relationships between the delta vectors). Such an arrangement of facial expressions and their corresponding delta vectors is shown in FIGS. 12B and 12C.

For example, if the neutral vector is subtracted from the happy vector, a happy delta vector can be obtained. As another example, if the neutral vector is subtracted from an ecstatic vector, an ecstatic delta vector can be obtained. With reference to FIG. 12A, the delta vectors for the surprise, shock, displeased and disgust vectors with respect to the neutral vector can be calculated using the following formulae 1A through 1D, where each column in the table 1210 represents a face vector for the corresponding expression.

$$\overrightarrow{\Delta Surprise} = \overrightarrow{Surprise} - \overrightarrow{Neutral} \quad (1A)$$

$$\overrightarrow{\Delta Shock} = \overrightarrow{Shock} - \overrightarrow{Neutral} \quad (1B)$$

$$\overrightarrow{\Delta Displeased} = \overrightarrow{Displeased} - \overrightarrow{Neutral} \quad (1C)$$

$$\overrightarrow{\Delta Disgust} = \overrightarrow{Disgust} - \overrightarrow{Neutral} \quad (1D)$$

The delta values for the expressions can represent the relative relationships of the expressions (e.g., the intensity of the expressions relative to each other). For example, the ecstatic delta vector may be larger than the happy delta vector by a certain amount (e.g., the length of the ecstatic delta vector could be 3 times of that of the happy delta vector), which mathematically shows that the ecstatic expression is a more extreme version of happy. The length of a vector or a delta vector can be calculated according to the Euclidean or L2-norm, as described below with reference to formula 2A (below). For simplicity, a face vector representing an expression may be referred to by the name for the expression, e.g., a face vector representing the expression for "surprise" may be referred to as the "surprise vector" and a delta face vector for "surprise" may be referred to as the "surprise delta vector" and so forth.

The layout of the map 1250 can be mathematically derived by subtracting the neutral face vector from each expression vector to generate an expression delta vector. Expressions may be organized onto the map 1250 based on relationships between the dot products of the deltas.

The vectors (or delta vectors) of different facial expressions may have different directionalities. For example, a happy vector will have a different directionality from an angry vector (which may be in substantially the same direction as a vector representing annoyance or rage). A fear vector (which may have substantially the same direction as apprehension and terror) would have yet another directionality from the happy vector and the anger vector. The relative directionality of two vectors can be determined using vector algebra principles, for example, the angle between two vectors or delta vectors can be calculated using the scalar dot product. In various embodiments, two vectors may be in substantially the same direction if the angle between the two vectors is less than 15 degrees, less than 10 degrees, or less than 5 degrees. In various embodiments, two vectors may be in substantially the opposite direction if the angle between the two vectors is greater than 165 degrees, greater than 170 degrees, or greater than 175 degrees (while being less than or equal to 180 degrees, which represents the vectors being directly opposite to each other).

For example, the delta vectors between an expression specific vector and the reference expression vector can be used to calculate the relative distance between the reference expression vector and the expression specific vector. The relative positions of two expression specific vectors (e.g., happy and disgust) on the map can be determined based on the dot products of the delta vectors of the two expression specific vectors (each with respect to the reference expression vector).

As an example of generating the map, each face vector or each delta vector (e.g., with respect to the neutral vector) can be unitized (e.g., normalized with respect to a length of 1). As an example of normalizing a delta vector for an expression, a length of a delta vector can first be calculated, e.g., using the formula (2A) below, which is the Euclidean or L2-norm:

$$\|\vec{\Delta expression}\| = \sqrt{\Sigma_{i=1}^{n} expression\_variable_i^2} \quad (2A)$$

where $\|\vec{\Delta expression}\|$ represents the overall length of an n-dimensional delta vector of an expression (or an emotion corresponding to one or more facial expressions) and expression_variable$_i$ represents a variable in the delta vector for the expression. The value of each variable can be divided by the overall length of the vector to obtain the unitized delta vector for an expression.

The length of a vector can represent the strength of an expression (or emotion). A more extreme expression can have a longer length, whereas a less extreme expression can have a smaller length as shown in the formulae (2B-i) and (2B-ii) below.

$$\|\vec{\Delta Surprise}\| < \|\vec{\Delta Shock}\| \quad (2B\text{-i})$$

$$\|\vec{\Delta Displeased}\| < \|\vec{\Delta Disgust}\| \quad (2B\text{-ii})$$

The dot product of unitized delta vectors of expressions can be taken to determine the angular distance between the two delta vectors. For example, the dot product of two vectors can be calculated using the formula 2C-i below.

$$\vec{\Delta expression\_A} \cdot \vec{\Delta expression\_B} = \Sigma_{i=1}^{n} \text{expression\_}A_i \text{ expression\_}B_i \quad (2C\text{-i})$$

where $\vec{\Delta expression\_A}$ and $\vec{\Delta expression\_B}$ represent unitized delta vectors or delta vectors of expressions. Once the dot product is calculated, the angle θ between the two vectors can be calculated as shown in formula 2C-ii below, where $\cos^{-1}$ is the arccosine function. The angle θ can represent the relative angular positions between the expression A vector and the expression B vector.

$$\theta = \cos^{-1}\left(\frac{\vec{\Delta expression\_A} \cdot \vec{\Delta expression\_B}}{\|\vec{\Delta expression\_A}\|\|\vec{\Delta expression\_B}\|}\right) \quad (2C\text{-ii})$$

The output of the dot product is a number describing alignments (e.g., similarities or dissimilarities) of expressions. Further, the length of a vector is the square root of the dot product of the vector with itself (which is equivalent to formula 2A). For example, as shown in the formulae (3A-i) and (3A-ii) below, the dot product of similar expressions is close to 1. In formula (3A-i) and (3A-ii), unit indicates the vector has been unitized.

$$\text{unit}(\vec{\Delta Displeased}) \cdot \text{unit}(\vec{\Delta Disgust}) \approx 1.0 \quad (3A\text{-i})$$

$$\text{unit}(\vec{\Delta Surprise}) \cdot \text{unit}(\vec{\Delta Shock}) \approx 1.0 \quad (3A\text{-ii})$$

Opposite expressions (or emotions), however, may have a dot product closer to −1, indicating that the delta vectors point in roughly opposite directions on the map 1250. As shown in the example formula 3B, the dot product of the unitized delta vector for surprise and the unitized delta vector for displeased is roughly −1.

$$\text{unit}(\vec{\Delta Surprise}) \cdot \text{unit}(\vec{\Delta Displeased}) \approx -1.0 \quad (3B)$$

A mapping of expressions can be generated based on the lengths and dot products calculated according to the foregoing vector analysis principles. FIGS. 12B and 12C illustrate an example of a map 1250 of expressions. The map 1250 has a reference expression (e.g., neutral) placed in the middle of the map. A primary vector 1276 (e.g., a pensiveness vector) can be identified and placed at a given direction (e.g., placing the pensiveness vector to the north of the neutral vector). The primary vector can be identified randomly, or with any structured rules.

The rest of the expressions can be placed relative to the primary vector based on the angular relationship and the distances between the rest of the expressions. For example, the vector dot product can be used to determine the angular relationship between delta vectors as shown in formula 2C-ii, and the distance from the central expression can be determined based on the length of a delta vector for that expression using the formula 2A. For example, the dot product can be used to determine an angle at which that expression should be positioned relative to the primary vector. If the dot product between the primary expression and another expression is near one, the primary expression and the other expression can be placed in the same general direction. If the dot product is close to 0, then the primary vector and the other expression are roughly perpendicular to each other. If the dot product is close to −1, the primary expression and the other expression are placed at the opposite sides of the map 1250.

Even if expressions are aligned, some of the expressions are stronger than others. As described above, the length of a vector indicates the strength of an expression. For example, a more extreme expression translates to a longer length (e.g., the vector 1274 has a longer length than the vector 1272 shown in FIG. 12C). The map 1250 can place more extreme expression further away from the center, neutral expression.

With reference to the FIG. 12B, different expression vectors can be projected into a two-dimensional space, as shown in the map 1250. The map 1250 can have the neutral expression as the central expression. The map 1250 can include a plurality of arms 1252 where each arm comprises similar expression with different intensities. The relative positions between each expression can be determined with respect to a primary expression. The primary expression can be any one of the expressions listed on the map 1250. As an example, the primary expression can be "fear".

Deltas between each expression and the neutral expression can be taken to generate delta vectors (e.g., where subtraction or addition may be performed between an expression vector and a neutral vector). FIG. 12C illustrates examples of the delta vectors 1276, 1274, and 1272. The delta vector 1276 can be for pensiveness; the delta vector 1274 can be for yawn; and the delta vector 1272 can be for drowsiness, in this example. The delta vectors (or the unitized delta vectors) can be used to calculate the dot products between the primary vector (e.g., the vector 1276) and other vectors (such as, e.g., vectors 1274, and 1272) to determine the relative positions on the map 1250 (e.g., relative angular positions in a 2D map). As shown in FIG. 12C, an angle θ can be calculated for the angle between the vector 1272 and 1276 which can determine the angular position of the vector 1272 relative to the vector 1276. The vector 1274 is at the same angle θ as the vector 1272 but is at a greater distance from the origin (e.g., the neutral expression), because the drowsiness expression represented by the vector 1274 is more extreme than the yawn expression represented by the vector 1272 (and therefore has longer length). As another example, the dot product of the unitized fear vector and the unitized worry vector can be close to 1, which suggests that the fear vector and the worry vector should be represented in the same arm of the map 1250. The dot product between the unitized fear vector and the unitized pain vector may be around 0.4 which indicates that the direction of the pain vector can be at an acute angle (of about 33 degrees) with respect to the direction of the fear vector.

Figure 12D:
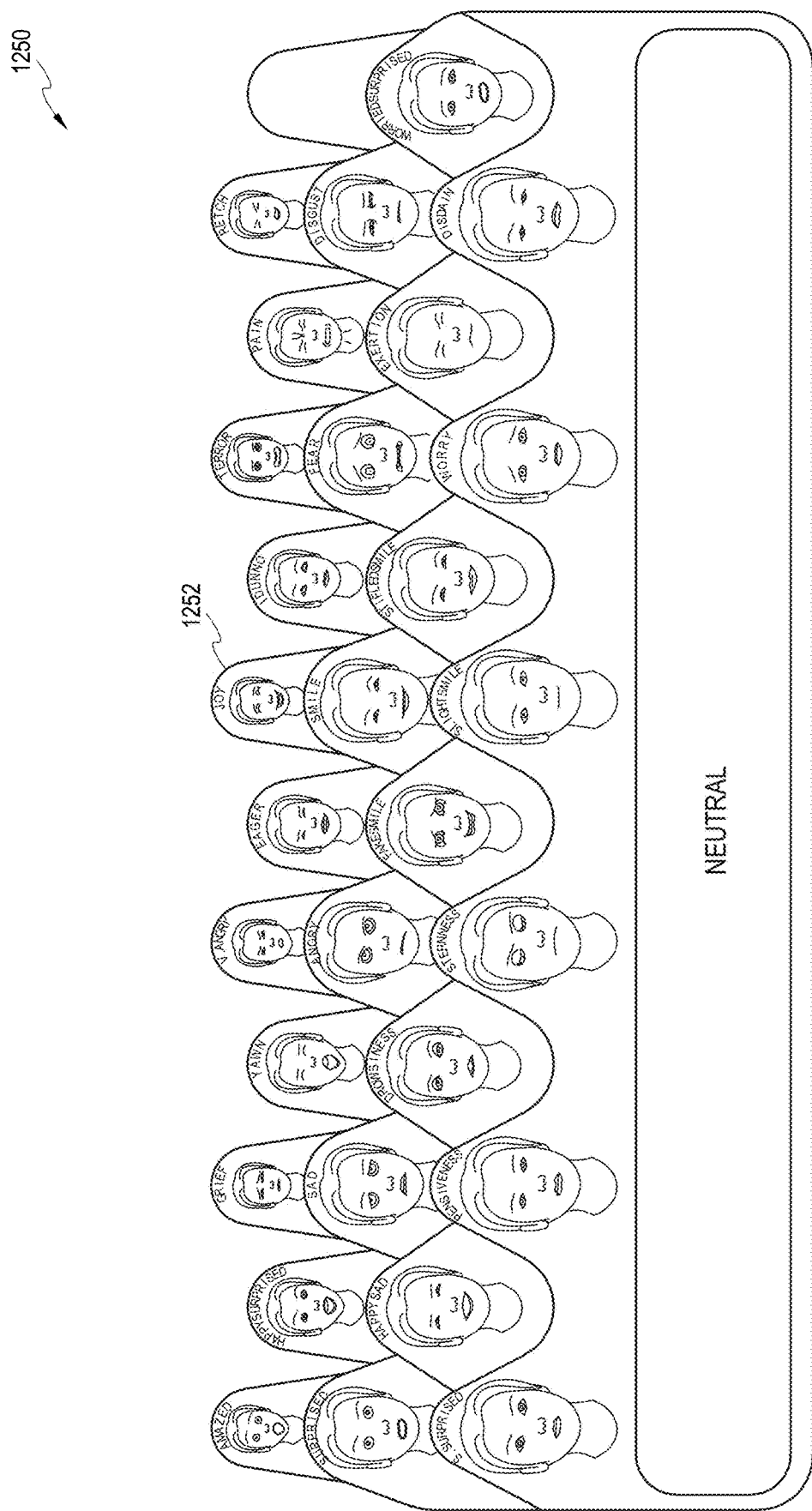
FIG. 12D illustrates another example of a map of expressions.

In addition to or as an alternative to the map shown and described with reference to FIGS. 12B and 12C, the map of expressions can have other ornamental appearances. FIG. 12D illustrates another example of the map 1250 which has a more rectangular appearance than the wheel-like appearance of the map shown in FIGS. 12B, 12C. In the example map shown in FIG. 12D, the neutral expression is shown at the bottom of the map, with arms 1252 extending vertically upward. In this example, the emotions shown in each arm can share a common expression or be connected to the neutral expression.

The map designs shown in FIGS. 12B, 12C, and 12D can be part of a graphical user interface, which can be presented to the user by the wearable system 200 described herein. The appearances of the map of expressions shown in FIGS. 12B, 12C, and 12D are examples, and the expressions can be mapped differently than shown (e.g., in maps having polygonal shape, circular shape, linear shape, 3D shape, etc.).

Animation Blendspace with 2D Projections of Expression

The map 1250 can be used by a rigging control system in an animation blendspace to provide realistic expressions of a virtual character. In animation, only a small subset of possible expressions or emotions may be created as defined vectors. These defined vectors can correspond to the faces (e.g., expressions) as shown in the map 1250. Other expressions can be derived from the animation blendspace by blending a number (e.g., 2, 3, 4, 5, 6, or more) of closest expressions to a blend cursor. For example, with N=3, an animation blendspace can comprise a set of non-overlapping 2D triangles where each vertex of each triangle represents an animation.

FIG. 12C illustrates an example of animation blendspace where N=3. In this example, a triangle 1280 is formed among three expressions: slight smile 1296, smile 1292, and fake smile 1294. A blend cursor 1285 can reside within the triangle 1280 and indicate a proportional amount of the three animations at the vertices of that triangle that are used in rendering the facial expression. The proportions can be based on the distance from the blend cursor 1285 to each of the 3 vertices. The proportions can be used to define the weights of the animations for deriving expressions that are not included in the explicitly defined vectors on the map 1250, thereby permitting the rigging system to interpolate (or morph) between expressions that are explicitly defined. The movement of the blend cursor 1285 is not restricted to a triangle, The blend cursor 1285 can move to anywhere on the map 1285 which would cause the rigging control system to generate a facial expression based on the blend cursor's 1285 current position and N facial expressions around the cursor (e.g., N=3 for a triangle). For example, where the blend cursor 1285 lands on a facial expression that is explicitly projected onto the map (e.g., the sad, worry, happy expressions, etc.), the rigging control system may cause the avatar to show the facial expression. Where the blend cursor 1285 does not land on a particular expression on the map, the rigging control system can generate a facial expression by blending N nearby animations, based on, e.g., the blend cursor's 1285 relative positions with respect to the vertices of a triangle (or other shapes) associated with animation blendspace.

In some situations, unnatural or odd facial expressions may result if the layout of the expressions in the 2D space is not properly selected. Incorrect facial expressions are undesirable as it breaks the realism of the virtual character. Advantageously, techniques for generating the map 1250 can reduce or minimize the likelihood of generating unnatural facial expressions and can create realistic intermediate expressions (e.g., in-between face vectors or blendshapes).

As described with reference to FIGS. 12A and 12B, the map can be generated by mathematically deriving the blendspace layout via subtracting the neutral expression from each key expression (e.g., those that will be part of the map 1250) to generate an expression delta and organizing the expression deltas based on vector analysis principles (e.g., the length of the deltas and the angle between the deltas using the dot products of the deltas). This technique can result in an arrangement which improves or optimizes the positions for the N expressions used to determine the blendspace (e.g., 3 expressions for the triangles described above).

The map 1250 generally is different from other representations of expressions or emotions (e.g., Plutchik's wheel of emotions), which if used directly, can lead to unnatural animation results. For example, the map 1250 can invert the emotions in the Plutchik wheel of emotions to have a neutral zone at the center and have the stronger emotions toward the outer rim of the map 1250. This can advantageously allow the blending of expressions to have a common neutral position at a central location. In addition, if each facial expression is positioned relative to a neutral facial expression, a display can render a relatively neutral facial animation and then add back the current expression (via a delta vector), which would provide a layer of motion to make the face appear natural instead of being frozen (e.g., at an expression) like a wax work.

Example Processes of Generating a Map of Facial Expressions

Figure 13:
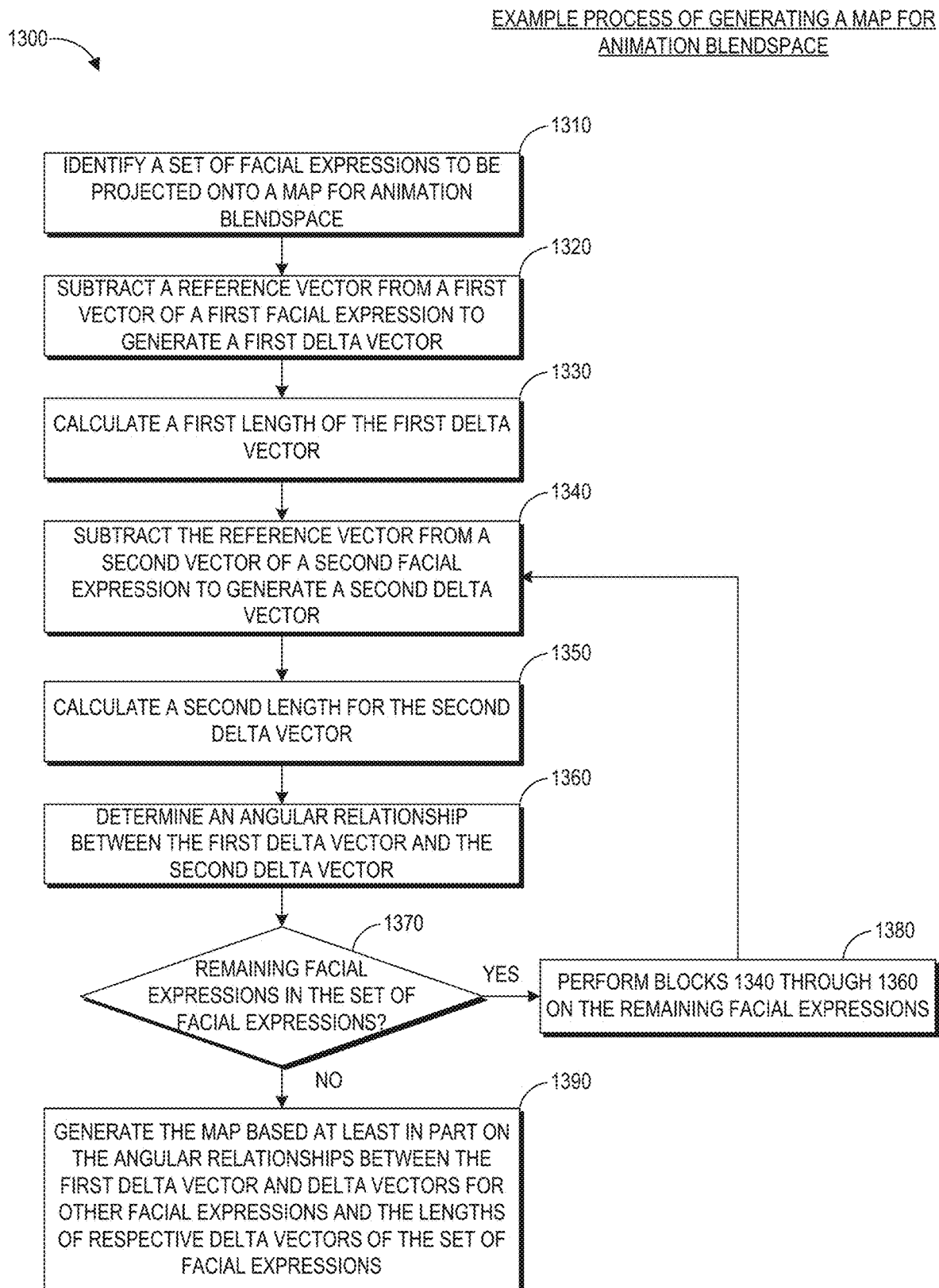
FIG. 13 illustrates an example process of generating a map of facial expressions for an animation blendspace.

FIG. 13 illustrates an example process 1300 of generating a map of facial expressions for animation blendspace. The example process 1300 can be performed by a wearable system 200 (such as, e.g., by the remote processing module 270) or by the computing device 10 shown in FIG. 19. The map can comprise 2D projections of facial expressions. The map may be similar to the map 1250 shown in FIG. 12B. The map can be used to create animation blendspaces for generating facial expressions that are not explicitly shown on the map.

At block 1310, a set of facial expressions can be identified. The set of facial expressions may include key facial expressions which can be mixed (e.g., via animation blendspace) to derive other facial expressions. The set of facial expressions can be projected into a map (which may be in a shape of a wheel, rectangle, or other 2D or 3D shape). The layout of the facial expressions in the map can be improved or optimized for animation blendspace to render realistic facial expressions for a virtual character. The map can be 2D (as in FIG. 12B) but may be 3D or a higher dimensionality in other implementations. The map can have a different number of expressions or arms as compared to the illustrative map shown in FIG. 12B.

At block 1320, a first delta vector can be calculated by calculating the delta between the first vector of the first facial expression and a reference vector. The reference vector may be a neutral vector or any other vector. The reference vector can be used to calculate the delta value with respect to other vectors that will be plotted. The delta value can determine the distance between a vector and the reference vector on the map, as described herein. The vector for the first expression can be set as the primary vector for plotting the other vectors to the map (e.g., the vector that is displayed vertically upward such as North on a compass). As described in the later blocks, the primary vector can be used to determine the angular relationships of the vectors on the map (e.g., a vector is at a certain degree from the primary vector).

At block 1330, the first length of the first delta vector is calculated. The first length can be calculated using the formula (2A) described in the preceding section.

At block 1340, the second delta vector can be calculated by taking the delta between the second vector of the second facial expression and the reference vector. The second delta vector can be calculated using similar techniques as those for calculating the first delta vector.

At block 1350, the second length for the second delta vector can be calculated. The second length can also be calculated using the formula (2A) described herein.

At block 1360, an angular relationship between the first and the second delta vectors is determined so that the second delta vector can be oriented on the map relative to the first delta vector. For example, a dot product of a unitized first delta vector and a unitized second delta vector can be calculated. The dot product value is the cosine of the angle between the two delta vectors and can indicate the relative angular positions between the first facial expression and the second expression in the map for the animation blendspace.

The process 1370 can perform the same analysis for other facial expressions in the set of facial expressions. At block 1370, the process can determine whether there are any remaining facial expressions in the set of facial expressions. If there any remaining facial expressions whose positions on the map is unknown, the process 1300 proceeds to the block 1380, where the processes of block 1340 through 1360 can be performed on a remaining facial expression.

If the positions of all facial expressions are known, at block 1390, a map for animation blendspace can be generated. The map can be generated where each arm 1252 can share a common neutral expression or be connected to a neutral expression. As one example described with reference to FIGS. 12B, 12C, the neutral expression may be positioned in the middle of the map with each arm 1252 extending outward toward a direction. In other examples, the neutral expression can be positioned elsewhere in the map (e.g., the neutral expression is at the bottom of the map shown in FIG. 12D), and the map is not necessarily limited to a wheel or circular shape or a rectangular shape. The first facial expression may be set at a random direction (or defined direction) from the neutral expression (e.g., in the North direction as in a compass). The distance between the first facial expression and the neutral expression can be determined based on the length of the first delta vector.

The positions of other facial expressions in the set of facial expressions can be based on the angular relationships (e.g., from the dot products between the first delta vector and the delta vectors of the other facial expressions). The lengths of the delta vectors for the other expressions can define the distance between the other expressions and the neutral expression on the map (e.g., how far away from the center the expressions are placed, which correlates with the strength of the expression).

The blocks in the process 1300 do not have to be performed in a certain order. For example, block 1360 can be performed before the block 1350 or at the same time as the block 1350.

In some embodiments, a wearable system (e.g., the system 200) or a computing device (e.g., the device 10) can render the map 1250 to a user of the system. The user may be able to provide input (e.g., via a totem 466) to the rigging control system by moving a cursor around in the map 1250 and selecting an expression (see, e.g., FIG. 12C showing the blend cursor 1285 and the blendspace 1280 for the map 1250). The rigging control system can then cause an avatar to be rendered (remotely or on the same computing device) based at least partly on this user input. This may be advantageous when a user wants his or her avatar to display an expression that is different from the user's actual expression in the real world. Thus, the user can navigate within the map to select the expression or expression transitions that the user would like his or her avatar to display.

Examples of Transitioning Facial Expressions

A virtual character's expression can change from time to time (e.g., as the blend cursor is moved through the animation blendspace or through the map 1250, in response to a user's interaction, or in response to an event in the virtual character's environment). However, during such transitions, the whole face would be changed from one expression to another at once. For example, when an avatar's expression is transitioned from sad to happy, all regions of the avatar's face would change simultaneously. This results in unnaturalness in the avatar's facial expression as a real human face does not change from one expression to another all at once. The expressions of a real human face tend to sweep across the face. For example, during the transition from sad to happy, the eyes may start to show an expression indicating smiling before the mouth changes to smile.

An improved transition system can be implemented to reduce unnaturalness. This transition system can specify a starting facial expression, an ending facial expression, and a sweep direction for each point in time. A sweep speed may be specified to indicate how quickly (or how slowly) the transition from the starting facial expression to the ending facial expression occurs. The starting facial expression can correspond to a first vector and the ending facial expression can correspond to a second vector. The sweep direction can control which variable of a face vector will be changed from a value associated with the first expression to a value associated with the second expression. The sweep speed can control the rate of this change. For example, assuming the sweep direction is downward (e.g., from the top of the face to the bottom of the face or from the nose to the mouth, etc.), the sliders associated with the eye region can be moved before a slider associated with the mouth is updated to move from the starting facial expression to the ending facial expression. Because this transition system implements a sweep, delays can be added to variables of the vectors based on the sweep direction or the sweep speed. As a result, the change of values for certain variables may not occur immediately in response to a change of expressions and thus may appear more realistic. Further details are provided below in the context of an example spring system that can be associated with the sliders.

The parameters of the transition system can be altered to change the direction of the propagation (which is also referred to as sweep direction) or the sweep speed. As an example, the sweep direction can be radial such that the expression change can start at a point (e.g., the nose) and propagate outward from that point. The transition system can execute differently depending on the starting and ending expressions. For example, the sweep direction or speed can be different where the transition is from happy to angry versus from angry to outrage. Thus, the sweep direction can be, e.g., from an upper face region to a lower face region, from a lower face region to an upper face region, from a center face region moving radially outward, and so forth. The sweep speed can reflect the typical time humans change their expression, e.g., in a range from about 50 ms to 1000 ms.

Advantageously, the techniques of the transition system described herein can be dynamic and allow transitions from an expression to any other expression at any point in time. The transition techniques can allow seamless flow from one expression state to another, and enable the expression to sweep across the face. The transition can start at any point and finish at any ending point (even though another transition is still in progress), and the direction or speed of the sweep can be different or randomized for every play-through (of the same transition), which can advantageously provide more realistic expressions and appearances for virtual characters. Further, the transition system here can quickly and easily derive intermediate expressions (or in-between face vectors) based on the map for the animation blendspace, because the expressions can be projected into the map as multiples of each other (e.g., based on the distance to the neutral vector) in each direction (e.g., as shown in the arms on the map 1250).

This is in contrast with traditional pre-rendered animation technologies for sweeping expressions across the face. The traditional pre-rendered animation usually pre-selects two expressions—a start expression and an end expression—and then blends the two in order to create an animated character. The pre-animated facial expression sweep has a fixed starting point and a fixed end point, and the animations are constant for each play-through. Further, because transition is a pre-rendered animation, it has to be played from beginning to end before the virtual character can transition to another expression. As a result, the virtual character cannot change expression or perform another action during the transition.

Embodiments of the present system permit dynamic transitioning that does not have the limitations of traditional pre-rendered animation techniques. For example, the system may be transitioning from expression A to expression B. Before completion of the transition, the expression of the avatar changes so that the avatar should be rendered with expression C, rather than expression B. The system can naturally and dynamically change the sweep direction (or speed) so that the transition moves to expression C (rather than expression B). As discussed, traditional techniques require the system to complete the transition to expression B before then transitioning to expression C, which can appear unnatural and may cause a noticeable delay between the virtual character's reaction time and environment.

FIG. 14A illustrates an example of transitions of expressions of a virtual character where the whole face changes from one state to another at the same time. FIG. 14A illustrates 4 expression states at different points in time: neutral state at state 1412, sad state at the state 1414, a worried state at the state 1416, and a surprised state at the state 1418, for an avatar's face 1400. In this example, the face 1400 is divided into 3 regions: regions A, B, and C for simplicity of illustrations. The region A corresponds to the upper face, the region B corresponds to the nose region, and the region C corresponds to the lower face. In other examples, a different number of facial regions could be used, e.g., 2, 4, 5, 6, or more. In other examples, a facial region may correspond to an individual facial control.

At time 1, the entire face is in the neutral state 1412 (e.g., regions A, B, and C are all in the neutral state). The face can be changed to the sad state 1414 at time 2. However, this transition would cause regions A, B, and C to be changed from neutral to sad simultaneously as shown by the table 1420. The face can further be transitioned from the sad state 1414 to the worried state 1416 at time 3 and from the worried state 1416 to the surprised state 1418 at time 4. Similar to the transitions from the state 1412 to the state 1414, the transitions from the state 1414 to the state 1416 and from the state 1416 to the state 1418 occur with all regions A, B, and C of the face changing simultaneously. As a result, the virtual avatar may appear unnatural when its facial expressions have changed, because the entire face changes at the same time.

Figure 14B:
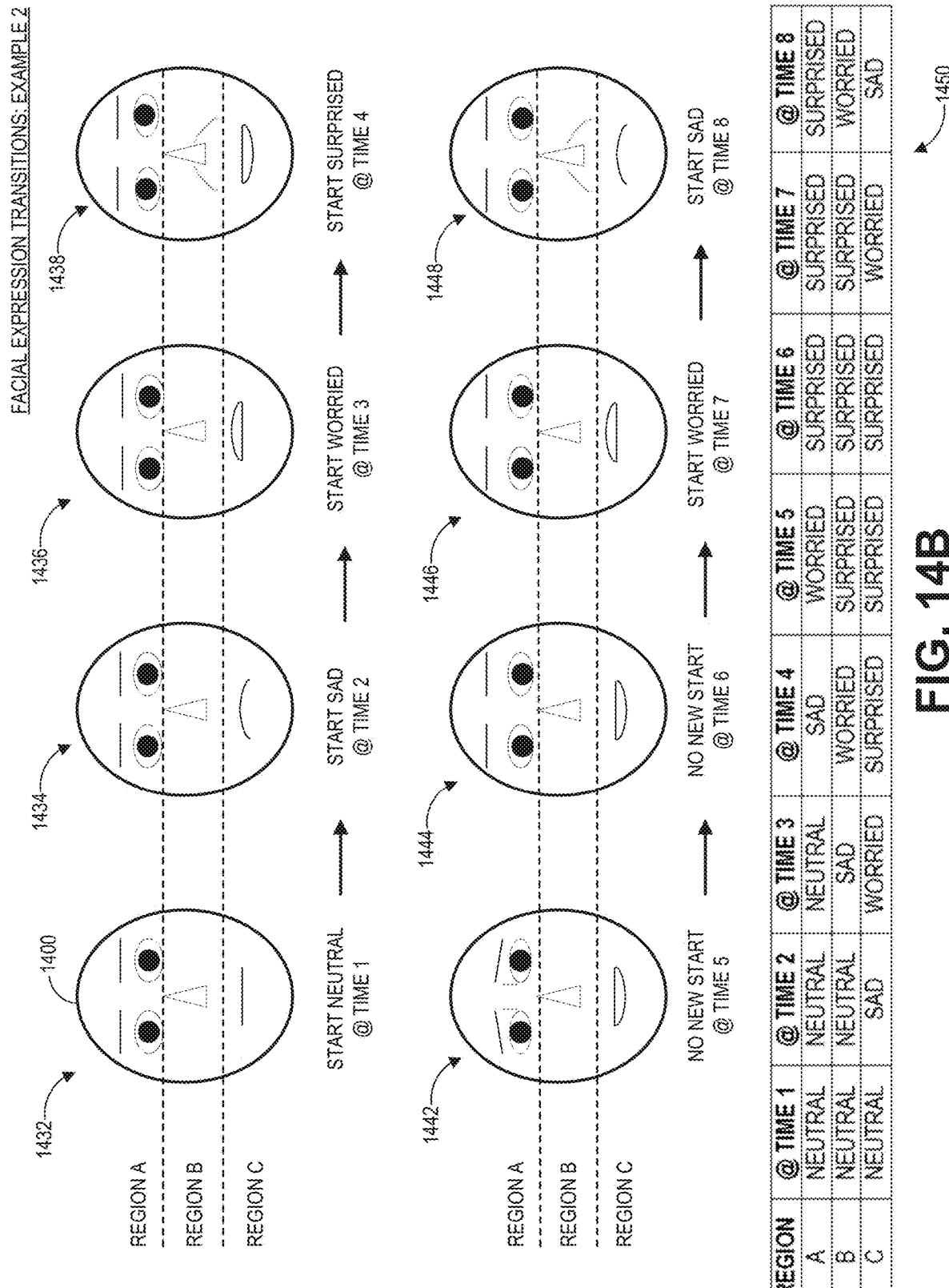
FIGS. 14B and 14C illustrate an example of a swept transition mechanism that transitions expressions in different facial regions at different times.
Figure 14C:
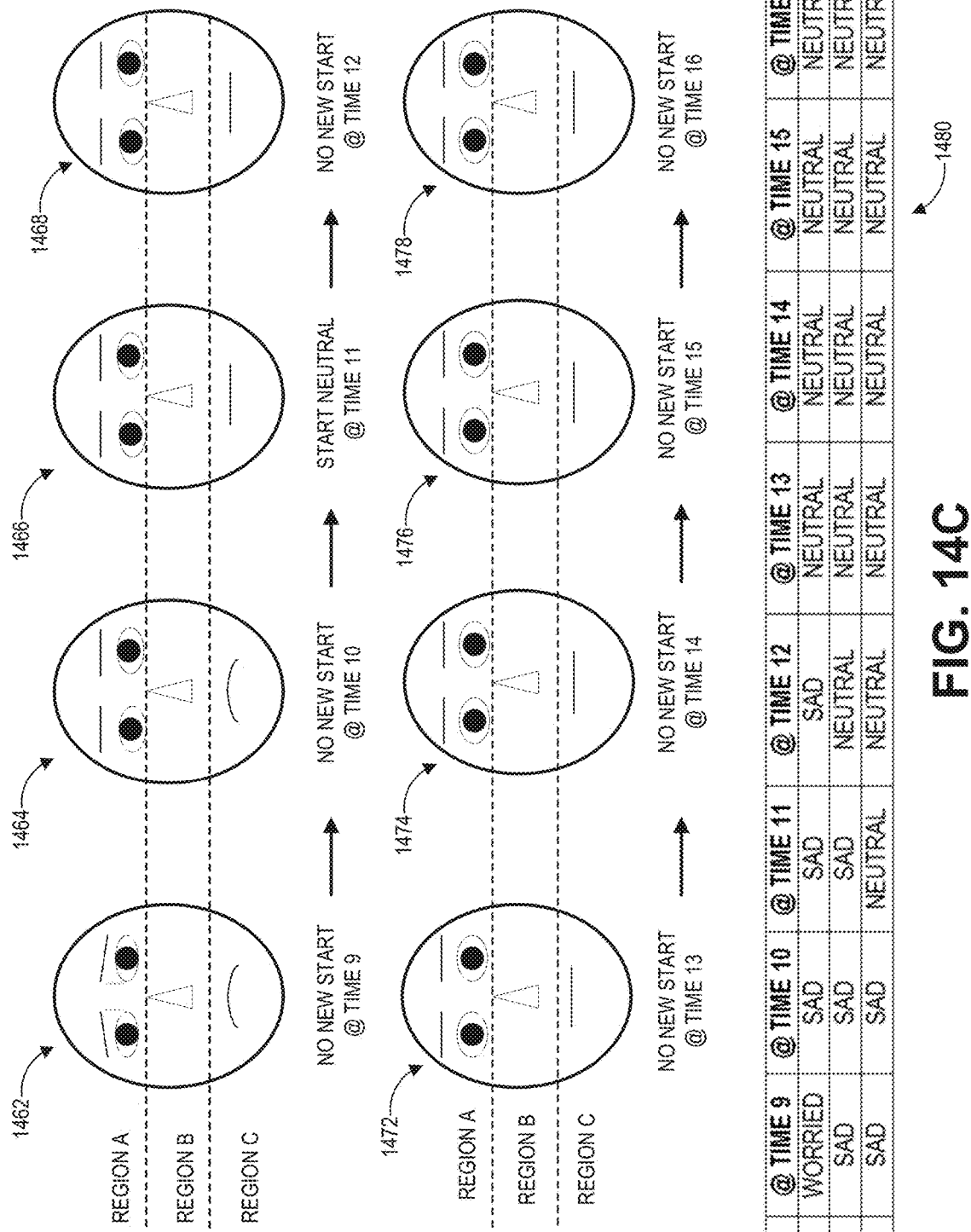

FIGS. 14B and 14C illustrate an example where the rigging control system includes a transition system that dynamically updates a virtual character's facial expressions in a swept fashion. As a result, the expressions of the face can be constantly updating without needing to wait for the complete of a transition. Different regions of the face can transition differently, e.g., with different speeds and with different expressions.

The examples shown in FIGS. 14B and 14C assume that the sweep direction is steady (e.g., upward in FIGS. 14B and 14C), although this is assumed for illustration and is not a limitation. In these examples, the avatar's expression can change from neutral, to sad, to worried, to surprised, and backwards. Each of the three facial expressions can sweep across the face (in the sweep direction) in succession. If the speed of the sweep is matched with the rate of the change of the expression, the face may at one point have a sad mouth, a worried nose, and surprised eyes (see face 1448 at time 8 in FIG. 14B). In situations where the speed of sweep is slower than the rate of change of expressions, a viewer may not be able to perceive an earlier facial expression on some portions of the face. If the speed of sweep is faster than the rate of change of expressions, the whole face (or at least a portion thereof) can have the previous expression before the new expression starts to be shown on the face.

FIG. 14B shows an example of the face 1400 from time 1 through time 8. Note that the face transition between time 1 and time 8 in FIG. 14B generally corresponds to the face transition between time 1 and time 4 in the traditional system shown in FIG. 14A. At time 1, the entire face is at a neutral state 1432. As shown in the table 1450, the regions A, B, and C are all in the neutral state 1432 at time 1. At time 2, the face 1400 is being transitioned in to a sad state. However, because a swept transition mechanism is implemented, the region C at the bottom of the face is changed to sad at time 2 whereas regions A and B remain neutral at time 2 (due to the upward sweep direction). As a result, at state 1434, the lower face shows a sad expression whereas the upper face and nose region remain neutral.

At time 3, a transition to a worried expression is triggered. But the transition to the sad state has not yet completed. Advantageously, rather than waiting for the transition from neutral to sad to complete, at time 3, the region C can be automatically changed to a worried expression even though the transition to the sad expression across the remainder of the face has not yet been completed. As shown in the state 1436, the lower face (region C) has a worried expression at time 3 because the worried expression is triggered. However, region B is transitioned from the neutral to sad, because the sweep has reached region B. At time 3, the sweep has not yet reached region A (at the top of the face), and region A remains in a neutral expression.

At time 4, however, a surprised expression may be triggered. As described with reference to state 1436, the region C can show a surprised expression at state 1438 because the seep is upward and begins in region C. Whereas region B can show a worried expression (to continue the transition from sad to worried) and region A can show a sad expression (to continue the transition from neutral to sad, because the sweep has now reached the top part of the face). Thus, at time 4, the 3 regions A, B, C of the face each rendered with a different facial expression.

At time 5, there is no trigger for a new expression, as a result, at state 1442, the transition to the surprised expression continues to sweep up on the face (as shown by the change in expressions in region B). Transition from the sad to worried can continue (as shown by the change in expressions in region A) and complete at time 5. There is also no new trigger at time 6. As a result, when transitioning from state 1442 to 1444, regions C and B remain in the surprised state, and region A transitions from worried to surprised. All three regions A, B, and C are now in the surprised expressive state at time 6. This facial expression corresponds to the state 1418 in FIG. 14A in which the entire face is surprised. However, the example transition shown in FIG. 14B sweeps across the face and appears more natural and realistic than the abrupt transitions shown in FIG. 14A.

Continuing with this example, at time 7, a worried expression is triggered for the avatar. As a result, the expression in region C is changed to worried whereas the expression in the remaining regions remain surprised due to the upward sweep as shown in state 1446. At time 8, a sad expression is triggered and the expression in the region C is changed to sad. In state 1448, the upward sweep for worried continues in region B while region A remains in the surprised state.

With reference to FIG. 14C, at times 9 and 10, there are no new triggers, and the lower region C remains in the sad state. The upward sweep for the sad expression and the worried expression continues. The transition to worried completes at state 1462 whereas the transition to sad completes at state 1464. Once the transition to an expression completes, the expression can stay until a new trigger to change to a new expression is detected. The newly triggered expression then begins to sweep across the face.

At time 11, a trigger for the neutral expression is detected. For example, after an avatar has a certain expression for a period of time, the intensity of the expression may decrease (e.g., the avatar has lost interest of an object or the avatar's emotional or expressive state has cooled down) and return to neutral. At the state 1466, the bottom of the face (region C) appears to be neutral whereas the expressions in the regions A and B remain unchanged compared to the state 1464. No new triggers are detected for times 12 through 16. As a result, the neutral expression can gradually sweep through the face as shown in states 1466 through 1472 and remain at the neutral state as illustrated in states 1474 through 1478 and the table 1480.

Although the examples shown in FIGS. 14A-14C divide the face into three regions, in various example situations, the regions of the face can be divided differently. For example, the regions could be arranged horizontally (rather than vertically as shown) or arranged in rings extending away from a central portion of the face (e.g., the nose). Each region may also be defined by one or more face sliders. Further, in addition to or in alternative to dividing the face into regions, similar transition techniques (or delay mechanisms) can be applied to variables of the face (e.g., the face sliders described with reference to FIG. 11).

Although the sweep direction is set as upward in FIGS. 14B and 14C, advantageously, in some embodiments, the sweep direction can be randomized to provide more vivid facial expressions. To enable randomization of the sweep direction, the sweep direction can be programmed independently from the triggering events of changes in facial expressions or emotions. As a result, one expression can be changed to another via a number of sweep directions. For example, to change from worried to happy, the facial expression change can start at the chin and sweep up where a worried mouth turns into a smile followed by worried eyes turning into smiling eyes. Alternatively, the facial expression change can start at the forehead; sweep down with the eyes changing from worried to smiling eyes; and then the mouth changes form worried to smiling. Many variations are possible, and the rigging system can use a random number generator to select how the regions are swept. This technique will generate avatar facial transitions that are different each time the avatar makes the transition. Rather than always making a transition (e.g., from neutral to smiling) in exactly the same way, which leads to a robotic appearance in the uncanny valley, the rigging system can randomize the transitions to make the avatar appear more lifelike and less robotic.

In some situations, a sweep direction change accompanying an expression change can cause the virtual character to flip flop facial expressions which can cause an unnatural result. To get around this problem, the sweep direction may be set to change when the expression is not changing. To determine whether the expression is changing, the transition technique can calculate a historical velocity of the blend cursor (e.g., the cursor 1285) on the wheel of expression. The expression remains the same when the historical velocity equals zero.

Example Processes of Transitioning Facial Expressions

Figure 15:
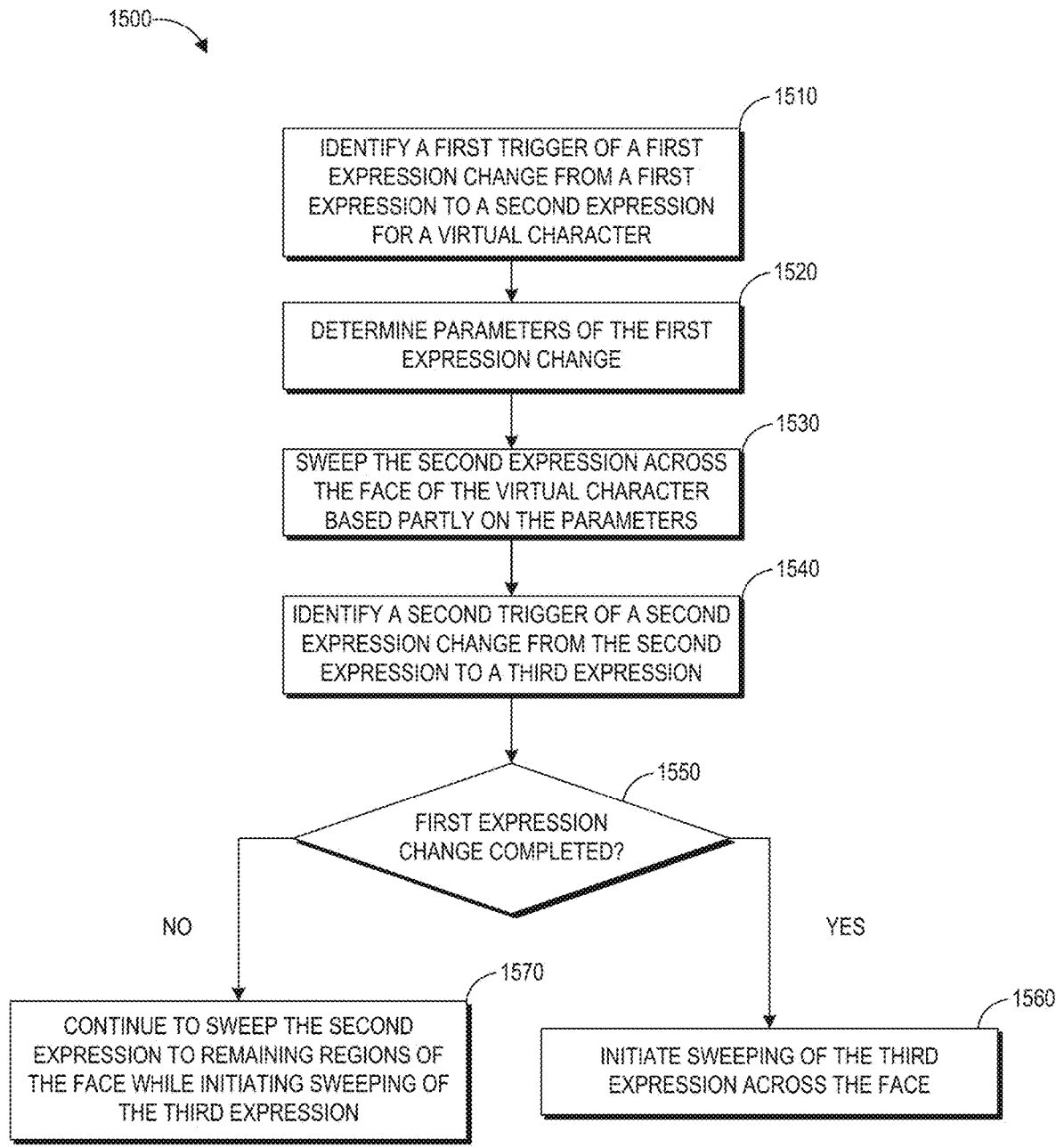
FIG. 15 illustrates an example process for transitioning facial expressions.

FIG. 15 illustrates an example process for transitioning expressions of a virtual character. The example process 1500 can be performed by the wearable system 200 (e.g., modules 260, 270 or the avatar processing and rendering system 690)

or the computing device 10 described with reference to FIG. 19. The example process 1500 can be performed during real-time while a virtual character is interacting with a viewer or the environment.

The virtual character may have a current state of facial expression. The current state of facial expression can be a neutral expression or the last expression in which the virtual character has expressed. At block 1510, the process 1500 can identify a first trigger of a first expression change from a first expression (which may be the current state of the facial expression) to a second expression. The trigger may be based on a viewer's interaction, an event of the environment, or certain predefined criteria (e.g., time elapsed since the last expression), etc. For example, a user's action may cause the virtual avatar to appear happy, angry, sad, etc. As another example, a loud sound can cause the virtual character to show a scared or surprised facial expression. As yet another example, the avatar of a user can reflect the user's facial expression, which can be obtained, e.g., from an external camera in the environment or from the inward-facing imaging system of a wearable device. For example, when a user is angry, the avatar of the user can also have an angry facial expression.

At block 1520, the process 1500 can identify parameters of the first expression change. The parameters can include a sweep speed or a sweep direction associated with the first expression change. The sweep speed and direction may be associated with the dynamic transition mechanism for implementing the avatar's expression change across the face described with reference to FIGS. 14B and 14C. The parameters can also include regions of the face (e.g., regions A, B, C illustrated in FIGS. 14B, 14C) across which the expression will be swept.

At block 1530, the second expression can be swept across the face of the virtual characters based on the sweep speed and direction. For example, when the sweep occurs, a first region of the face can be identified based on the sweep direction, where the expression in the first region can be changed from the first expression to the second expression. For example, where an avatar is changed from neutral to happy, the first region of the face can show a happy expression even though other regions of the face may still show a neutral expression. The location and size of the first region can be determined based on the sweep speed or direction. A fast sweep speed may cause a larger region to have the happy expression at a given time than a slow sweep speed, because the expression propagates across the face more quickly with a fast sweep speed. The direction of the sweep can also affect which region of the face will have the happy expression.

At block 1540, a second trigger for expression change is detected. This trigger can cause the facial expression of the virtual character to change from the second expression to a third expression (which may include the original expression, such as, e.g., the first expression at blocks 1510 and 1520).

At block 1550, the process 1500 can determine whether the first expression change has been completed. The process 1500 can check whether different regions of the face (e.g., regions A, B, C) have completed the expression change. The process 1500 can additionally or alternatively make such determination by calculating or accessing a rate of expression change. This rate can be calculated based on the expression change from the first expression to the second expression and from the second expression to the third expression over a time period. The expression change may be driven by user input (e.g., a user adjusting the cursor 1285 described with reference to FIG. 12C) or be external events or influences in the real or virtual environment (e.g., interactions among avatars or users, interactions between an avatar and real or virtual content in the environment), etc.

The appearance of the avatar can depend on the rate of expression change and can be used together with the sweep speed to determine the current facial expression(s). For example, if the rate of expression change is faster than the sweep speed, the first expression change may not have been completed before the second expression change occurs. As a result, at block 1570, the process can continue with the first expression change by sweeping the second expression across the remaining regions of the face while initiating the second expression change by changing the regions of the face that are already in the second expression to the third expression. As an example, the process 1500 can apply a second expression to a first region of the face while apply the third expression to the second region of the face.

In some situations, if the sweep speed is fast enough, the first expression change may have already been completed before the second expression change occurs. As a result, the full face may show the second expression before the third expression appears on the first region of the face. Thus, at block 1560, the process 1500 can initiate the second expression change by sweeping the third expression across the face using parameters associated with the second expression change.

Animating a Virtual Character with Realistic Physics

If the face is animated by adjusting face vector component values or adjusting face sliders, sometimes the face may appear to be mechanical. To increase the naturalness of the facial movements, additional physicality can be added in a physics-based program to simulate realistic physics based movements of the skin. For example, the cheeks may bounce more than the nose because the cheeks are a less controlled and have softer body mass than the nose. Also, the physics based simulation can soften the entry to and exit from motion. For example, when eyebrows are raised the nature of their control muscles and their weight can ease them into a motion as opposed to an abrupt, robotic jumping into the motion.

The physics-based program is typically implemented as a separate software program apart from the rig. However, on a device with limited computational power (e.g., a wearable device or a computing device 10 which has limited processing capacity), this implementation may introduce delays or may render the physics-based program unsuitable for certain implementations. Further, in many AR/VR/MR applications, the realistic physical movements may need to be rendered in real-time in response to a user's interaction or an event in the environment, which further increases the computational requirements to implement the physics based program.

To provide realistic physical movements for the face on a computationally limited device or in real time, embodiments of the avatar control system may incorporate a spring system that can be tuned to mimic realistic facial motions (e.g., bounce of cheeks during a smile). For example, a tunable spring system can be added to some or all of the control values of the face vector (or face sliders) without needing to build out an entire separate physics-based program for the face. The tunable spring system can operate in real time on computationally-limited hardware processors.

Figure 16A:
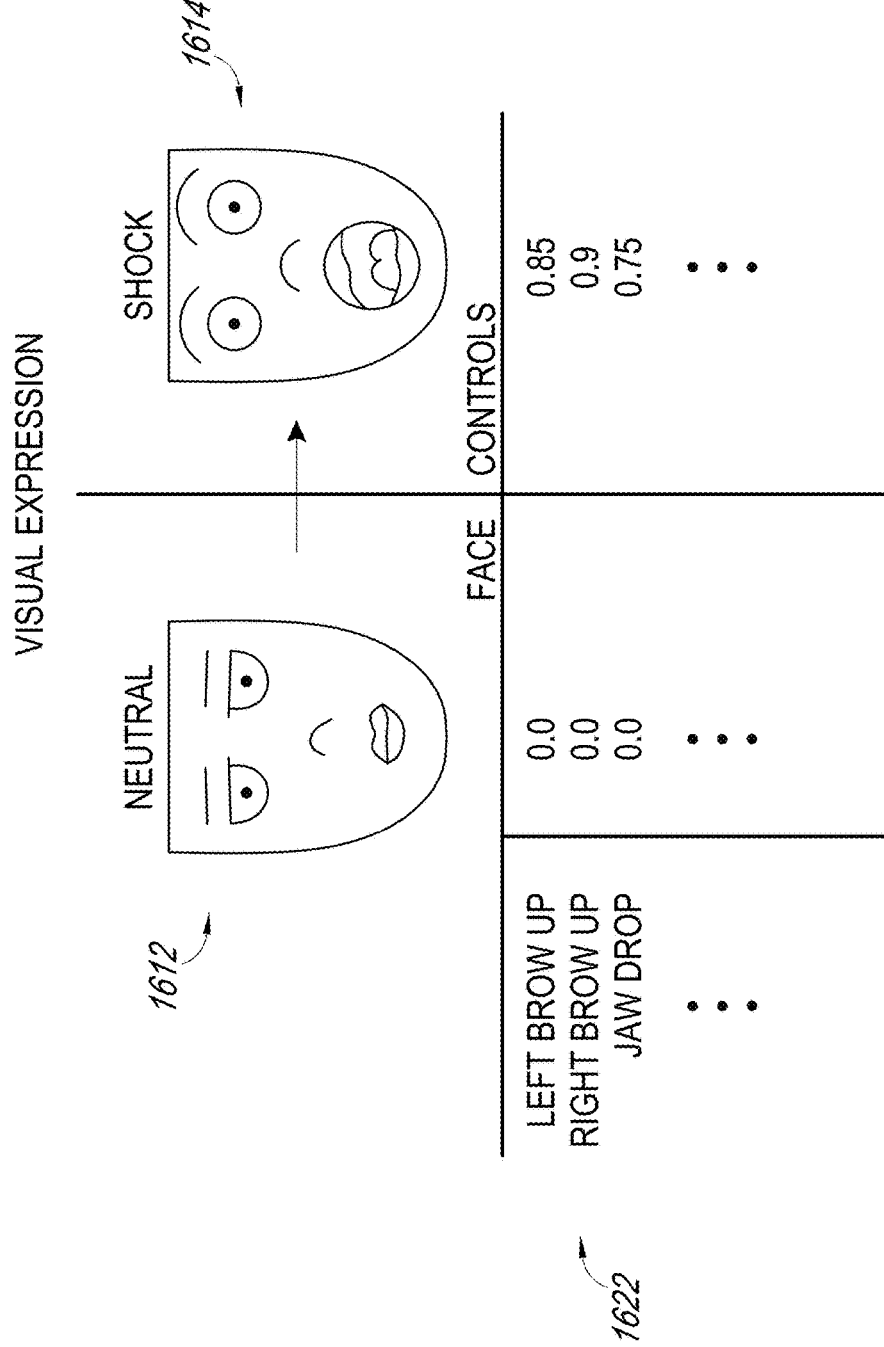
FIG. 16A illustrates an example of face vectors for a transition between a neutral expression and a shocked expression. The component values of the face vectors are sometimes referred to as sliders.

FIG. 16A illustrates an avatar face transitioning between two expressions: neutral 1612 and shock 1614. As described with reference to FIG. 12A, an expression can be represented by an n-dimensional face vector having a set of control values 1622 for controlling the face's movements. The control values within the face vector can be different for each expression. For example, as seen in FIG. 16A, control values for the neutral face vector (associated with a neutral facial expression) are different from the control values for the shock face vector (associated with a shocked facial expression). As described above, in some implementations, the number n is 100 or more (e.g., 137) depending on the rig associated with the face vector.

To add physicality to transition the face from a first expression to a second expression (e.g., from neutral to shock as shown in FIG. 16A), the tunable spring system can include a tunable control parameter for some or all of the control values of the face vector to give the appearance of more realistic physical movements. Each slider can have its own tunable spring to simulate real physical movements (e.g., elasticity), because different parts of the face can behave differently. For example, if a virtual character transitions to a big smile, the cheek (which is fleshier and thus would result in more bounce), would have a different movement than the nose (which is more rigid and thus would result in less bounce or movement when touched). As will further be described with reference to FIG. 16B, the tunable control for a slider may start to take effect when the transition from one expression to another is triggered or after the control value of the variable to which the tunable control is added has reached a threshold level.

Formulae 4A-4C illustrate an example of incorporating a tunable spring system in a face parameter. As will further be described with reference to FIG. 16B, the tunable spring system can be incorporated in a face parameter to drive the movement of a portion of the face during the transition from a control value to another (until the control value of the parameter settles on a target value of the desired expression).

In the formula (4A) below, a force for compressing or extending the tunable spring is calculated.

$$F = K \times (P_{target} - P_{t-1}) \quad (4A)$$

In this example, F represents the force exerted by the tunable spring, K represents a spring constant for the tunable spring associated with the face parameter, and ($P_{target} - P_{t-1}$) represents the displacement of the spring between its target (or equilibrium) value and the value (or position) of the spring at time t−1 where $P_{target}$ is the target value for the face parameter (to achieve an expression) and $P_{t-1}$ is the value (or position) of the spring at time t−1.

The force calculated from the formula (4A) can be used to calculate the acceleration ($A_t$) associated with the external force exerted by the spring at time t. The acceleration ($A_t$) which can be used to calculate the velocity of the spring at time t ($V_t$) as shown in formulae (4B-i) through (4B-iii) below.

$$A_t = \frac{F}{M} \quad (4B\text{-}i)$$

$$\Delta T = T_t - T_{t-1} \quad (4B\text{-}ii)$$

$$V_t = V_{t-1} \times D + \Delta T \times A_t \quad (4B\text{-}iii)$$

where M is the mass being accelerated by the spring, D is a damping constant to simulate friction, $V_{t-1}$ represents the velocity of the spring at time t−1, and $\Delta T$ represents the time interval between time t and time t−1. The time interval can be any interval specified by a programmer or a user (e.g., 10 ms, 1 ms, 0.5 ms, etc.). In this example, the damping constant D simulates the damping motion (in the physical world) by adding a drag to the velocity. Thus, the constant D may be in the range of [0, 1]. With reference to FIG. 16B, the time between t1 and t2 or after t2 can be subdivided into smaller time intervals and these smaller time intervals may be used for calculations of $\Delta T$.

The position of the spring at time t (which can correspond to the control value of the face parameter at time t) can be calculated using the formula 4C below.

$$P_t = P_{t-1} + \Delta T \times V_t \quad (4C)$$

The values for $V_t$ and $P_t$ can be updated during a transition between two facial expressions, starting from an initial position (e.g., at time t=0) to a final target position.

Any or all of the spring parameters K, M, and D can be tuned in the above formulae. As an example, where a face parameter corresponds to a fleshier region of the face (e.g., a cheek), the value of K for the spring (associated with the face parameter) can be small. On the other hand if the face parameter corresponds to a stiffer region of the face (e.g., the nose), the value of K may be larger. The mass M can be tuned, e.g., such that a heavy brow is represented by a larger mass M.

The value of a tunable spring control can move directionally with the corresponding slider. The movement can be in 1D or 2D or 3D. For example, where the slider is a spreader (e.g., which expands in two directions, such as x and y directions), the slider movement can be in 2D space.

FIG. 16B illustrates graphs associated with tunable controls for face sliders. The graphs 1630, 1640, 1650 show three examples of how the value of the left eyebrow component of a face vector changes when a facial expression changes from a neutral expression to a shocked expression (as shown in FIG. 16A, first row below visual expressions in 1622) as a function of time. In this example, the value of the left brow dimension equals 0 when the avatar is in the neutral expression, whereas the value is 0.85 when the avatar is shocked. These graphs show three different examples of transitioning the left brow dimension value (on the vertical axis) from 0 (neutral) to 0.85 (shocked) over a time period (on the horizontal axis). Although these graphs show the behavior of the spring system for the left brow dimension slider, similar behavior applies for other face vector components to which a spring is applied. In the graphs 1640, 1650, the position as a function of time was calculated by solving formulae 4A-4C.

In FIG. 16B, each of the graphs 1630, 1640, and 1650 have three regions. The first region is between time 0 and time t1 during which the avatar's expression is neutral. The second region is between times t1 and t2, during which the avatar's expression is transitioning from neutral to shocked. During this period, the tunable spring control can be turned on and the value controlling the left eye brow may start to change. The third region is from time t2 onward where the avatar remains shocked. In this phase, the control value can reach a target value which may trigger the physicality to be applied. The control value may asymptote to the target value (e.g., 0.85 for the left brow) and may (optionally) have a decaying oscillation around the target value. Thus, a tunable spring provides a way to make the transition between two slider values more realistic and lifelike than an abrupt transition or a straight linear transition.

The graph 1630 illustrates an example of how the value of the left eyebrow parameter changes when no spring is added to the left eye brow variable and the transition is performed linearly. At t2, once the control value reaches the targeted value of 0.85, the control value no longer changes. As a result, the transition between neutral and shocked may appear to have an abrupt start and an abrupt stop at the two vertical lines indicating t1 and t2, and thus give the eyebrow raise of the avatar a robotic or mechanical appearance.

The graph 1640 illustrates a scenario where a tunable spring is added to the variable for the left eyebrow. The tunable spring can simulate the behaviors of a physical spring. As a result of the tunable spring, the control value (which can be calculated using the formulae (4A-4C)) can gradually increase nonlinearly between t1 and t2, oscillate around the target value after t2, and eventually settles on the target value. Further, the slope of the curve (which corresponds to the velocity in the formula (4C-ii)) between t1 and t2 starts small (near 0), gradually increases, and then may gradually oscillate around and decrease back to 0 as the transition completes. In contrast, in the graph 1630, the slope of the curve instantly jumps from 0 to a constant which remains the same between t1 and t2, and then instantly jumps back to 0.

The behavior of the curve in the graph 1640 is similar to the behavior of an underdamped spring system and may exhibit damped, oscillatory ringing after time t2 as the curve approaches the asymptotic target value (of 0.85 in graph 1640). Depending on the type of facial movement that is desired for a control value, the spring parameters (e.g., K, M, or D) can be tuned to be overdamped or critically damped. After the time t2, when the control value reaches the target value (e.g., at 0.85) for the shocked expression, the effect of the tunable spring can cause the left eyebrow to change slightly (up and down) and gradually becomes steady which increases the naturalness of the appearance of an eyebrow raise.

The graph 1650 illustrates a scenario where the weight value within the spring system is adjusted to be heavier than that in the example 1650. For example, the mass of the spring (e.g., the variable M in the formula (4B-i)) associated with the graph 1650 may be larger than that in the graph 1630). In this example graph 1650, once the value reaches the target value of 0.85, the tunable spring can cause the value of the variable to fluctuate to 1 (as compared to slightly under 1) at time t. Further, in this example, because the mass is bigger for the spring in the graph 1650, the tunable spring in the graph 1650 can cause the eye brow to move quickly (e.g., note that the control value remains near 0 but then increases more quickly toward the target value than in the graph 1640) and with greater amplitude. The eyebrow may appear to bounce up and down rather suddenly, which can give an unnatural effect of a rubber face as the spring is not tuned properly.

In addition to or as an alternative to solving formulae 4A-4C, the tunable spring system can include a function that represents the linear or oscillatory, damped behavior for face parameters shown in the graphs 1630, 1640, 1650. For example, one or more of the parameters of a face vector may be associated with a linear ramp function or a damped, sinusoidal function (e.g., those described with reference to FIG. 16B) which controls the behavior of the parameter. The function can be represented by a mathematical function, a spline (or other interpolating) curve, or a lookup table. The tunable spring system can determine the movements of the region of the face (associated with the parameter) based on the function. The function may be previously defined and stored, and thus the amount movement of the face may not have to be calculated from the formulae 4A-4C prior to or during rendering, which may increase computational efficiency.

In certain implementations, the tunable system can be combined with the transition mechanisms described with reference to FIGS. 14A-15 to provide a more realistic animation of the virtual character. The transition mechanisms can happen independently of the tunable springs described with reference to FIGS. 16A and 16B. For example, where the face sweeping mechanism is implemented, it may result in a series of changes of control values starting at slightly delayed times relative to the other controls to represent the sweep of an expression across a face. The tunable controls may also take effect for the variables at different times.

Animating a Virtual Character with Realistic Physics and with Sweep

Figure 17:
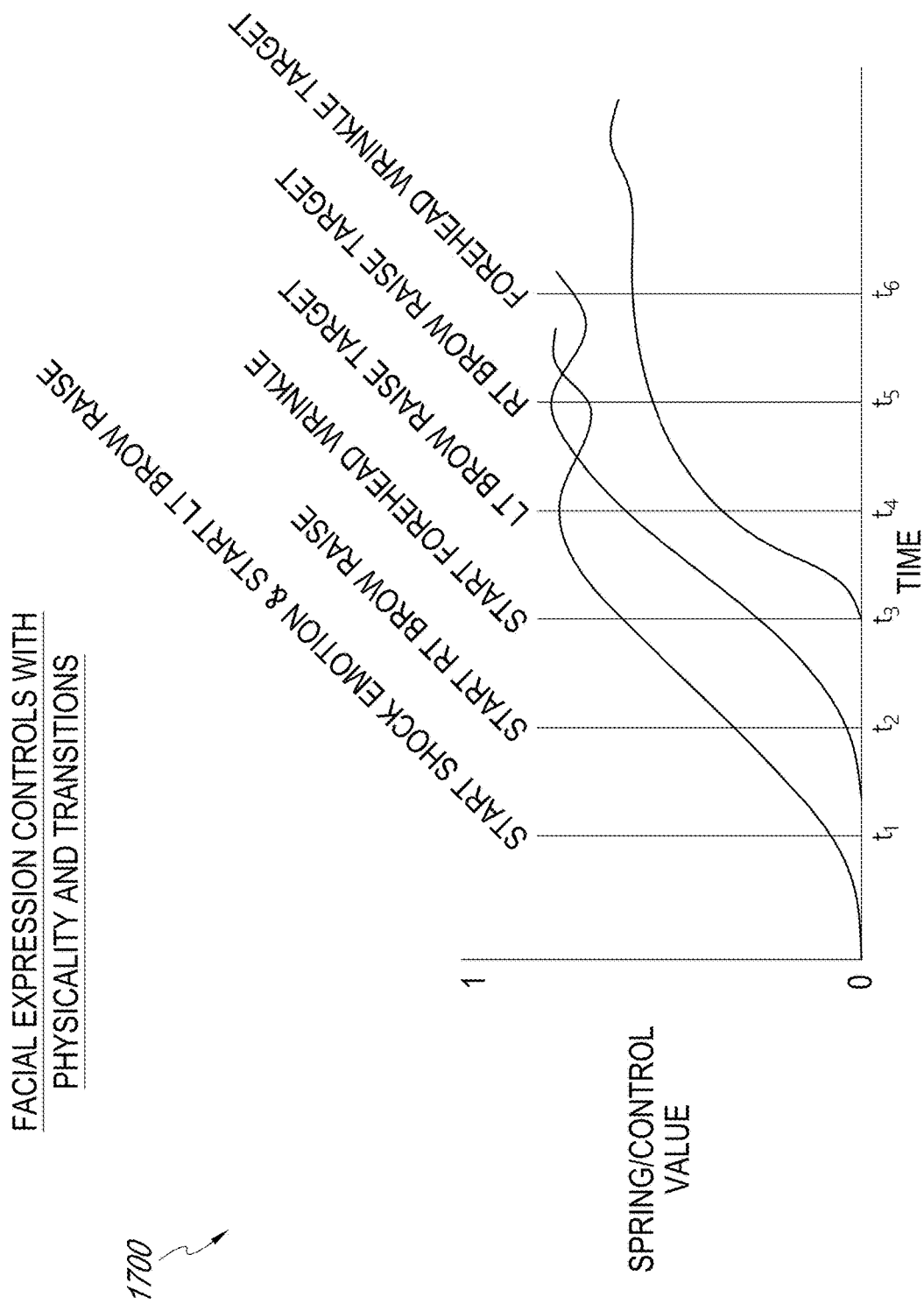
FIG. 17 illustrates an example of changes to face sliders at different points in time where both the tunable control system and the swept transition mechanism are implemented.

FIG. 17 illustrates an example of changes to a control value of a face vector at different points in time where both the tunable system and the sweeping mechanism are implemented. As shown in the graph 1700, during a transition from a neutral expression to a shocked expression, the left eye brow change can start at time t1 and the right eye brow may start at time t2 (e.g., due to face sweep). The tunable springs for the left eyebrow and the right eyebrow can also begin at different times, e.g., at times t4 and t5 respectively. Other facial regions can be animated at later times (e.g., forehead wrinkle begins at time t6) as the sweep progresses, and the corresponding control value of the face vector can (optionally) be associated with its own tunable spring.

Example Processes of Animating a Virtual Character with Realistic Physics

Figure 18:
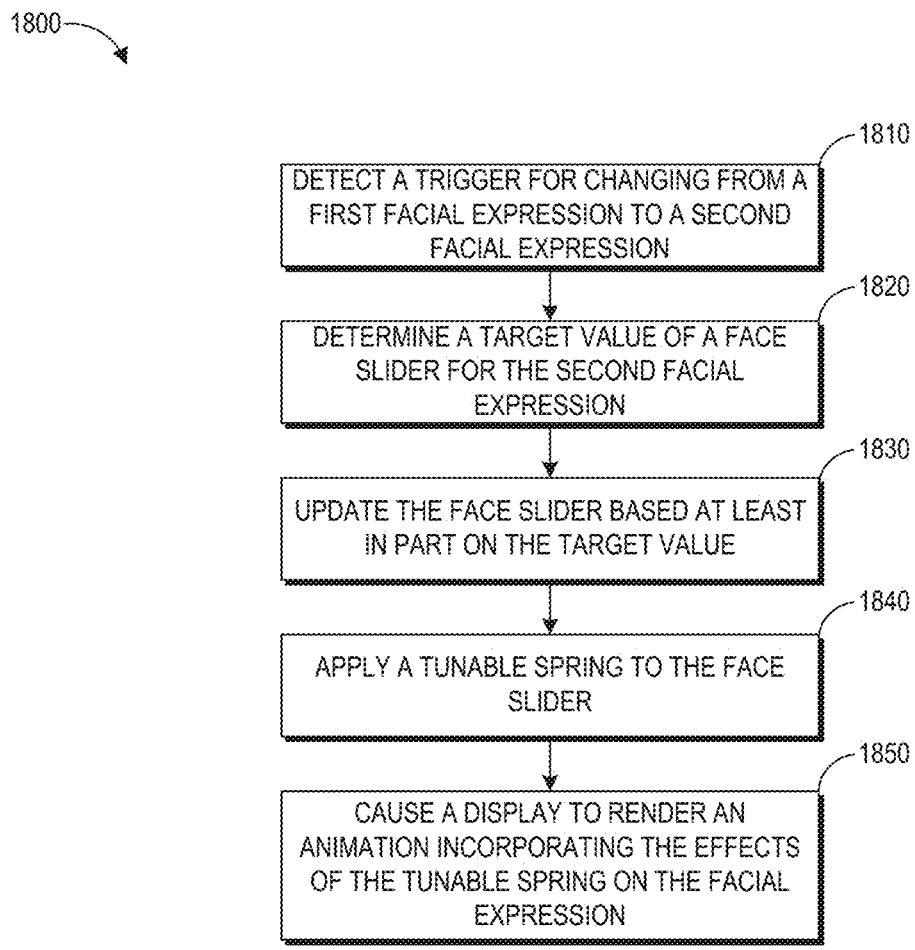
FIG. 18 illustrates an example process of animating a virtual character which incorporates realistic physical movements.

FIG. 18 illustrates an example process of animating a virtual character which incorporates realistic physical movements. The example process 1800 can be performed by the computing device 10, the wearable system 200 (e.g., the modules 260, 270 or the avatar processing and rendering system 690), alone or in combination. The example process 1800 can be performed in real time while the virtual character is interacting with a user or an environment.

At block 1810, the process 1800 can detect a trigger for changing from a first facial expression to a second facial expression. The trigger may be based on a user's interaction, an event in the environment, etc.

To achieve the second facial expressions, one or more values associated with face sliders (e.g., components of a multidimensional face vector) may be updated. At block 1820, the process 1800 can determine a target value of a face slider for the second facial expression. The target value may be a value (e.g., an xyz or angular coordinate value) for moving a 1-D or 2-D face slider. The target value may also be a weight associated with a set of vertices or a blendshape.

At block 1830, the process 1800 can update the face slider based at least in part on the target value and a tunable spring system model. For example, the value of the face slider can be changed from the value associated with the first expression to the target value based on a spring model (e.g., underdamped, overdamped, or critically damped). The change to the target value may be gradual to reduce abruptness of the transition. The transition to the target value may incorporate a tunable system for providing realistic physics of the region controlled by the face slider.

At block 1840, a tunable spring can be applied to the face slider in response to a determination that the target value is reached. For example, the tunable spring can cause the region controlled by the face slider to oscillate for a short duration after the target value is reached, which may simulate oscillations of the skin or facial muscles. In addition to or in alternative to a tunable spring, other types of physical movements can also be applied using similar techniques. Further, the tunable spring (or other types of physics) can be applied when the value of the face slider meets a threshold condition (e.g., within a range that includes the target value).

Different tunable slider parameters can be applied to different components of the face vector, because different facial regions (e.g., FACS regions) may respond differently to transitions (e.g., taught skin over skull bone versus softer cheek skin over the mouth cavity).

At block 1850, the process 1800 can cause a display to render an animation incorporating the tunable spring. For example, the display can render a visual appearance of the facial transition incorporating the effects of the tunable slider system (and optionally incorporating the swept transition system). The display can also render the change in the face slider value(s) during a certain period of time (e.g., an eyebrow raise over several milliseconds, etc.).

Overview of a Computing Device

Figure 19:
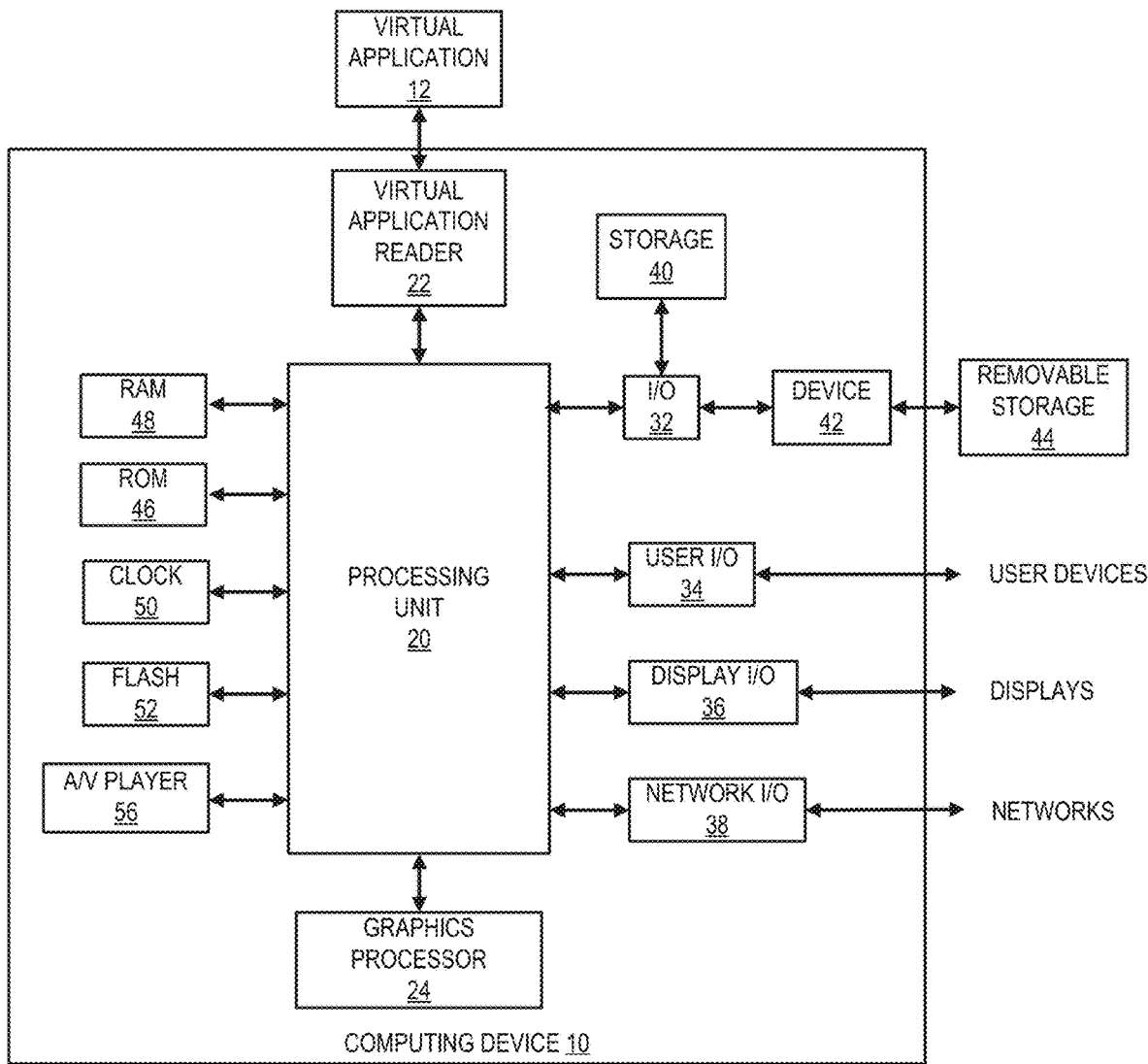
FIG. 19 illustrates an example computing device for implementing various techniques associated with animating or rendering a virtual character.

FIG. 19 illustrates an example computing device 10 for implementing various techniques associated with animating or rendering a virtual character. For example, the computing device 10 can implement various techniques described with reference to FIGS. 11-18. Other variations of the computing device 10 may be substituted for the examples explicitly presented herein, such as removing or adding components to the computing device 10. The computing device 10 may include a game device, a smart phone, a tablet, a personal computer, a laptop, a smart television, a car console display, a server, and the like. The computing device 10 may also be distributed across multiple geographical locations. For example, the computing device 10 may be a cluster of cloud-based servers.

As shown, the computing device 10 includes a processing unit 20 that interacts with other components of the computing device 10 and also external components to computing device 10. A virtual application media reader 22 is included that communicates with a virtual application media 12 (which may include one or more virtual characters, such as, e.g., the virtual avatar described herein). The game media reader 22 may be an optical disc reader capable of reading optical discs, such as CD-ROMs or DVDs, or any other type of reader that can receive and read data from game media 12. One or more of the computing devices may be used to implement one or more of the systems disclosed herein.

Computing device 10 may include a separate graphics processor 24. In some cases, the graphics processor 24 may be built into the processing unit 20. In some such cases, the graphics processor 24 may share Random Access Memory (RAM) with the processing unit 20. Alternatively or additionally, the computing device 10 may include a discrete graphics processor 24 that is separate from the processing unit 20. In some such cases, the graphics processor 24 may have separate RAM from the processing unit 20. Computing device 10 might be a handheld game application device, a dedicated game console computing system, a general-purpose laptop or desktop computer, a smart phone, a tablet, a car console, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data, such as game state data and any shared data files. In addition to storage 40 and removable storage media 44, computing device 10 is also shown including ROM (Read-Only Memory) 46 and RAM 48. RAM 48 may be used for data that is accessed frequently, such as when a video game is being played.

User I/O 34 is used to send and receive commands between processing unit 20 and user devices, such as game controllers. In some embodiments, the user I/O 34 can include a touchscreen input. The touchscreen can be capacitive touchscreen, a resistive touchscreen, or other type of touchscreen technology that is configured to receive user input through tactile inputs from the player. Display I/O 36 provides input/output functions that are used to display images from the game being played. Network I/O 38 is used for input/output functions for a network. Network I/O 38 may be used during execution of a game, such as when a game is being played online or being accessed online, application of fraud detection, and/or generation of a fraud detection model.

Display output signals produced by display I/O 36 comprise signals for displaying visual content produced by computing device 10 on a display device, such as graphics, user interfaces, video, and/or other visual content. Computing device 10 may comprise one or more integrated displays configured to receive display output signals produced by display I/O 36. According to some embodiments, display output signals produced by display I/O 36 may also be output to one or more display devices external to computing device 10.

The computing device 10 can also include other features that may be used with a video game, such as a clock 50, flash memory 52, and other components. An audio/video player 56 might also be used to play a video sequence, such as a movie. It should be understood that other components may be provided in computing device 10 and that a person skilled in the art will appreciate other variations of computing device 10.

Program code can be stored in ROM 46, RAM 48 or storage 40 (which might comprise a hard disk, other magnetic storage, optical storage, other non-volatile storage or a combination or variation of these). Part of the program code can be stored in ROM that is programmable (ROM, PROM, EPROM, EEPROM, and so forth), and part of the program code can be stored in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM 48 is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads virtual application media 12 and provides an application, information may be read from game media 12 and stored in a memory device, such as RAM 48. Additionally, data from storage 40, ROM 46, servers accessed via a network (not shown), or removable storage media 44 may be read and loaded into RAM 48. Although data is described as being found in RAM 48, it will be understood that data does not have to be stored in RAM 48 and may be stored in other memory accessible to processing unit 20 or distributed among several media, such as a virtual application media 12 and storage 40.

Additional Aspects

In a 1st aspect, a system for generating a map of facial expressions, the system comprising: non-transitory storage medium storing vector values for facial expressions; and a hardware processor programmed to: identify a set of facial expressions and a neutral expression to be projected onto a map, wherein each facial expression is represented by an expression specific vector and the neutral expression is represented by a neutral vector; calculate a first expression specific delta vector of a first facial expression based on the first expression specific vector and the neutral vector; calculate a first length of the first expression specific delta vector; calculate a second expression specific delta vector of a second facial expression based on the second expression specific vector and the neutral vector; calculate a second length for the second expression specific delta vector; calculate an angular relationship between the first expression specific delta vector and the second expression specific delta vector; and project the first facial expression and the second facial expression onto a map, wherein locations of the first facial expression and second facial expression, respectively, with reference to the neutral expression are determined based at least in part on the first length and the second length, and wherein a relative position between the first facial expression and the second facial expression is determined based at least in part on the angular relationship between the first expression specific delta vector and the second expression specific delta vector.

In a 2nd aspect, the system of aspect 1, wherein the map comprises two-dimensional projections of the set of facial expressions.

In a 3rd aspect, the system of any one of aspects 1-2, wherein the map comprises a plurality of arms with each arm being positioned with one or more expressions, and each arm of the plurality of arms is connected to the neutral expression.

In a 4th aspect, the system of aspect 3, wherein the map is wheel-shaped, such that the neutral expression is placed at the center of the wheel-shaped map.

In a 5th aspect, the system of aspect 4, wherein two expressions on an arm have two expression specific delta vectors whose angular relationship corresponds to an angle less than 10 degrees.

In a 6th aspect, the system of aspect 5, wherein the two expression specific delta vectors correspond to two similar expressions with different intensities.

In a 7th aspect, the system of any one of aspects 1-6, wherein the expression specific vector comprises a plurality of dimensions, where each dimension is usable to drive deformations of a region of a mesh of a virtual character's face.

In an 8th aspect, the system of claim 7, wherein the expression specific vector comprises over 100 dimensions.

In a 9th aspect, the system of any one of aspects 1-8, wherein one or more of following are unitized: the first expression specific vector, the second expression specific vector, the first expression specific delta vector, the second expression specific delta vector.

In a 10th aspect, the system of any one of aspects 1-9, wherein the hardware processor is programmed to: determine a position of an animation blend cursor; identify a plurality of facial expressions around the blend cursor wherein the plurality of facial expressions forms a polygon; determine weights corresponding to the plurality facial expressions based at least in part on the position of the animation blend cursor with respective to locations of the plurality facial expressions on the map; generate an animation of a facial expression outside of the set of facial expressions projected onto the map based on the plurality facial expressions and the weights corresponding to the three facial expressions.

In an 11th aspect, the system of any one of aspects 1-10, wherein the hardware processor is further programmed to: calculate delta vectors for vectors other than the first and second vectors in the set of vectors corresponding to the set of facial expressions; calculate angular relationships between the first expression specific delta vector and the delta vectors for the vectors other than the first and second vectors corresponding to the set of facial expressions; and output the map comprising the set of facial expressions wherein positions of each facial expression are determined based at least in part on the angular relationships and the delta vectors.

In a 12th aspect, the system of any one of aspects 1-11, wherein: to calculate a first expression specific delta vector, the hardware processor is programmed to subtract the neutral vector from the first expression specific vector.

In a 13th aspect, the system of any one of aspects 1-12, wherein to calculate the angular relationship between the first expression specific delta vector and the second expression specific delta vector, the hardware processor is programmed to calculate a dot product between the first expression specific delta vector and the second expression specific delta vector.

In a 14th aspect, a method for generating a map of facial expressions, the method comprising: identifying a set of facial expressions to be projected onto a map, wherein each facial expression is represented by an expression specific vector; taking a difference between a first expression specific vector of a first facial expression and a reference vector to generate a first expression specific delta vector; taking another difference between a second expression specific vector of a second facial expression and the reference vector to generate a second expression specific delta vector; determining a dot product between the first expression specific delta vector and the second expression specific delta vector; and project the first facial expression and the second facial expression onto a map, wherein a relative position between the first facial expression and the second facial expression is determined based at least in part on the dot product between the first expression specific delta vector and the second expression specific delta vector.

In a 15th aspect, the method of aspect 14, wherein the reference vector represents a neutral expression.

In a 16th aspect, the method of aspect 14 or 15, wherein the map comprises two-dimensional projections of the set of facial expressions.

In a 17th aspect, the method of any one of aspects 14-16, wherein the map has a plurality of arms with each arm being positioned with one or more expressions, and each arm of the plurality of arms is connected to an expression associated with the reference vector.

In an 18th aspect, the method of aspect 17, wherein an expression associated with the reference vector is placed at the center of a wheel shaped map.

In a 19th aspect, the method of aspect 18, wherein distances between the first expression and second expression with respect to the center of the wheel shaped map are determined based on lengths of the first expression specific delta vector and the second expression specific delta vector, respectively.

In a 20th aspect, the method of aspect 18 or 19, wherein two expressions on an arm have two expression specific delta vectors whose dot product approximately equals to 1.

In a 21st aspect, the method of aspect 20, wherein the two expression specific delta vectors correspond to two similar expressions with different intensities, wherein the expression with higher intensity is placed farther away from the center of the wheel shaped map.

In a 22nd aspect, the method of any one of aspects 18-21, wherein two expressions on an opposite side of the wheel shaped map have a dot product approximately equal to −1.

In a 23rd aspect, the method of any one of aspects 14-22, wherein the expression specific vector comprises a plurality of dimensions, where each dimension drives deformations of a region of a mesh of a virtual character's face.

In a 24th aspect, the method of aspect 23, wherein the expression specific vector comprises 137 dimensions.

In a 25th aspect, the method of any one of aspects 14-24, wherein one or more of following are unitized: the first expression specific vector, the second expression specific vector, the first expression specific delta vector, the second expression specific delta vector.

In a 26th aspect, the method of aspect 25, unitizing a vector comprises: calculating a vector length; and for a value in each dimension of the vector, dividing the value by the vector to generate a unitized vector.

In a 27th aspect, the method of any one of aspects 14-26, wherein the map is applied as part of animation blendspace to create additional facial expressions outside of the map.

In a 28th aspect, a system for transitioning a first expression to a second expression for a virtual character, the system comprising: non-transitory storage medium storing vector values for facial expressions of a virtual character; and a hardware processor programmed to: detect a first trigger of an expression change from a first expression to a second expression; in response to the first trigger, determine first values of parameters of a transition system, wherein the parameters comprise a starting facial expression, an ending facial expression, and a sweep direction; determine a first starting facial expression and a first ending facial expression for a first time period during the transition from the first expression to the second expression based at least in part on the first values of the parameters of the transition system; update the vector values for changing the virtual character's facial expression from the first starting facial expression and the first ending facial expression at the first time period; detect a second trigger of another expression change from the second expression to the third expression; in response to the second trigger, determine second values of the parameters of the transition system; determine a second starting facial expression and a second ending facial expression for a second time period based at least in part on the first values and the second values of the parameters of the transition systems; update the vector values for changing the virtual character's facial expression from the second starting facial expression to the second ending facial expression at the second time period.

In a 29th aspect, the system of aspect 28, wherein at least one of the first trigger or the second trigger is caused by: an interaction of a user with the virtual character or an event in an environment of the virtual character.

In a 30th aspect, the system of aspect 28 or 29, wherein the second time period occurs during the transition between the first expression to the second expression.

In a 31st aspect, the system of aspect 30, wherein the second ending facial expression comprises a first portion of the face having a first expression associated with the second expression and a second portion of the face having a second expression associated with the third expression.

In a 32nd aspect, the system of aspect 31, wherein the hardware processor is further programmed to calculate a rate of change of expressions, and wherein the second ending facial expression comprises the first and the second expressions in response to a determination that the rate of change of expressions is faster than a sweep speed associated with transitioning from the first expression to the second expression.

In a 33rd aspect, the system of any one of aspects 28-32, wherein facial expression of the virtual character's face is controlled by a face vector comprising a plurality of dimensions with each vector value corresponding to a dimension of the plurality of dimensions.

In a 34th aspect, the system of any one of aspects 28-33, wherein the second starting facial expression is the same as the first ending facial expression.

In a 35th aspect, the system of any one of aspects 28-34, wherein the first expression is the same as the third expression.

In a 36th aspect, the system of any one of aspects 28-35, wherein a first sweeping direction value in the first values for transitioning from the first expression to the second expression is different from a second sweeping direction values in the second values for transitioning from the second expression to the third expression.

In a 37th aspect, the system of aspect 36, wherein the first sweeping direction is applied to determine the second starting facial expression and the second ending facial expression for the second time period for transitioning between the second and third expressions in response to a determination that at least a portion of the face still has an expression associated with the first expression.

In a 38th aspect, the system of aspect 36 or 37, wherein the second sweeping direction is applied to determine the second starting facial expression and the second ending facial expression for the second time period for transitioning between the second and third expressions in response to a determination that a transition from the first expression to the second expression has been completed prior to the second time period.

In a 39th aspect, the system of any one of aspects 28-38, wherein the sweep direction is randomized for each transition.

In a 40th aspect, the system of any one of aspects 28-39, wherein at least one of the first, second, or third expression can be determined from a wheel shaped map comprising a set of expressions projected on to a plurality of arms of the wheel shaped map wherein similar expressions are located in the same directions on the wheel shaped map.

In a 41st aspect, the system of aspect 40, wherein a movement from the first expression to the second expression and then to the third expression is associated with an expression change trajectory on the wheel shaped map.

In a 42nd aspect, a method for transitioning a first expression to a second expression for a virtual character, the method comprising: under control of a hardware processor: detecting a first trigger of an expression change from a first expression to a second expression; in response to the first trigger, determining a first starting facial expression and a first ending facial expression for a first time period during a transition from the first expression to the second expression; updating vector values of a face vector for changing a virtual character's facial expression from the first starting facial expression and the first ending facial expression at the first time period; detecting a second trigger of another expression change from the second expression to the third expression; in response to the second trigger, determining a second starting facial expression and a second ending facial expression for a second time period to transition to the third expression; updating the vector values for changing the virtual character's facial expression from the second starting facial expression to the second ending facial expression at the second time period, wherein the second time period occurs during the transition between the first expression to the second expression.

In a 43rd aspect, the method of aspect 42, wherein at least one of the first trigger or the second trigger is caused by: an interaction of a user with the virtual character or an event in an environment of the virtual character.

In a 44th aspect, the method of aspect 42 or 43, wherein the second ending facial expression comprises a first portion of the face having a first expression associated with the second expression and a second portion of the face having a second expression associated with the third expression.

In a 45th aspect, the method of aspect 44, the second ending facial expression comprises the first and the second expressions in response to a determination that a rate of change of expressions is faster than a sweep speed associated with transitioning from the first expression to the second expression.

In a 46th aspect, the method of any one of aspects 42-45, wherein facial expression of the virtual character's face is controlled by a face vector comprising a plurality of dimensions with each vector value corresponding to a dimension of the plurality of dimensions.

In a 47th aspect, the method of any one of aspects 42-46, wherein the second starting facial expression is the same as the first ending facial expression.

In a 48th aspect, the method of any one of aspects 42-47, wherein the first expression is the same as the third expression.

In a 49th aspect, the method of any one of aspects 42-48, wherein a first sweeping direction value for transitioning from the first expression to the second expression is different from a second sweeping direction values for transitioning from the second expression to the third expression.

In a 50th aspect, the method of aspect 49, further comprising disabling the second sweeping direction associated with a transition from the second expression to the third expression.

In a 51st aspect, the method of aspect 49 or 50, wherein the sweep direction is randomized for each transition.

In a 52nd aspect, the method of any one of aspects 42-51, wherein at least one of the first, second, or third expression can be determined from a wheel shaped map comprising a set of expressions projected on to a plurality of arms of the wheel shaped map wherein similar expressions are located in the same directions on the wheel shaped map.

In a 53rd aspect, a method for transitioning expressions for a virtual character, the method comprising: under control of a hardware processor: identifying a first trigger of a first expression change from a first expression to a second expression for a virtual character; determining parameters of the first expression change; sweeping the second expression across the face of the virtual character based at least in part on the parameters; identifying a second trigger of a second expression change from the second expression to a third expression, wherein the second trigger occurs prior to the first expression change completes; and initiating sweeping of the third expression across the face while continue to sweep the second expression across the face.

In a 54th aspect, the method of aspect 53, wherein initiating sweeping of the third expression across the face while continue to sweep the second expression across the face comprises: changing a first region of the face from the second expression to the third expression; and changing a second region of the face from the first expression to the second expression.

In a 55th aspect, the method of aspect 53 or 54, wherein the parameters comprise at least one of a sweeping speed or a sweeping direction.

In a 56th aspect, a system for animating a virtual character, the system comprising: non-transitory storage medium storing control systems for facial expressions of a virtual character, wherein the control systems comprise a plurality of face sliders implemented with tunable springs; a display for rendering the virtual character; and a hardware processor programmed to: detect a trigger for changing the virtual character's facial expression from a first facial expression to a second facial expression; determine one or more of the face sliders to be updated in response to the trigger; determine a target value of a face slider of the one or more face sliders; update a value of the face slider to the target value; apply a tunable spring to the face slider in response to a determination that the target value is reached; and cause the display to render the virtual character to show a change from the first facial expression to the second facial expression with the tunable spring.

In a 57th aspect, the system of aspect 56, wherein to update the value of the face slider to the target value, the hardware processor is further programmed to apply a tunable control associated with the tunable spring to gradually update the value of the face slider to the target value.

In a 58th aspect, the system of aspect 56 or 57, wherein the face slider controls one or more vertices of a mesh of the virtual character.

In a 59th aspect, the system of any one of aspects 56-58, wherein the tunable spring causes a cyclic motion to be performed on a region controlled by the face slider.

In a 60th aspect, the system of any one of aspects 56-59, wherein the tunable spring represents an underdamped oscillation asymptotic to the target value.

In a 61st aspect, the system of any one of aspects 56-60, wherein the control system further comprises a sweeping mechanism for changing the facial expression, and the sweeping mechanism causes the tunable spring to the face slider to occur at a different time than another tunable spring to another face slider.

In a 62nd aspect, a method for animating a virtual character, the method comprising: detecting a trigger for changing a virtual character's facial expression from a first facial expression to a second facial expression; determining one or more of face sliders of a control system of the virtual character to be updated in response to the trigger; determining a target value of a face slider of the one or more face sliders, wherein the face slider comprises a physicality implemented to simulate real world physical movements; updating a value of the face slider to the target value; activating a physicality for the face slider in response to a determination that a threshold condition is reached; and causing the display to render the virtual character to show a change from the first facial expression to the second facial expression with the physicality.

In a 63rd aspect, the method of aspect 62, wherein the physicality comprises a tunable spring which causes cyclic motion to be performed on a region controlled by the face slider.

In a 64th aspect, the method of aspect 62 or 63, wherein the face slider controls one or more vertices of a mesh of the virtual character.

In a 65th aspect, the method of any one of aspects 62-64, wherein the threshold condition comprises a threshold value below the target value.

In a 66th aspect, the method of any one of aspects 62-65, wherein the control system further comprises a sweeping mechanism for changing the facial expression, and the sweeping mechanism causes the physicality to the face slider to occur at a different time than physicality to another face slider.

Other Considerations

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, animations or video may include many frames, with each frame having millions of pixels, and specifically programmed computer hardware is necessary to process the video data to provide a desired image processing task or application in a commercially reasonable amount of time. As described above, the volume of the multidimensional facial expression space may be so enormously large that a rule-based approach must be computationally implemented on computer hardware, particularly to render virtual avatar facial expressions in real-time in an augmented, virtual, or mixed reality environment.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A system for animating a virtual character, the system comprising:
   non-transitory storage medium storing control systems for facial expressions of a virtual character in a multidimensional vector space, wherein the control systems comprise a plurality of face sliders representing vector component values for the facial expressions of the virtual characters in the multidimensional vector space, the face sliders implemented with tunable springs, wherein an angular difference between vectors in the multidimensional vector space corresponds to a difference in emotion type between facial expressions associated with the vectors; and wherein a difference in magnitude between the vectors corresponds to a difference in intensity of emotion between the facial expressions associated with the vectors;
   a display for rendering the virtual character; and
   a hardware processor programmed to:
      detect a trigger for changing the virtual character's facial expression in a transition from a first facial expression represented by a first vector to a second facial expression represented by a second vector;
      determine one or more of the plurality of face sliders to be updated in response to the trigger for the transition between the first vector for the first facial expression to the second vector for the second facial expression;
      determine a target value of a face slider of the one or more face sliders;
      update a value of the face slider to the target value;
      apply a tunable spring to the face slider in response to a determination that the target value is reached; and
      cause the display to render the virtual character to show a change from the first facial expression to the second facial expression with the tunable spring.

2. The system of claim 1, wherein the face slider controls one or more vertices of a mesh of the virtual character.

3. The system of claim 1, wherein the tunable spring causes a cyclic motion to be performed on a region controlled by the face slider.

4. The system of claim 1, wherein the tunable spring represents an underdamped oscillation asymptotic to the target value.

5. The system of claim 1, wherein the control systems further comprise a sweeping mechanism for changing the facial expression, and the sweeping mechanism causes the tunable spring to the face slider to occur at a different time than another tunable spring to another face slider.

6. The system of claim 1, wherein the control systems further include, for the transition, a sweep direction representing a direction of change among portions of the face for the transition between the first vector to the second vector.

7. The system of claim 6, wherein the sweep direction is randomized.

8. The system of claim 6, wherein the sweep direction is independent from the trigger.

9. A method for animating a virtual character, the method comprising:
   detecting a trigger for changing a virtual character's facial expression in a transition from a first facial expression represented by a first vector to a second facial expression represented by a second vector;
   determining one or more face sliders of a control system of the virtual character to be updated in response to the trigger, the one or more face sliders representing vector component values for the facial expressions of the virtual characters in the multidimensional vector space, the face sliders implemented with tunable springs, wherein an angular difference between vectors in the multidimensional vector space corresponds to a difference in emotion type between facial expressions associated with the vectors; and wherein a difference in magnitude between the vectors corresponds to a difference in intensity of emotion between the facial expressions associated with the vectors;
   determining a target value of a face slider of the one or more face sliders in response to the trigger for the transition between the first vector for the first facial expression to the second vector for the second facial expression,
   wherein the face slider comprises a physicality implemented to simulate real world physical movements;
   updating a value of the face slider to the target value;

activating a physicality for the face slider in response to a determination that a threshold condition is reached; and causing a display to render the virtual character to show a change from the first facial expression to the second facial expression with the physicality.

10. The method of claim 9, wherein the physicality comprises a tunable spring which causes cyclic motion to be performed on a region controlled by the face slider.

11. The method of claim 9, wherein the face slider controls one or more vertices of a mesh of the virtual character.

12. The method of claim 9, wherein the threshold condition comprises a threshold value below the target value.

13. The method of claim 9, wherein the control systems further comprise a sweeping mechanism for changing the facial expression, and the sweeping mechanism causes the physicality to the face slider to occur at a different time than physicality to another face slider.

14. The method of claim 9, wherein the transition includes a sweep direction representing a direction of change among portions of the face for the transition between the first vector to the second vector.

15. The method of claim 14, wherein the sweep direction is randomized.

16. The method of claim 14, wherein the sweep direction is independent from the trigger.

\* \* \* \* \*